(12) United States Patent
Adjakple et al.

(10) Patent No.: US 10,687,299 B2
(45) Date of Patent: Jun. 16, 2020

(54) MOBILITY SIGNALING LOAD REDUCTION

(71) Applicant: Convida Wireless, LLC, Wilmington, DE (US)

(72) Inventors: Pascal M. Adjakple, Great Neck, NY (US); Qing Li, Princeton Junction, NJ (US); Joseph M. Murray, Schwenksville, PA (US); Wei Chen, San Diego, CA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 15/492,921

(22) Filed: Apr. 20, 2017

(65) Prior Publication Data
US 2017/0311278 A1    Oct. 26, 2017

Related U.S. Application Data

(60) Provisional application No. 62/325,450, filed on Apr. 20, 2016.

(51) Int. Cl.
| | |
|---|---|
| *H04W 60/04* | (2009.01) |
| *H04W 76/27* | (2018.01) |
| *H04W 68/02* | (2009.01) |
| *H04W 92/10* | (2009.01) |
| *H04W 60/00* | (2009.01) |
| *H04W 68/00* | (2009.01) |

(Continued)

(52) U.S. Cl.
CPC ........... *H04W 60/04* (2013.01); *H04W 60/00* (2013.01); *H04W 68/005* (2013.01); *H04W 72/04* (2013.01); *H04W 92/10* (2013.01); *H04W 8/06* (2013.01); *H04W 64/00* (2013.01); *H04W 76/27* (2018.02)

(58) Field of Classification Search
CPC ... H04W 60/00; H04W 60/04; H04W 68/005; H04W 68/02; H04W 42/04; H04W 74/08; H04W 64/006; H04W 76/27
See application file for complete search history.

(56) References Cited

U.S. PATENT DOCUMENTS

| | | | |
|---|---|---|---|
| 5,335,246 A | 8/1994 | Yokev et al. | |
| 9,750,076 B2 * | 8/2017 | Pinheiro | ............. H04W 76/046 |

(Continued)

FOREIGN PATENT DOCUMENTS

| | | |
|---|---|---|
| EP | 2515562 A1 | 10/2012 |
| JP | 2010-520712 | 6/2010 |
| JP | 2014-514831 | 6/2014 |

OTHER PUBLICATIONS

Third Generation Partnership Project (3GPP) TSG RAN WG2 Meeting#93bis R2-162705 Standalone NR: RAN based mobility framework, Apr. 2016, 3 pages.

(Continued)

*Primary Examiner* — Magdi Elhag
(74) *Attorney, Agent, or Firm* — BakerHostetler

(57) ABSTRACT

Methods, systems, and devices may assist in reducing signaling load that occur based on paging and handover. Methods, systems, and devices may be based on UE states, a radio access network registration area (RRA) or tracking/paging area with different architectural approaches (e.g., hierarchical or distributed), dynamic RRA management, radio access network based paging, and radio access network based user equipment (UE) mobility management.

20 Claims, 34 Drawing Sheets

(51) Int. Cl.
*H04W 72/04* (2009.01)
*H04W 8/06* (2009.01)
*H04W 64/00* (2009.01)

(56) References Cited

U.S. PATENT DOCUMENTS

| | | | | |
|---|---|---|---|---|
| 2007/0218889 | A1* | 9/2007 | Zhang | H04W 68/00 455/422.1 |
| 2012/0213165 | A1* | 8/2012 | Miklos | H04W 12/06 370/329 |
| 2013/0288682 | A1* | 10/2013 | Wang | H04W 4/08 455/436 |
| 2015/0319719 | A1* | 11/2015 | Steudle | H04W 24/02 370/216 |

OTHER PUBLICATIONS

Recommendation ITU-R M.2083-0, IMT Vision—"Framework and Overall Objectives of the Future Development of IMT for 2020 and Beyond", M Series, Mobile, Radiodetermination, Amateur and Related Satellite Services, Sep. 2015, 21 pages.
3rd Generation Partnership Project; (3GPP) TSG RAN Meeting #71, RP-160540, New WI Proposal; Signaling Reduction to Enable Light Connection for LTE, Mar. 2016, 7 pages.
3rd Generation Partnership Project; (3GPP) TSG RAN Meeting #71, RP-160425, Further Enhancements on Signaling Reduction to Enable Light Connection for LTE, Mar. 2016, 7 pages.
3rd Generation Partnership Project; (3GPP) TSG RAN Meeting #71, RP-160301, "Motivation for New WI on Light Connection in LTE", Mar. 2016, 14 pages.
3rd Generation Partnership Project; (3GPP) TS 36.331 V13.0.0, Technical Specification Group Radio Access Network; Evolved Universal Terrestrial Radio Access (E-UTRA); Radio Resource Control (RRC); Protocol Specification (Release 13), Dec. 2015, 507 pages.
3rd Generation Partnership Project; (3GPP) TS 36.304 V13.0.0, Technical Specification Group Radio Access Network; Evolved Universal Terrestrial Radio Access (E-UTRA); User Equipment (UE) Procedures in Idle Mode (Release 13), Dec. 2015, 42 pages.
3rd Generation Partnership Project; (3GPP) TS 24.302 V13.5.0, Technical Specification Group Core Network and Terminals; Access to the 3GPP Evolved Packet Core (EPC) via non-3GPP Access Networks; Stage 3 (Release 13), Mar. 2016, 126 pages.
3rd Generation Partnership Project; (3GPP) TS 23.401 V13.6.1, Technical Specification Group Services and System Aspects; General Packet Radio Service (GPRS) Enhancements for Evolved Universal Terrestrial Radio Access Network (E-UTRAN) Access (Release 13), Mar. 2016, 365 pages.
3rd Generation Partnership Project; (3GPP) TS 23.060 V13.6.0; Technical Specification Group Services and System Aspects; General Packet Radio Service (GPRS); Service Description; Stage 2 (Release 13), Mar. 2016, 362 pages.
3rd Generation Partnership Project; (3GPP) TR 45.820 V1.3.1; Technical Specification Group GSM/EDGE Radio Access Network; Cellular System Support for Ultra Low Complexity and Low Throughput Internet of Things; (Release 13), Jun. 2015, 271 pages.
3rd Generation Partnership Project; (3GPP) TR 38.913 V0.2.0, Technical Specification Group Radio Access Network; Study on Scenarios and Requirements for Next Generation Access Technologies; (Release) 14), Feb. 2016, 19 pages.
3rd Generation Partnership Project; (3GPP) TR 23.720 V13.0.0, Technical Specification Group Services and Systems Aspects; Study on Architecture Enhancements for Cellular Internet of Things (Release 13), Mar. 2016, 94 pages.
3rd Generation Partnership Project; (3GPP) TR 22.891 V1.1.0, Technical Specification Group Services and System Aspects; Feasibility Study on New Services and Markets Technology Enablers; Stage 1 (Release 14), Nov. 2015, 95 pages.
3rd Generation Partnership Project; (3GPP) SA WG2 Meeting #S2-113ah, S2-161323 "Solution: Mobility Framework", Feb. 2016, 6 pages.
3rd Generation Partnership Project; (3GPP) SA WG2 Meeting #113AH, S2-161198, "Solution for Optimized UE Sleep State and State Transitions", Feb. 2016, 3 pages.
3rd Generation Partnership Project; (3GPP) SA WG2 Meeting #113, S2-161324, "Solution to Key Issue on Mobility Framework", Feb. 2016, 3 pages.
3rd Generation Partnership Project; (3GPP) 22.861 V1.0.0; Technical Specification Group Services and System Aspects; Feasibility Study on New Services and Markets Technology Enablers for Massive Internet of Things; Stage 1 (Release 14), Feb. 2016, 23 pages.
3GPP TSG RAN Meeting #69 R2-151356, Huawei, "Views on LTE Rel-14", Sep. 2015, 25 pages.
3GPP TSG-RAN WG1 Meeting #84bis R1-162922, Interdigital Communications, Discussion on multiple access for New RAdio systems, Apr. 2016, 5 pages.
3GPP TSG-RAN WG2 Meeting #81bis, R2-131422, Nokia Siemens Networks, "Enhanced Mobility State Estimation", Apr. 2013, 15 pages.
Huawei, "Solution: Mobility states for UE with power consumption optimization", (S2-162160), SA WG2 Meeting #114 (Apr. 11, 2016).

* cited by examiner

MOBILITY SIGNALING LOAD REDUCTION

CROSS-REFERENCE TO RELATED APPLICATIONS

This application claims the benefit of U.S. Provisional Patent Application No. 62/325,450, filed on Apr. 20, 2016, entitled "Mobility Signaling Load Reduction," the contents of which are hereby incorporated by reference herein.

BACKGROUND

RRC Protocol States:

In LTE, a terminal can be in two different states, as shown in FIG. 1, RRC_CONNECTED and RRC_IDLE.

In RRC_CONNECTED, there is an RRC context. The cell to which the UE belongs is known and an identity of the UE, the Cell Radio-Network Temporary Identifier (C-RNTI), used for signaling purposes between the UE and the network, has been configured. RRC_CONNECTED is intended for data transfer to/from the UE.

In RRC_IDLE, there is no RRC context in the Radio Access Network (RAN) and the UE does not belong to a specific cell. No data transfer may take place in RRC_IDLE. A UE in RRC_IDLE monitors a Paging channel to detect incoming calls and changes to the system information. Discontinuous Reception (DRX) is used to conserve UE power. When moving to RRC_CONNECTED, the RRC context needs to be established in both the RAN and the UE.

FIG. 2 provides an overview of the RRC states in E-UTRA with the illustration of the mobility support between E-UTRAN, UTRAN and GERAN.

Mobility State of UE (3GPP TS 36.304 User Equipment (UE) Procedures in Idle Mode (Release 13), V13.0.0):

Besides Normal-mobility state, a High-mobility and a Medium-mobility state are applicable if the parameters (TCRmax, NCR_H, NCR_M and TCRmaxHyst) are sent in the system information broadcast of the serving cell. Note: These states should be considered substates as related to mobility in RRC_IDLE state. NCR_M specifies the maximum number of cell reselections to enter Medium-mobility state. NCR_H specifies the maximum number of cell reselections to enter High-mobility state. TCRmax specifies the duration for evaluating allowed amount of cell reselection(s). TCRmaxHyst specifies the additional time period before the UE can enter Normal-mobility state.

State detection criteria include medium-mobility state criteria or high-mobility state criteria. Medium-mobility state criteria: If number of cell reselections during time period TCRmax exceeds NCR_M and not exceeds NCR_H. High-mobility state criteria: If number of cell reselections during time period TCRmax exceeds NCR_H. The UE shall not count consecutive reselections between same two cells into mobility state detection criteria if same cell is reselected just after one other reselection.

State transitions: The UE shall: 1) if the criteria for High-mobility state is detected, enter High-mobility state; else if 2) the criteria for Medium-mobility state is detected, enter Medium-mobility state; else if 3) else if criteria for either Medium- or High-mobility state is not detected during time period TCRmaxHyst, enter Normal-mobility state NAS Protocol:

Detail of NAS Protocol for LTE are described in 3GPP TS 23.401 General Packet Radio Service (GPRS) enhancements for Evolved Universal Terrestrial Radio Access Network (E-UTRAN) access (Release 13), V13.6.1 and 3GPP TS 24.302 Access to the 3GPP Evolved Packet Core (EPC) via non-3GPP access networks; Stage 3 (Release 13), V13.5.0. A summary is provided below.

The non-access stratum (NAS) forms the highest stratum of the control plane between UE and MME at the radio interface over the reference point Uu. Main functions of the protocols that are part of the NAS are: the support of mobility of the user equipment (UE); and the support of session management procedures to establish and maintain IP connectivity between the UE and a packet data network gateway (PDN GW).

As such, the NAS consists of two separate protocols that are carried on direct signaling transport between the UE and for e.g., the MME in the Core Network (CN). The content of the NAS layer protocols is not visible to the Radio Access Network (RAN) nodes (e.g., eNodeB), and the RAN nodes are not involved in these transactions by any other means, besides transporting the messages, and providing some additional transport layer indications along with the messages in some cases. NAS layer protocols include EPS Mobility Management (EMM) and EPS Session Management (ESM).

EPS Mobility Management (EMM): The EMM protocol is responsible for handling the UE mobility within the system. It includes functions for attaching to and detaching from the network, and performing location updating in between. This is called Tracking Area Updating (TAU), and it happens in idle mode. Note that the handovers in connected mode are handled by the lower layer protocols, but the EMM layer does include functions for re-activating the UE from idle mode. The UE initiated case is called Service Request, while Paging represents the network initiated case. Authentication and protecting the UE identity, i.e. allocating the temporary identity Globally Unique Temporary UE Identity GUTI to the UE are also part of the EMM layer, as well as the control of NAS layer security functions, encryption and integrity protection. Example of EMM procedures include attach procedure (for registration), detach procedure, service request procedure, tracking area update procedure, connection suspend, connection resume procedure and UE reachability procedure. NAS security is an additional function of the NAS providing services to the NAS protocols, e.g., integrity protection and ciphering of NAS signaling messages.

EPS Session Management (ESM): This protocol may be used to handle the bearer management between the UE and MME, and it is used in addition for E-UTRAN bearer management procedures. Note that the intention is not to use the ESM procedures if the bearer contexts are already available in the network and E-UTRAN procedures can be run immediately. This would be the case, for example, when the UE has already signaled with an operator affiliated Application Function in the network, and the relevant information has been made available through the PCRF.

The overall Evolved Packet System Control Plane Protocol stack is depicted in FIG. 3.

Linkage Between the Protocols for EPS Mobility Management and EPS Session Management:

During the EPS attach procedure, the network can activate a default EPS bearer context (i.e. if the UE requests PDN connectivity in the attach request). Additionally, the network can activate one or several dedicated EPS bearer contexts in parallel for PDN connections of IP PDN type. To this purpose the EPS session management messages for the default EPS bearer context activation are transmitted in an information element in the EPS mobility management messages. In this case, the UE and the network execute the attach procedure, the default EPS bearer context activation procedure, and the dedicated EPS bearer context activation procedure in parallel. The UE and network shall complete the combined default EPS bearer context activation procedure and the attach procedure before the dedicated EPS bearer context activation procedure is completed. The success of the attach procedure is dependent on the success of the default EPS bearer context activation procedure. If the attach procedure fails, then the ESM procedures also fail. Except for the attach procedure and the service request procedure, during EMM procedures the MME shall suspend the transmission of ESM messages. During the service request procedure the MME may suspend the transmission of ESM messages. Except for the attach procedure, during EMM procedures the UE shall suspend the transmission of ESM messages.

NAS Protocol States:

The EMM sublayer main states in the UE are illustrated in FIG. 4. The eMM sublayer states in the MME are illustrated in FIG. 5. ESM Sublayer State in the UE are shown in FIG. 6. ESM Sublayer State in the MME are shown in FIG. 7.

Cell Selection and Reselection:

The cell selection and reselection procedures performed by a UE in RRC_IDLE are described in section 5.2 of 3GPP TS 36.304. FIG. 8 is high level flow chart illustrating the cell selection and reselection processing performed by a UE in RRC_IDLE. The procedure is entered whenever a new PLMN is selected or if a suitable cell can't be found upon leaving RRC_CONNECTED. After a cell is selected, the UE camps on the cell and performs the tasks defined in section 5.2.6 or 5.2.9 of 3GPP TS 36.304, depending on whether the UE has camped on a suitable cell or an acceptable cell respectively. When camped on a cell, the UE shall regularly search for a better cell according to the cell reselection criteria, as defined in section 5.2.3.2 of 3GPP TS 36.304.

The Cell Reselection Evaluation process is performed according to internal UE triggers or when information on the BCCH used for the cell reselection evaluation procedure has been modified. Upon re-selecting a cell, a UE in RRC_IDLE is required to apply the System Information Acquisition procedure as defined in section 5.2.3 of 3GPP TS 36.331 to obtain the system information for the new serving cell.

IMT 2020:

IMT for 2020 and beyond is envisaged to expand and support diverse families of usage scenarios and applications that will continue beyond the current IMT. Furthermore, a broad variety of capabilities would be tightly coupled with these intended different usage scenarios and applications for IMT for 2020 and beyond. The families of usage scenarios for IMT for 2020 and beyond include eMBB, URLLC, mMTC, and NEO.

eMBB (Enhanced Mobile Broadband)
Macro and small cells
1 ms Latency (air interface)
Spectrum allocated at WRC-15 may lead up to 8 Gbps of additional throughput
Support for high mobility
URLLC (Ultra-Reliable and Low Latency Communications)
Low to medium data rates (50 kbps-10 Mbps)
<1 ms air interface latency
9.999% reliability and availability
Low connection establishment latency
0-500 km/h mobility
mMTC (Massive Machine Type Communications)
Low data rate (1~100 kbps)
High density of devices (up to 200,000/km2)
Latency: seconds to hours
Low power: up to 15 years battery autonomy
Asynchronous access
NEtwork Operation (NEO) addresses the subjects such as Network Slicing, Routing, Migration and Interworking, Energy Saving, etc.

The following deployment scenarios are being considered primarily for eMBB (see 3GPP TR 38.913 Study on Scenarios and Requirements for Next Generation Access Technologies; (Release 14), V0.2.0). Deployment scenarios for mMTC and URLLC are still under study; however, the eMBB deployment scenarios below are likely to also be applicable to mMTC and URLLC. The following 5 deployment scenarios are being considered for eMBB: Indoor Hotspot, Dense Urban, Rural, Urban Macro, and High Speed.

Indoor Hotspot: this deployment scenario focuses on small coverage per site/TRP (Transmission and Reception Point) and high user throughput or user density in buildings. The key characteristics of this deployment scenario are high capacity, high user density and consistent user experience indoor.

Dense Urban: the dense urban microcellular deployment scenario focuses on macro TRPs with or without micro TRPs and high user densities and traffic loads in city centers and dense urban areas. The key characteristics of this deployment scenario are high traffic loads, outdoor and outdoor-to-indoor coverage.

Rural: this deployment scenario focuses on larger and continuous coverage. The key characteristics of this scenario are continuous wide area coverage supporting high speed vehicles.

Urban Macro: the urban macro deployment scenario focuses on large cells and continuous coverage. The key characteristics of this scenario are continuous and ubiquitous coverage in urban areas.

High Speed: Beyond 2020, there will be a growing demand for mobile services in vehicles, trains and even aircrafts. While some services are the natural evolution of the existing ones (navigation, entertainment, etc.), some others represent completely new scenarios such as broadband communication services on commercial aircrafts (e.g., by a hub on board). The degree of mobility required will depend upon the specific use case, with speeds greater than 500 km/h.

Additionally, the following deployment scenario, urban coverage for massive connection, has been identified specifically for mMTC use case. Urban coverage for massive connection: The urban coverage for massive connection scenario focuses on large cells and continuous coverage to provide mMTC. The key characteristics of this scenario are continuous and ubiquitous coverage in urban areas, with very high connection density of mMTC devices. This deployment scenario is for the evaluation of the KPI of connection density.

Furthermore, the following deployment scenarios have been identified for UR/LL use case: Highway Scenario and Urban Grid for Connected Car. Highway Scenario: The highway deployment scenario focuses on scenario of vehicles placed in highways with high speeds. The main KPIs evaluated under this scenario would be reliability/availability under high speeds/mobility (and thus frequent handover operations).

Urban Grid for Connected Car: The urban macro deployment scenario focuses on scenario of highly densely deployed vehicles placed in urban area. It could cover a scenario where freeways lead through an urban grid. The main KPI evaluated under this scenario are reliability/availability/latency in high network load and high UE density scenarios.

Example of mMTC Applications:

First Example—Light Weight Device: Light Weight Device—very simple device with e.g., with no IMS client (5.1.2.1 of 3GPP TR 22.861), the device could be, for example, a smart electric meter. It records electricity usage, provides up to the minute usage reports that allow the customer to take advantage of time of day rating, and provides a larger, complete report to the electric company once a month. The electric company deploys a large number of these smart meters within an apartment building, one for each apartment.

Second Example—Video Surveillance with variable data size: The application here is a video Surveillance with variable data size (5.1.2.2 of 3GPP TR 22.861). A video recorder is installed and activated at a street corner. The video recorder includes a camera, some on-board processing capability, as well as the ability to send information to the traffic police. The camera records continuous video, storing the content for some period of time. The device periodically sends a status update to the traffic police indicating that traffic is moving smoothly When an accident occurs at the intersection, the device begins sending high quality video to the traffic police of the accident and ensuing traffic congestion.

Note: The network will need the flexibility to provide efficient service to the device at all times, whether a small or large amount of data is sent in a given transmission. An efficient system could minimize any negative impact to battery life for the device and minimize use of signaling resources. The same device will need to establish a connection when it needs to transmit a large amount of data (e.g., video).

Third Example—Warehouse Application (5.2.3.1 of 3GPP TR 22.861 Feasibility Study on New Services and Markets Technology Enablers for Massive Internet of Things; Stage 1 (Release 14), V1.0.0): In this application, the coverage area is limited. Most likely the IoT devices in a given deployment are owned by same entity devices will range from very simple, limited function devices to very complex, sophisticated computing platforms. On the lower end of the device function range, not all such devices may use IMS and may not need to be equipped with an IMS client, and yet it would still be desirable to activate such a device remotely due to sensor deployment configurations.

Example of UR/LL Applications:

First Example—Industrial Process Control (5.1.2.2 of 3GPP TR 22.862): Process automation requires communications for supervisory and open-loop control applications, process monitoring and tracking operations on field level inside an industrial plant. As depicted in FIG. 9, a large number of sensors (~10,000) that are distributed over the plant forward measurement data to process controllers on a periodic or event-driven base. The use case requires support of a large number of sensor devices (10,000) per plant as well as highly reliable transport (packet loss rate<10-5). Further, power consumption is critical since most sensor devices are battery-powered with a targeted battery lifetimes of several years while providing measurement updates every few seconds. A typical process control application supports downstream and upstream flows between process controllers and sensors/actuators which consist of individual transactions. The process controller resides in the plant network. This network interconnects via base stations to the wireless (mesh-) network which hosts the sensor/actuator devices. Typically, each transaction uses less than 100 bytes. For both controller- and sensor/actuator-initiated service flows, upstream and downstream transactions usually occur asynchronously Second Example—Local UAV Collaboration and Connectivity (5.1.2.4 of 3GPP TR 22.862): Unmanned Aerial Vehicles (UAVs) can collaborate to act as a mobile sensor and actuator network to execute tasks in uncertain and dynamic environments while being controlled by a single user, as illustrated in FIG. 10. Accuracy in sensing tasks is increased when deploying a team of UAVs versus just one as there are multiple vantage points using multiple sensors. Examples of uses for deploying a team of UAVs include: Searching for an intruder or suspect, Continual monitoring of natural disasters, Performing autonomous mapping, and Collaborative manipulation of an object (e.g., picking up corners of a net.), depicts how communication occurs in UAV local vehicle collaboration and connectivity. Both node to node and UAV to mobile network links are required Example of eMBB Applications:

First Example—Office scenario with High Data Rate Applications (5.1.2 of 3GPP TR 22.862): In an office scenario with high data rate needs, users uses real-time video meeting and frequently upload and download data from company's servers and they are various in size. The productivity is dependent on the efficiency of the system response time and reliability. Dependent on time of day (e.g., morning, evening, weekday vs. weekend etc.) and the location (e.g., shopping mall, downtown street), user expects multi-media traffic upload and download towards internet as well as D2D communications.

Second Example—Office scenario with Higher Density of Connections (5.2.1 of 3GPP TR 22.862): This family covers scenarios with system requirement for the transport of high volume of data traffic per area (traffic density) or transport of data for high number of connections (connection density). One typical scenario enable users to upload and download a very high volume of data from servers, handle high resolution real-time video conferences, etc., while end-users can be under indoor or outdoor and in a densely populated area but with no high mobility needs i.e. up to 60 km/h in urban vehicular. In a hotspot scenario with high user density, depending on time of day (e.g., morning, evening, weekday vs. weekend etc.) and the location (e.g., pedestrians in shopping mall, downtown street, stadium, users in buses in dense city centre), there could be high volume and high capacity multi-media traffic upload and download towards internet. Users can be either indoor or outdoor. Meanwhile when a user is indoors, it is either stationary or nomadic; however, when a user is outdoor it may travel slowly up to 60 km/h. Mobile broadband scenario is to be provided even when terminals enter areas with a high traffic density.

5G Requirements:

3GPP TR 38.913 defines scenarios and requirements for next generation access technologies. The following are excerpts of the Key Performance Indicators (KPI) section of 3GPP TR 38.913 that impose new requirements that are relevant to the light signaling connection topic.

7.17 Connection Density and the need to reduce potential signaling storm: Connection density refers to total number of devices fulfilling specific QoS per unit area (per km2). QoS definition should take into account the amount of data or access request generated within a time t_gen that can be sent or received within a given time, t_sendrx, with x % probability. The target for connection density should be 1 000 000 device/km2 in urban environment. 3GPP should develop standards with means of high connection efficiency (measured as supported number of devices per TRP per unit frequency resource) to achieve the desired connection density.

7.4 Control plane latency: Control plane latency refers to the time to move from a battery efficient state (e.g., IDLE) to start of continuous data transfer (e.g., ACTIVE). The target for control plane latency should be [10 ms].

7.11 UE battery life: UE battery life can be evaluated by the battery life of the UE without recharge. For mMTC, UE battery life in extreme coverage shall be based on the activity of mobile originated data transfer consisting of [200 bytes] UL per day followed by [20 bytes] DL from MCL of [tbd] dB, assuming a stored energy capacity of [5 Wh]. The target for UE battery life should be [10 years].

7.19 Network energy efficiency: The capability is to minimize the RAN energy consumption while providing a much better area traffic capacity. Qualitative KPI as baseline and quantitative KPI is FFS.

7.1 Peak data rate: Peak data rate is the highest theoretical data rate which is the received data bits assuming error-free conditions assignable to a single mobile station, when all assignable radio resources for the corresponding link direction are utilised (i.e., excluding radio resources that are used for physical layer synchronisation, reference signals or pilots, guard bands and guard times). The target for peak data rate should be [20 Gbps] for downlink and [10 Gbps] for uplink.

Network Slicing:

FIG. 11 provides a high level illustration of the concept of network slicing. A network slice is composed of a collection of logical network functions that supports the communication service requirements of particular use case(s). It shall be possible to direct terminals to selected slices in a way that fulfil operator or user needs, e.g., based on subscription or terminal type. The network slicing primarily targets a partition of the core network, but it is not excluded that Radio Access Network (RAN) may need specific functionality to support multiple slices or even partitioning of resources for different network slices. See 3GPP TR 22.891 Feasibility Study on New Services and Markets Technology Enablers (SMARTER); Stage 1 (Release 14) V-1.1.0. (example).

Potential network slicing service requirements defined in 3GPP TR 22.891: 1) The 3GPP System shall allow the operator to compose network slices, i.e. independent sets of network functions (e.g., potentially from different vendors) and parameter configurations, e.g., for hosting multiple enterprises or Mobile virtual network operators (MVNOs) etc.; 2) The operator shall be able to dynamically create network slice to form a complete, autonomous and fully operational network customised to cater for different diverse market scenarios; 3) The 3GPP System shall be able to identify certain terminals and subscribers to be associated with a particular network slice; 4) The 3GPP System shall be able to enable a UE to obtain service from a specific network slice e.g., based on subscription or terminal type.

Potential Network Slicing Operational Requirements defined in 3GPP TR 22.891 include:

The operator shall be able to create and manage network slices that fulfil required criteria for different market scenarios.

The operator shall be able to operate different network slices in parallel with isolation that e.g., prevents data communication in one slice to negatively impact services in other slices.

The 3GPP System shall have the capability to conform to service-specific security assurance requirements in a single network slice, rather than the whole network.

The 3GPP System shall have the capability to provide a level of isolation between network slices which confines a potential cyber-attack to a single network slice.

The operator shall be able to authorize third parties to create, manage a network slice configuration (e.g., scale slices) via suitable Application Program Interfaces (APIs), within the limits set by the network operator.

The 3GPP system shall support elasticity of network slice in term of capacity with no impact on the services of this slice or other slices.

The 3GPP system shall be able to change the slices with minimal impact on the ongoing subscriber's services served by other slices, i.e. new network slice addition, removal of existing network slice, or update of network slice functions or configuration.

The 3GPP System shall be able to support End to End (E2E), e.g., RAN, Core Network (CN), resource management for a network slice.

Proposals for Small Data Transmission:

RRC Inactive and RRC Connected States have been proposed in S2-161323, as shown in FIG. 12. In S2-161324, a Mobility Framework was proposed as illustrated in FIG. 13.

Requirements Versus the Current State of Art:

The current design for LTE (Rel-12) is not efficient in term of the transition to the RRC-CONNECTED state so a small amount of data can be transmitted or in terms of scalability to support a large number of devices that generate frequent small volumes of data. For frequent small burst transmission, the device wakes up and sends data every few minutes. For the normal procedure, a UE may need to follow the RACH procedure and subsequently establish signaling radio bearers (through RRC connection establishment procedure) and data radio bearers (through RRC Connection reconfiguration procedure). As illustrated in the overall legacy procedure in FIG. 14, the signaling overhead is substantial when considering only a small amount of data is transmitted in the uplink. This is situation is expected to be worst in light of 5G system diverse use cases and traffic profiles.

One key issue identified in the Rel-13 study item as captured in the 3GPP TR 23.720 is the support of infrequent small data transmission for Cellular IoT. This key issue aims to provide solution to support highly efficient handling of infrequent small data transmissions for ultra-low complexity, power constrained, and low data-rate 'Internet of Things' devices, called CIoT devices. In 5G systems, it is expected that the number of such devices will increase exponentially but the data size per device and per data transmission event will remain small. Infrequent small data traffic characteristics for MTC applications (as described in Annex E of 3GPP TR 45.820 Cellular system support for ultra-low complexity and low throughput Internet of Things (CIoT) (Release 13), V13.1.0) may lead to inefficient use of resources in the 3GPP system. Another key issue identified in 3GPP TR 23.720 Study on architecture enhancements for Cellular Internet of Things, V13.0.0 is to provide efficient support of tracking devices using small data transmission for Cellular IoT. This key issue aims to provide solution to support highly efficient handling of tracking devices using small data transmissions for ultra-low complexity, power constrained, and low data-rate 'Internet of Things' devices, called CIoT devices. It should be noted that excessive signaling will also lead to additional latency and additional power consumption.

Rel-13 LTE has specified two solutions to further reduce signaling overhead for small data transmissions. One solution (Solution 2 in 3GPP TR 23.720), called the control plane (CP) solution, transfers user data between the UE and the core network as a NAS Protocol Data Unit (PDU). The second solution (Solution 18 in 3GPP TR 23.720) allows an RRC Connection to be suspended and at a later time resumed; minimizing the need to go through the full signaling procedure for IDLE to CONNECTED state transition. The solution is applicable both to normal LTE UEs and IOT UEs and is based on enhancements to the IDLE state to make it possible to resume the RRC connection avoiding the need to setup it up again when the UE returns from IDLE, assuming that most of the times the UE returns in a node which has the stored RRC context. The procedure is illustrated in FIG. 15 and FIG. 16.

These release 13 solutions are still suboptimal with many drawbacks:

After RRC connection is suspended,
  The UE transitioned to NAS EMC-IDLE state and therefore no longer has NAS signaling connection. S1 connection is also released. This means signaling overhead both over the air, between the radio access network (RAN) and the core network (CN) as well as within the CN (e.g. between MME and SGW and between SGW and PGW) at the resumption of the RRC connection.
  The UE also transitioned to RRC-IDLE state and the execution of a full random access procedure is assumed before the RRC connection is resumed. There is still need to be exchange of RRC Connection Resume/RRC Connection Resume Complete messages with the eNB in order to resume RRC connection.
  Only partial access stratum (AS) context is stored which will cause additional signaling overhead to reconfigure the UE after RRC is resumed.
  The storage of the AS context in eNB and the storage of non-access stratum context in the core network (MME, SGW and PGW) implies increase storage capacity on both the radio access network and the core network. With an expected density of a million mMTC devices per kilometer square, it is expected that the number of devices in suspended RRC-CONNECTED state per core network node (e.g. MME) and per cell could be quite large in 5G system when compare to the existing LTE system, even if one assume a dense deployment of cells and core network nodes as there is a non-negligible capex and opex deployment cost for the operators. A solution that mainly rely on context storage of large number of devices in the network might not be cost efficient in the context of 5G system
  Support for mobility is limited i.e. UE context retrieval is possible only in case X2 interface between source eNB and target eNB is available. If no X2 interface is available, then Signaling Radio Bearers (SRBs) and Data Radio Bearers (DRBs) must be reestablished using the legacy procedure. Furthermore, the contexts stored in the source eNB and even in the core network nodes will have to be cleared through some proprietary implementation means.

For the first access or anytime the UE has no stored context, it is assumed the legacy RRC Connection establishment procedures (request/response) is used. It should also be noted that the legacy RRC connection establishment procedure is uni-cast transmission based procedure. All of these lead to scalability issue in the context of massive mMTC deployment scenarios anticipated for 5G systems.

The solution does not allow efficient control of UE state transition by the RAN (e.g. eNB), and does not take into account traffic mix and UE mobility due to UE tracking based on NAS tracking area (TA) and UE paging based on NAS DRX configuration. The solution suffers the same limitations as the existing approaches in the prior 3GPP releases where the control of UE state transition between idle mode and connected mode is based on the use of inactivity timer in the eNB. In this approach, the eNB monitor through proprietary methods, traffic activity. When there is no traffic activity according to proprietary configuration and threshold settings for traffic activity detection, the eNB request the core network, specifically the eNB to release the S1 signaling connection. The eNB also releases the RRC signaling connection. NAS signaling connection is also released by the MME and the UE. The effectiveness of this approach depends on the ability of the eNB to clearly configure traffic activity detection, and set the inactivity timer to the right value taking into account various factors such as the traffic type, the UE mobility level, the targeted user experience level, etc. Furthermore, in an ideal solution, the inactivity timer value should be adjusted dynamically. It has been observed in LTE networks that inactivity timers are typically configured to be quite short (down to 10-20 seconds) which leads to a high amount of transitions from RRC_IDLE to RRC_CONNECTED. This state transition is quite costly in terms of signaling considering that the majority of the RRC connections in LTE transfer less than 1 Kbyte of data to then move back to RRC_IDLE. Similarly, non-optimal configuration of Rel-13 NB-IOT solutions will limit the applicability of these solutions, and even the limited anticipated signaling overhead reduction with the use of this solution might not be realized.

The next generation of wireless communication systems are expected to support a wide range of use cases with varying requirements ranging from fully mobile devices to stationary IOT or fixed wireless broadband devices. The traffic pattern associated with many use cases is expected to consist of short or long bursts of data traffic with varying length of waiting period in between.

The drawbacks of Rel-13 NB-IOT solutions listed above highlight the need for further enhancements to the handling of small and infrequent data transmission, and not just for stationary NB-IoT/mMTC devices but also for all UEs that are mobile. More specifically: 1) The current signaling overhead for small and infrequent data transmissions is still too prohibitive and needs to be reduced further in order to meet 5G requirements of signaling storm reduction and spectrum efficiency by 3 times over IMT-Advanced; 2) Increased storage of AS and NAS context in the network implies increased network Capex and Opex which negatively impacts the requirement to minimize 5G network deployment and operational costs; 3) Excessive signaling also leads to additional latency. The current RRC connection setup latency (i.e. 120 ms for mobile originated calls and 280 ms for mobile terminated calls, see RP-160301) still need to be further reduced to improve the end user experience and meet 5G requirement on control plane latency which could be 10 ms or less for some of the use cases (e.g. Ultra Reliable and Low latency applications); and 4) Excessive signaling also leads to additional UE power consumption and additional network energy consumption and will negatively impact the ability of the system to meet the UE Battery Life requirements of 10 years defined in section 7.11 of 3GPP TR 38.913 and the Network Energy Efficiency requirements defined in section 7.19 of 3GPP TR 38.913.

New proposals for enhancement to small data transmission handling, aimed specifically at further reducing signaling overhead and addressed the above identified drawbacks of the Rel-13 NB-IOT solutions are emerging. Various high level solution ideas are already being proposed in the context of 5G discussion for e.g., in 3GPP System Aspects Working Group 2 (SA WG2 or simply SA2), High level ideas that are being proposed for further explorations include: 1) Further reduce NAS signaling and signaling to CN over S1 interface due to mobility and idle/active transition by further developing the following ideas: a) Re-use the Rel-13 suspend/resume solution with UE context stored while the UE is in RRC_IDLE or create a new UE-controlled mobility based RRC-CONNECTED state but hide such suspend/resume state or any such new intermediary state from the core network; b) RAN originated paging message; and c) Use Anchor/Gateway function in RAN to allow context fetch upon cell reselection and data reforwarding. Other ideas include: 2) Further enhancements to allow RAN to choose optimum parameters such as flexibility for RAN to control UE specific tracking area that could be different than core network based tracking area; and 3) Further enhancements to allow RAN to choose optimum parameters such as flexibility for RAN to adjust DRX parameters applicable in lightly connected state (e.g. UE controlled mobility connected state) for example allows RAN to optimize DRX taking into account UE's current data QoS Requirements.

SUMMARY

Disclosed herein are methods, systems, and devices that may assist in reducing signaling load that may occur based on paging and handover. Particularly, disclosed herein are new UE states, a radio access network registration area (RRA) or tracking/paging area with different architectural approaches (e.g., hierarchical and distributed), dynamic RRA management, radio access network based paging, and radio access network based user equipment (UE) mobility management.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

As discussed in the background, solutions have been proposed in LTE release 13 in the context of NB-IOT (e.g., Solution 2 and Solution 18) to reduce RRC Connection Setup and subsequent RRC reconfigurations signaling load, but more efficient solutions are desired. The reduction of mobility related signaling load, as discussed herein (e.g., paging and handover), may assist in implementing 5G systems that meet desired requirements, such as signaling load reduction despite significant increase in connection density, very low control plane latency, extended UE battery life, or increased network energy so as to minimize CapEx and OpEx, among other thing.

Figure 1:
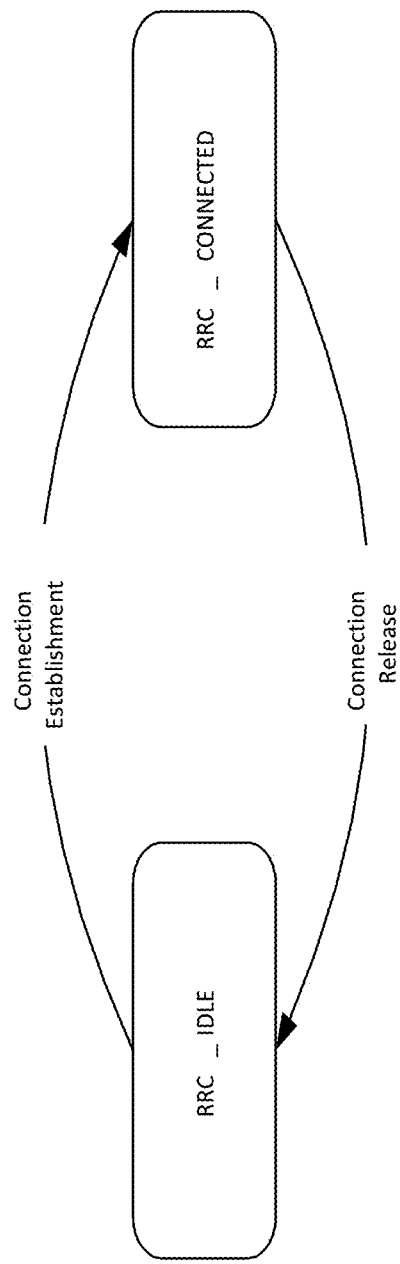
FIG. 1 illustrates an exemplary RRC Protocol State Machine.
Figure 2:
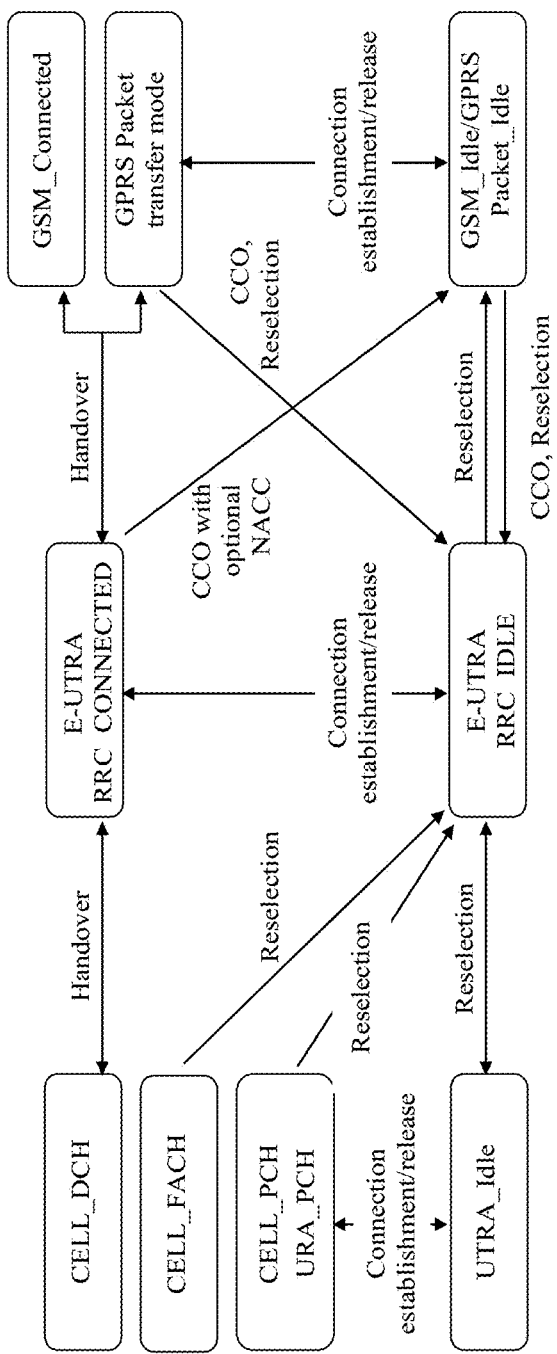
FIG. 2 illustrates an exemplary E-UTRA states and inter RAT mobility procedures.
Figure 3:
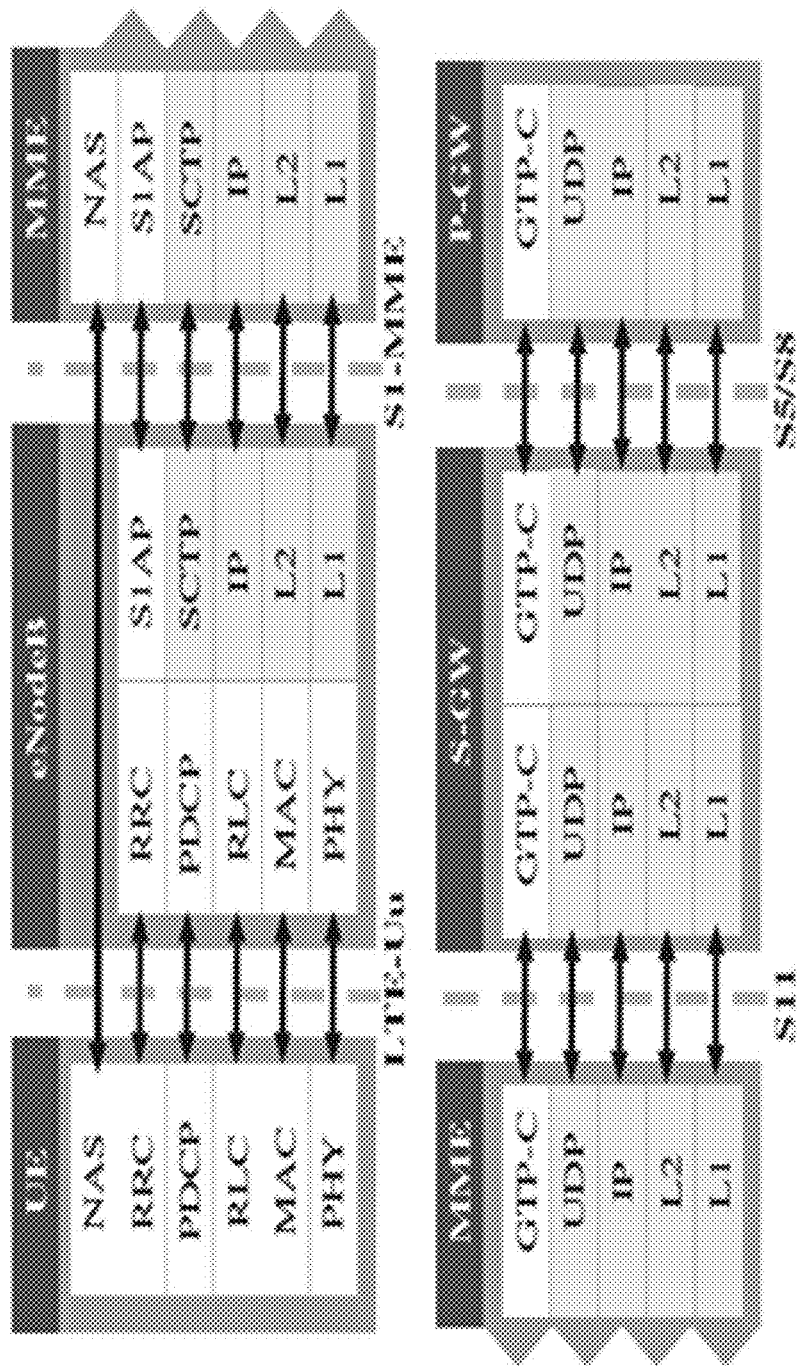
FIG. 3 illustrates an exemplary Control plane protocol stack in EPS.
Figure 4:
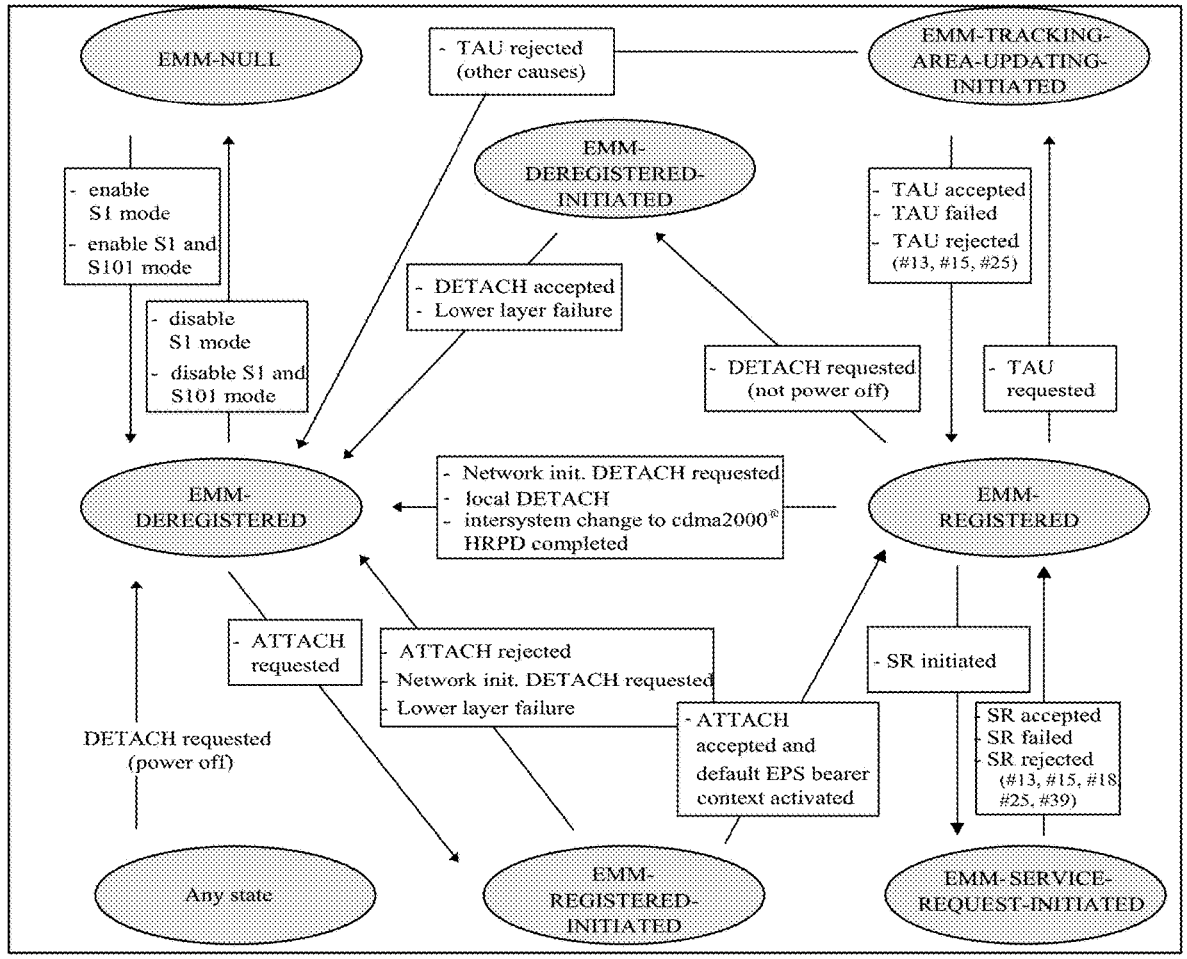
FIG. 4 illustrates an exemplary EMM Main State in the UE.
Figure 5:
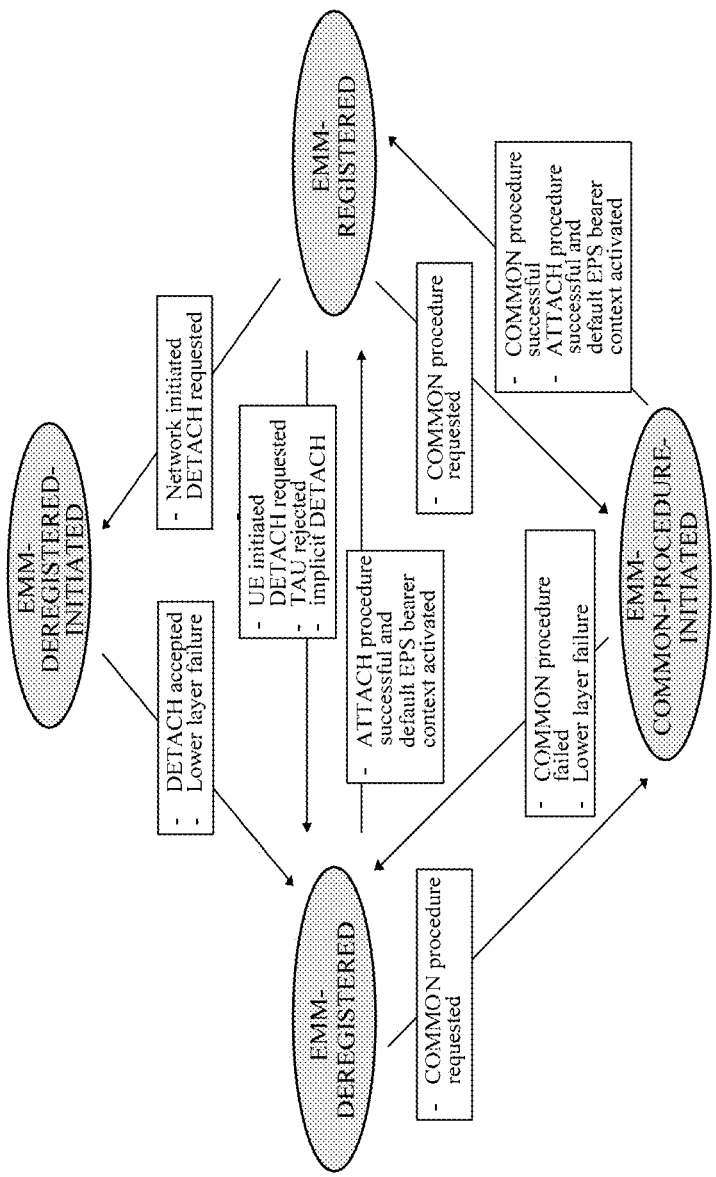
FIG. 5 illustrates an exemplary EMM main States in the MME.
Figure 6:
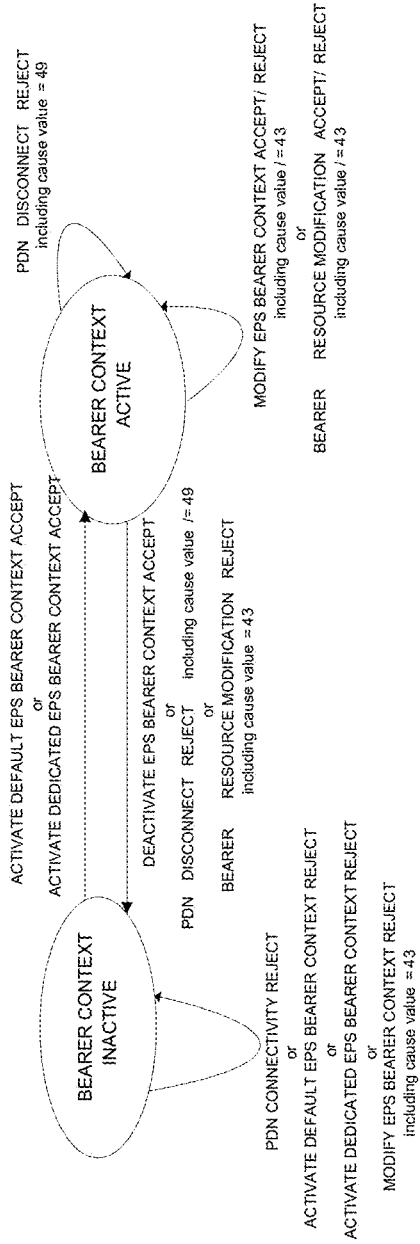
FIG. 6 illustrates exemplary ESM sublayer states for EPS bearer context handling in the UE (overview)
Figure 7:
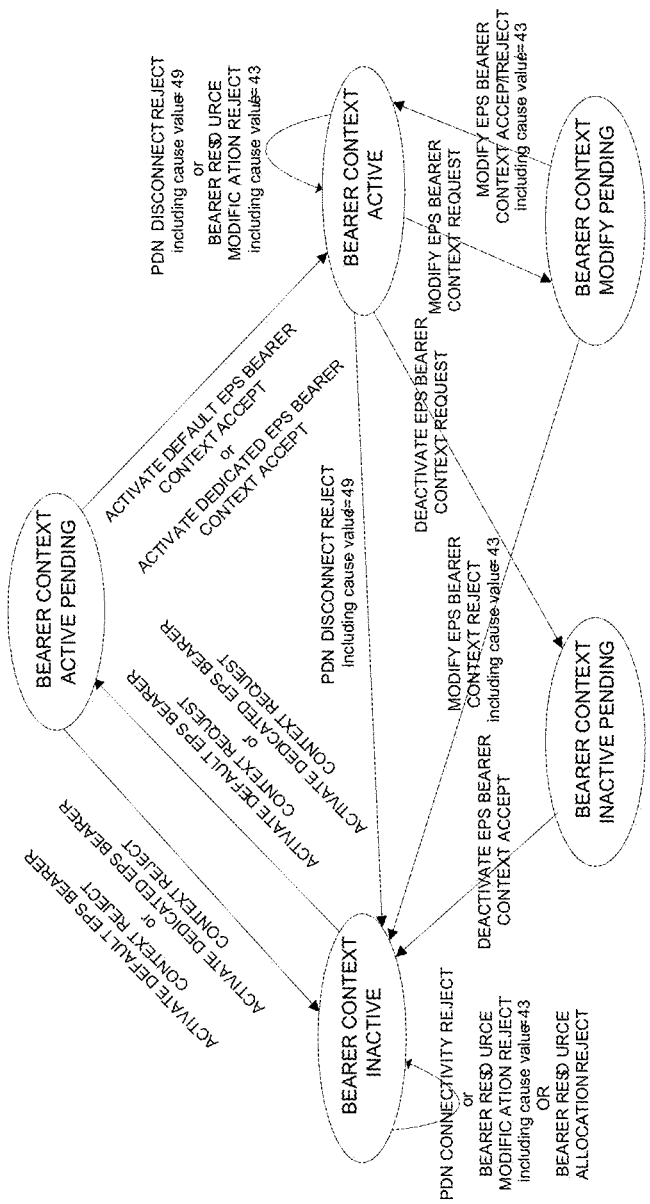
FIG. 7 illustrates exemplary ESM sublayer states for EPS bearer context handling in the network (overview)
Figure 8:
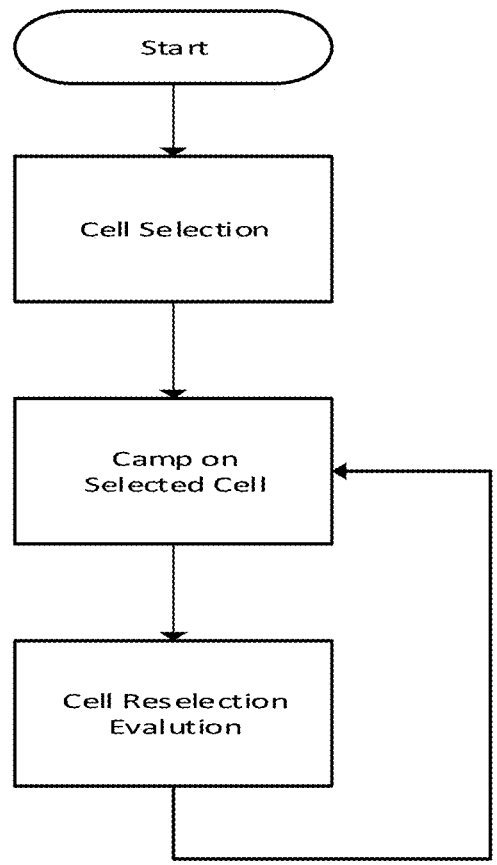
FIG. 8 illustrates an exemplary Flow Chart for Cell Selection and Reselection Processing in RRC_IDLE.
Figure 9:
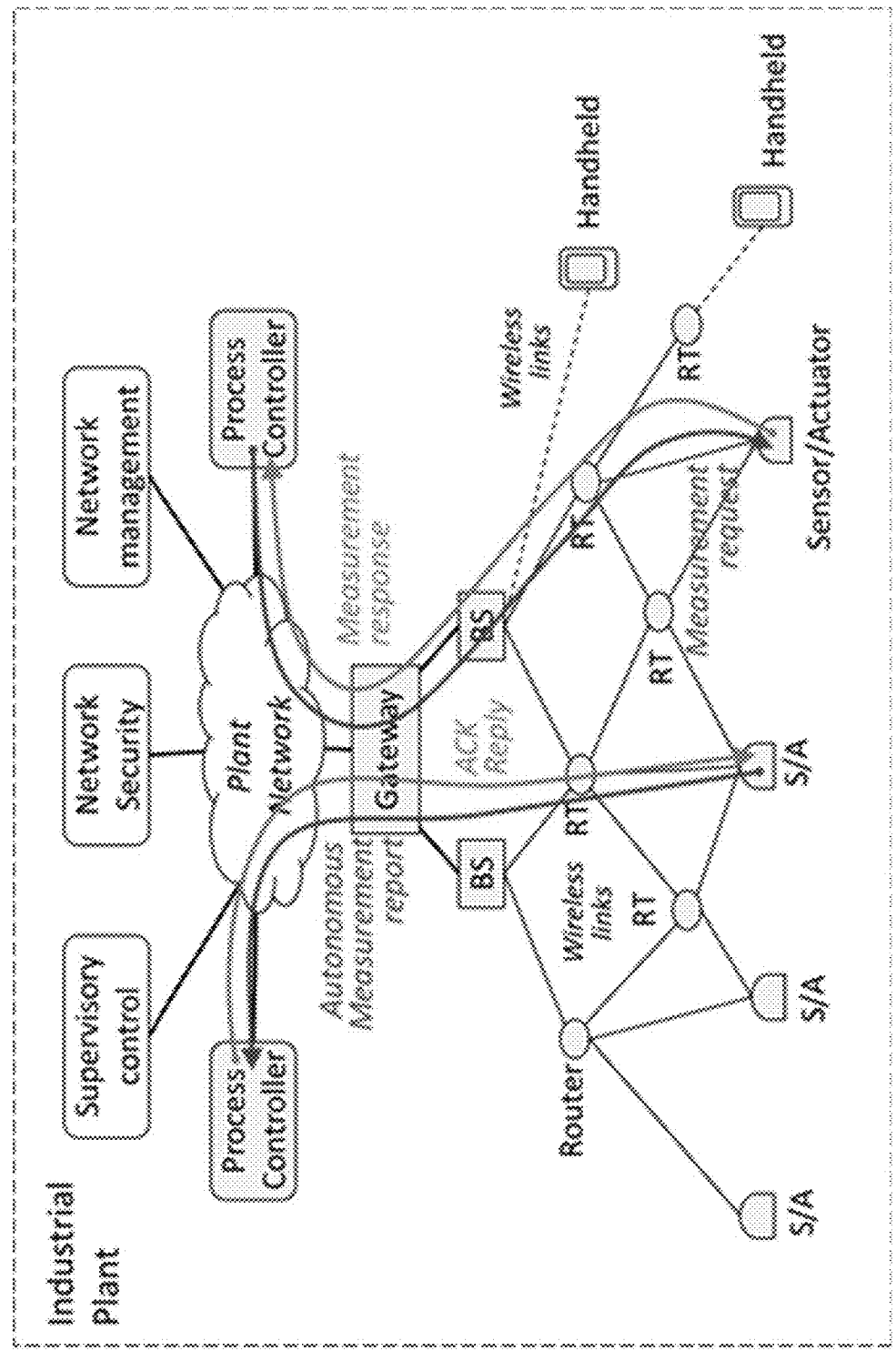
FIG. 9 illustrates an exemplary Communication path for service flows between process controllers and sensor/actuator devices.
Figure 10:
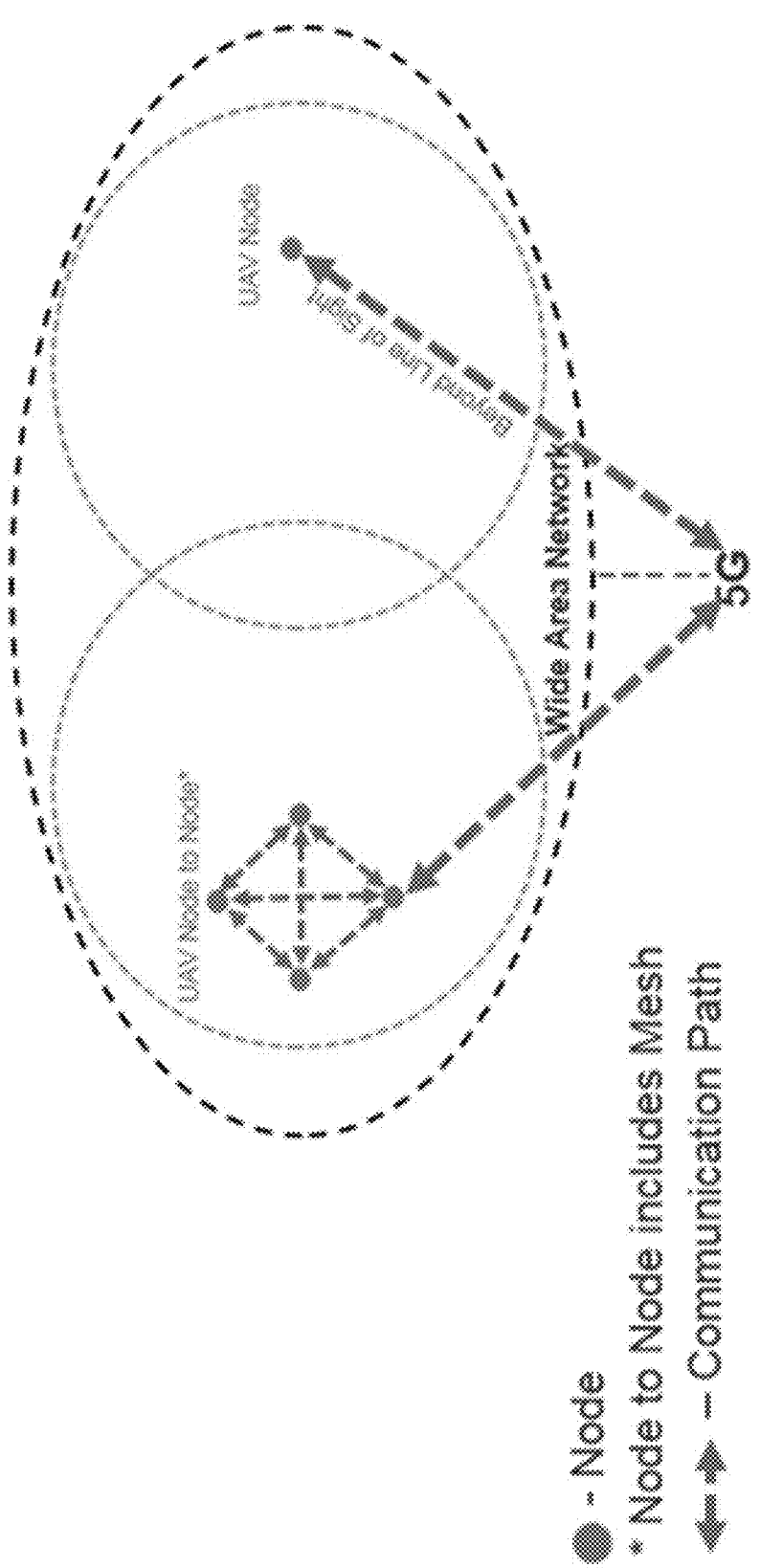
FIG. 10 illustrates an exemplary UAV Communications Path.
Figure 11:
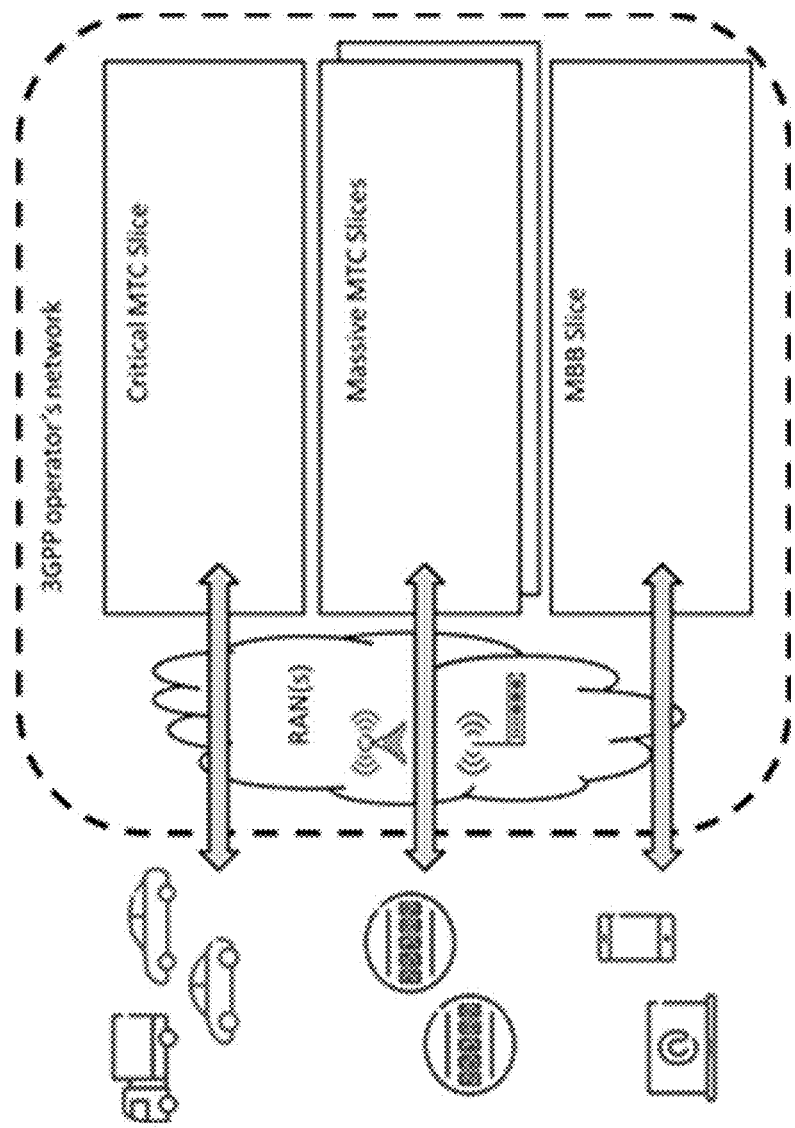
FIG. 11 illustrates an exemplary Network Slicing Concept.
Figure 12:
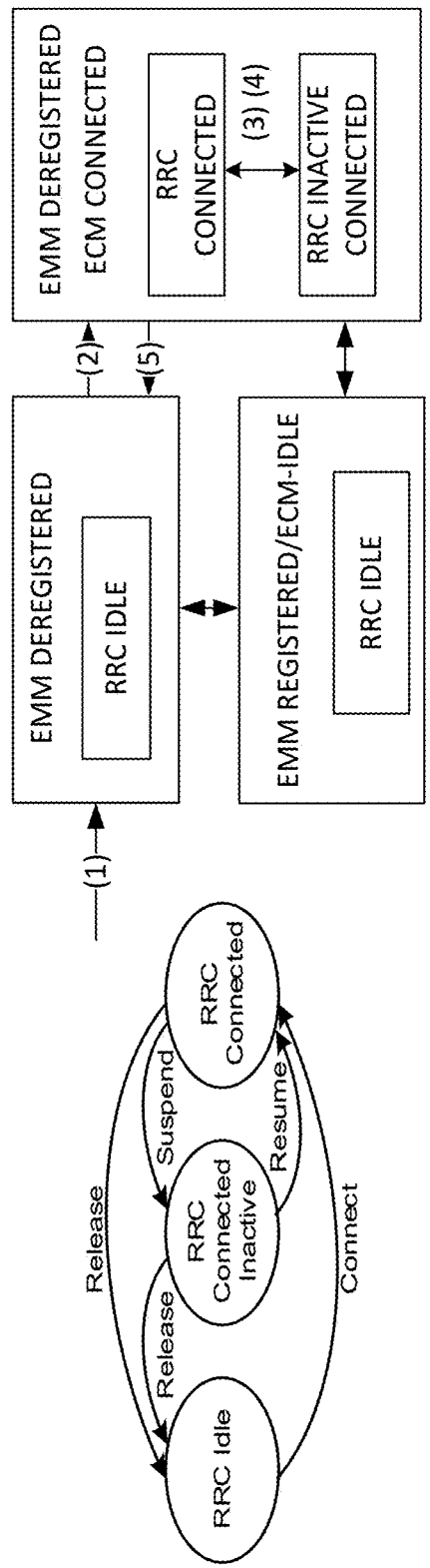
FIG. 12 illustrates an exemplary RRC Idle, RRC Inactive and RRC Connected States.
Figure 13:
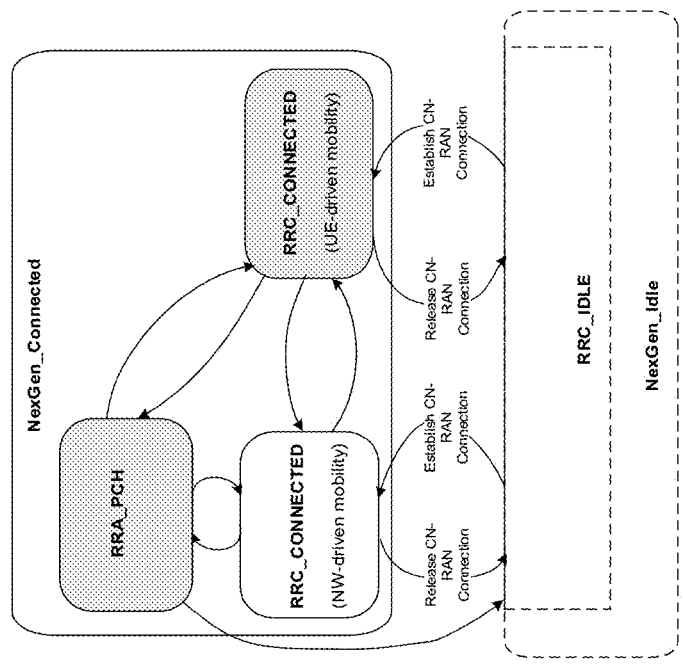
FIG. 13 illustrates an exemplary UE Controlled Mobility at RRC-Connected State.
Figure 13:
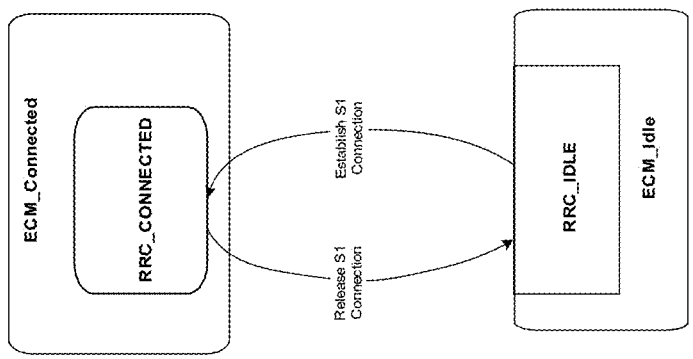
Figure 14:
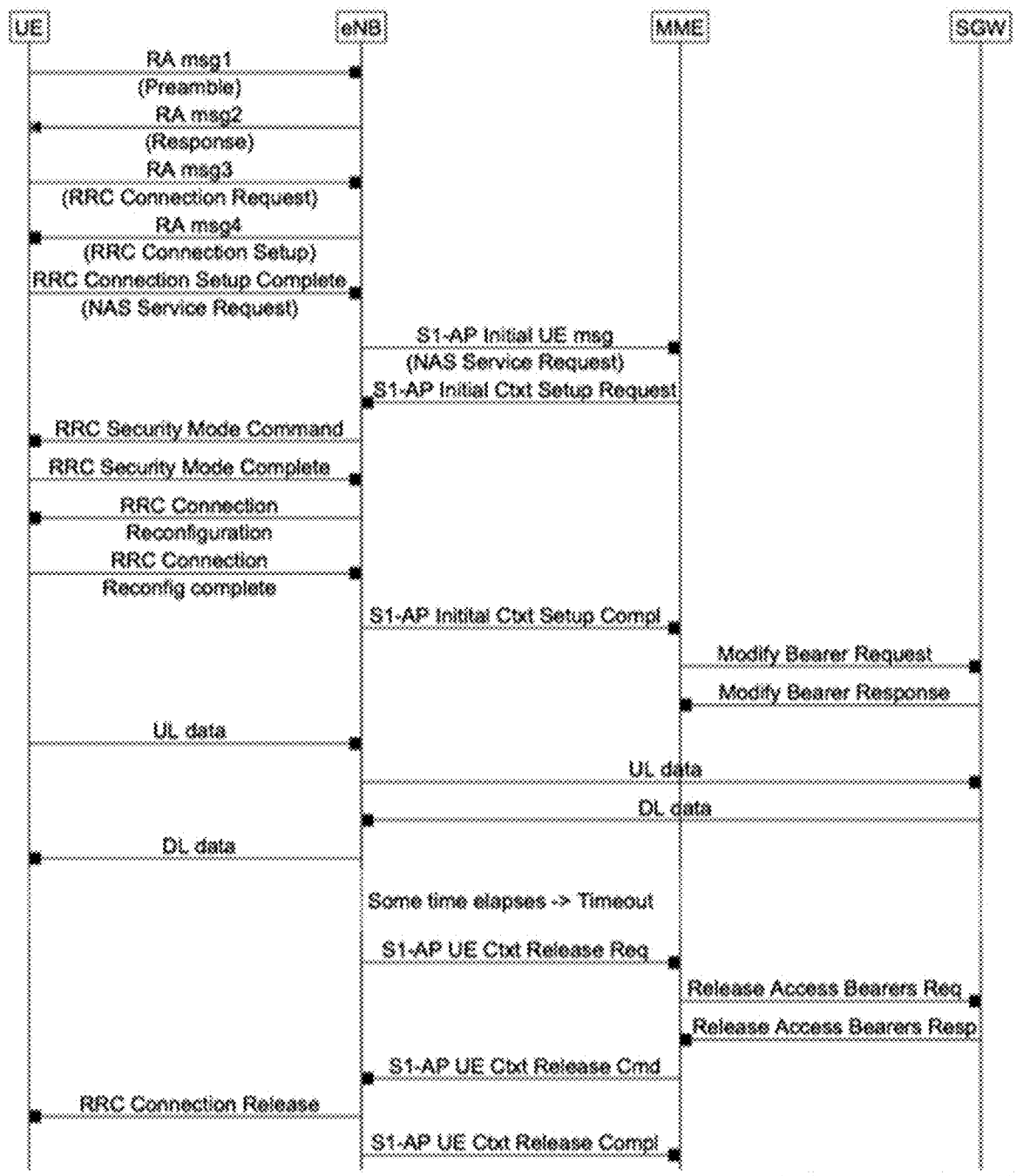
FIG. 14 illustrates an exemplary Legacy Procedure for SRB and DRB Setup.
Figure 15:
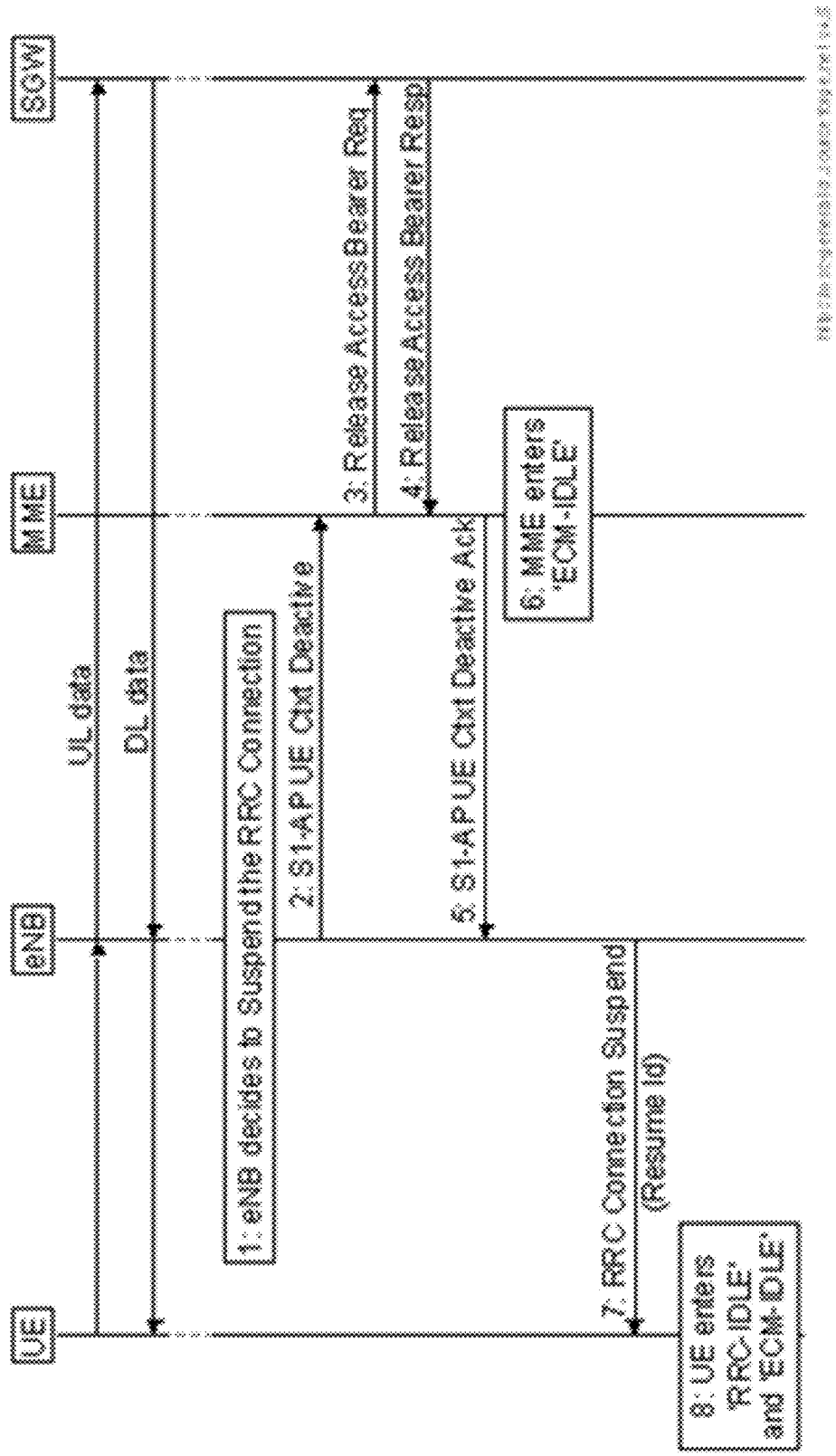
FIG. 15 illustrates an exemplary Suspension of a RRC Connection.
Figure 16:
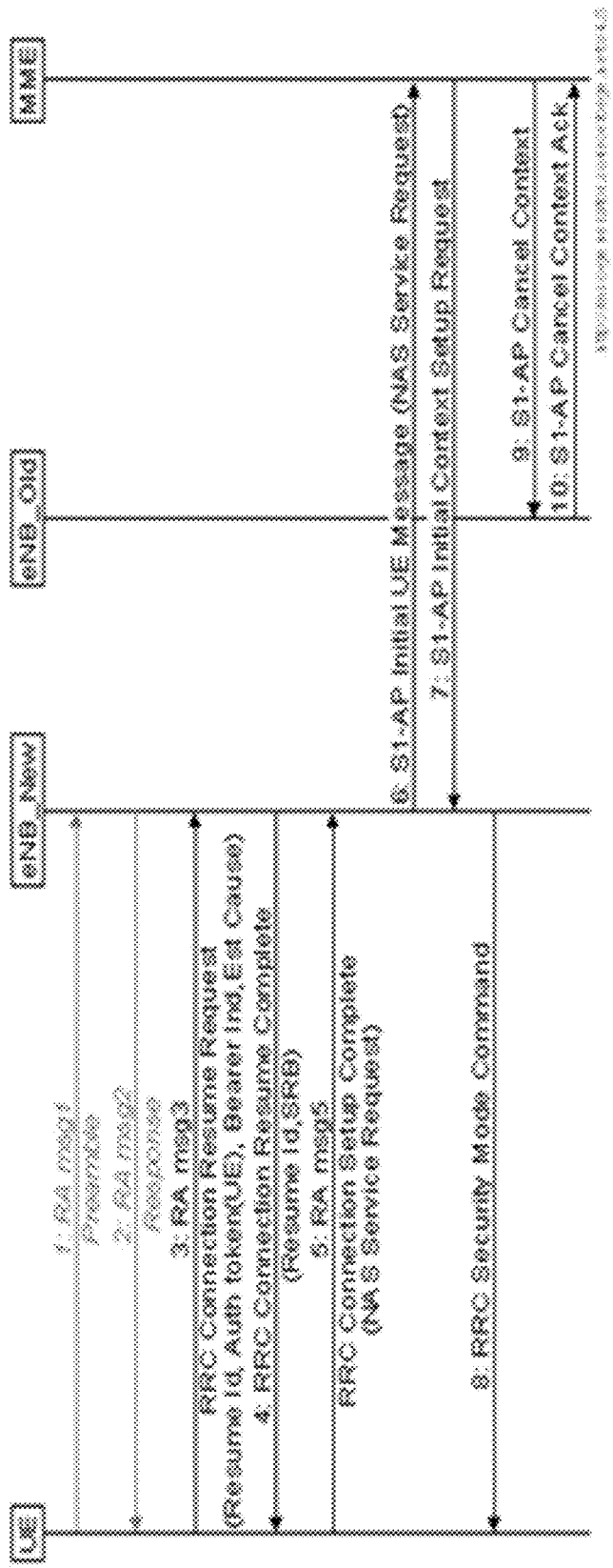
FIG. 16 illustrates an exemplary Resumption of a Previously Suspended RRC Connection (MO case)
Figure 17:
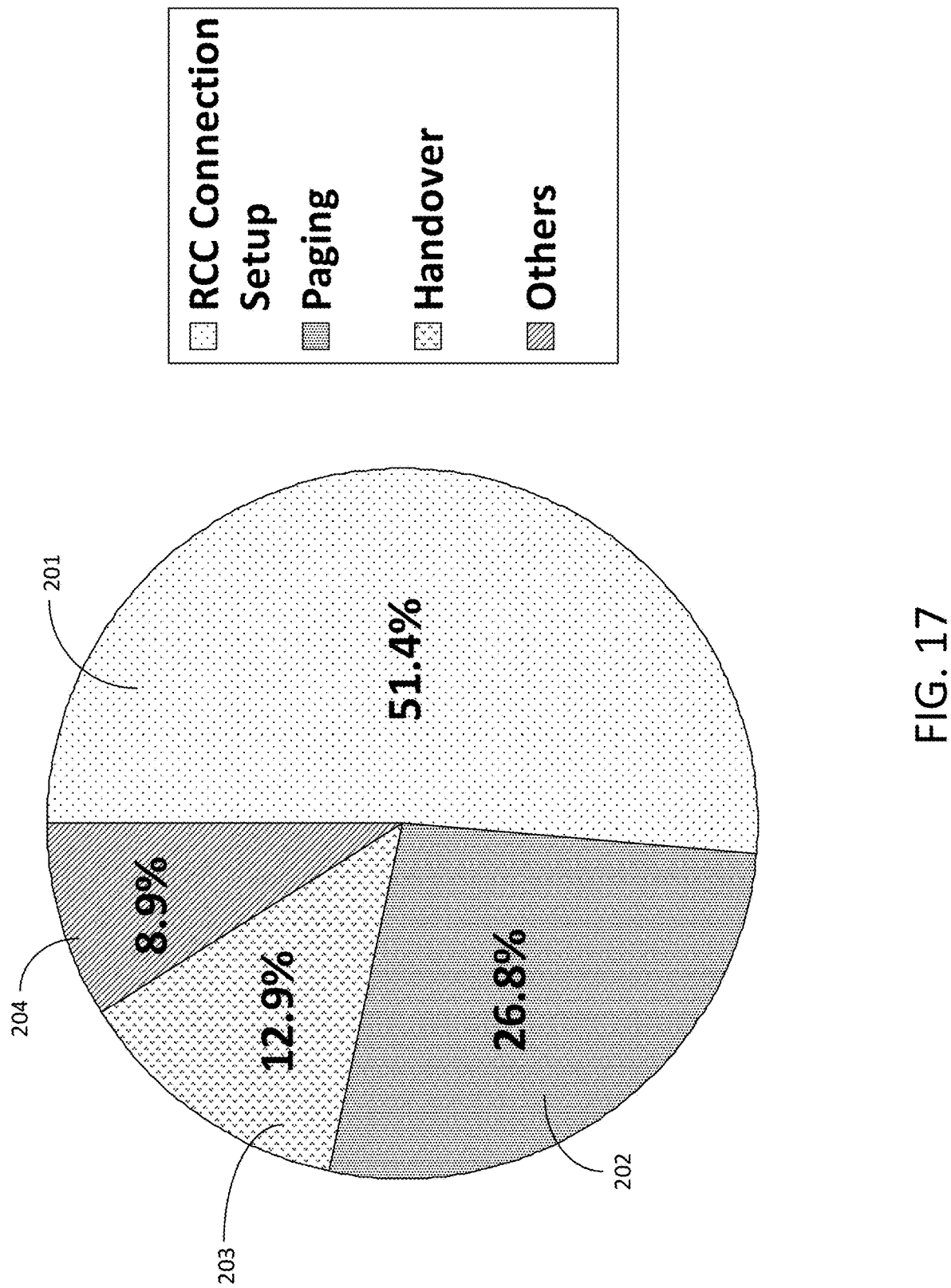
FIG. 17 illustrates an exemplary RRC Signaling statistics collected in several live LTE network (RP-160301)

FIG. 17 illustrates RRC Signaling statistics collected in LTE networks. As shown, wedge 201, which is RRC connection setup, corresponds to 51.4 percent of signaling load. While wedge 202 (paging) accounts for 26.8 percent of signaling, wedge 203 (handover) accounts for 12.9 percent of signaling, and wedge 204 (other) accounts for 8.9 percent of signaling. Disclosed herein are methods, systems, and devices that may assist in reducing signaling load that may occur based on paging and handover. Particularly, disclosed herein are new UE states, a radio access network registration area (RRA) or tracking/paging area with different architectural approaches (e.g., hierarchical and distributed), dynamic RRA management, radio access network based paging, and radio access network based user equipment (UE) mobility management. Dynamic RRA management may include RRA creation initiated by a network or mobile management entity (MME) or RRA removal initiated by a network or MME. Radio access network based paging may include core network info paging, emergency message broadcast paging, downlink (DL) UE emergency message paging, or DL UE data paging. Lastly radio access network based UE mobility management may include a serving RRA node (SRRAN) initiated handover within its RRA or UE initiated handover across RRAs in local area.

Discussed below are new UE states and state transitions for the Radio Resource Control (RRC) protocol. As discussed below, the term data radio bearer (DRB) is used in a broader sense to denote a data path in the user plane, such as a data path at an IP flow level. Similarly, the term Signaling Radio Bearer (SRB) is used to denote signaling path in the control plane. In addition, it is contemplated that targeted scenarios may involve some level of mobility or the UE may be at the cell Edge with some level of variability in the received signal level and therefore the UE may perform cell reselection to a more suitable cell. The new states discussed herein may be defined to UE light signaling connection or UE operation in connectionless mode. A framework of a distributed UE location registration area between the core network and the RAN is proposed.

Figure 18A:
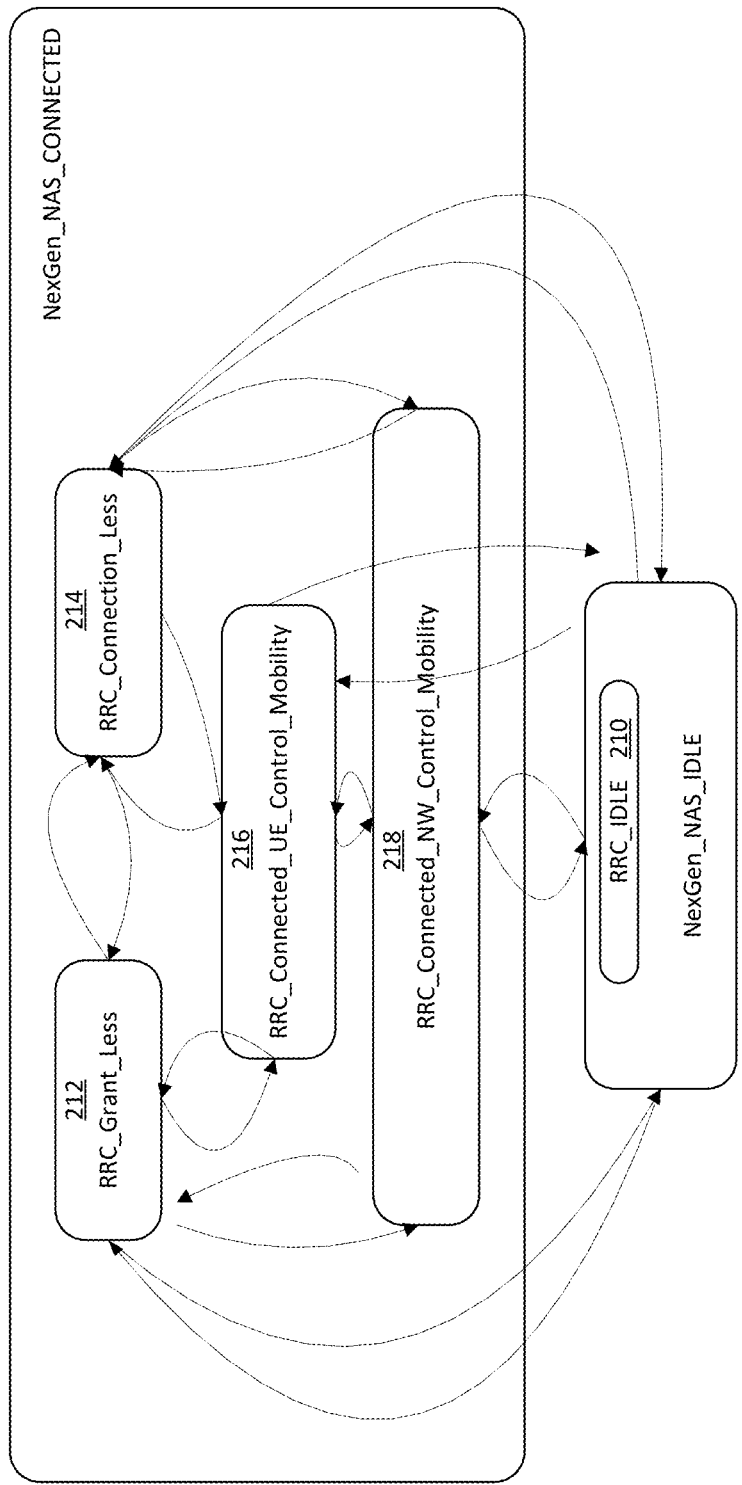
FIG. 18A illustrates exemplary New UE States and State Transitions.

FIG. 18A illustrates the new UE states and state transitions. In the RRC_IDLE state 210, the UE monitors neighbor cells, perform cell reselection based on thresholds broadcasted by the NW, monitors paging messages and system information broadcast. In RRC_IDLE state 210, there is no Uplink user data transmission and the UE may perform discontinuous reception (DRX) in downlink. In RRC_IDLE state 210, the UE location may not be known to the radio access network, however the UE location may be known to the core network at the core network tracking area or location registration area level (e.g., when the UE is reachable by the core network).

A device maybe configured not to perform paging monitoring during RRC_IDLE state 210. For example, a device (e.g., mMTC device) with Mobile Originating (MO) only call capability may be configured not to perform paging monitoring. Similarly, a device with Mobile Termination (MT) only call capability may be configured to not perform paging monitoring, if the MT calls occurrence are expected to be rare (e.g., a device who is expected to receive MT calls at most once in several days e.g. a week, or a month, or a longer period of time). Instead, the device may be configured to query the network. This may be viewed as a reversed-paging where the UE (e.g., UE 228 or UE 229) paged the network for potential awaiting messages in the NW. The device queries the network for potentially awaiting messages. Such query might be periodic, according to a configurable period. The UE may perform a reversed-paging using a light signaling connection to transition to one of the defined connected modes or states where a communication with the network is possible. Alternatively, the UE may perform a reversed-paging at the physical layer level using a physical channel signal defined for reverse-paging. Such physical channel may follow a grant-less communication model. The UE may perform carrier sensing or listen-before-talk to gain access to the reverse-paging grant-less physical channel. Once paged, the network can then decide to order the UE transition from idle mode to a connected mode. Alternatively, the UE may remain in idle mode. After the transmission of a reverse paging message, the UE may enter a reverse-paging monitoring mode or sub-state of RRC_IDLE state 210 where the UE monitors the network response for a configurable or pre-defined or specified amount of time. If no network response is received, the UE ends NW response monitoring and remains in RRC_IDLE state 210. The response to the reverse-paging signal may also be carried on a reverse-paging physical channel. The UE monitors such channel for the network response to an earlier reverse-paging message sent by the UE. This device behavior in RRC_IDLE state 210 may also be specified as a function of the device category.

A device may also be configured not to monitor system information broadcast in RRC-IDLE. This behavior may also be specified as a function of the device category or as a result of the device capability known to the network or exchanged between the UE and the network for example in a prior session. A device that doesn't monitor system information may acquire a very small set of essential system information, as discussed herein. Once the device accesses the network, it may acquire other system information required for normal operation, e.g., device operation in one of the connected mode, if the UE transitions to a connected state. Alternatively, there may be system information update schedule (e.g. dates for system information update by the network) known to the UE. The UE may be pre-provisioned with such information. The network may use an Over-The-Air (OTA) pre-provisioning method to pre-provision the system information update schedule onto the UE. Alternatively, the operator or service provider may store such information on the USIM/UICC of the UE, for e.g. in the factory before the user takes possession of the UE. In such case, the UE may not monitor system information. The UE may use the system information schedule to decide on whether or not the UE should read system information (e.g., essential system information) before accessing the network, or whether the UE uses the already stored system information. The NW may also signal the system information only on a predefined schedule.

RRC_IDLE state 210 may map to NAS idle state (e.g., ECM_IDLE). In some instances, where the UE is reconfigured to RRC_IDLE 210 without the core network being aware of it, the RRC_IDLE state 210 may be mapped to ECM_CONNECTED state or the equivalent 5G NAS state.

RRC_Grant_Less state 212 is a connected state. In a first scenario, RRC context exists but no signaling connection (dedicated or common) exists, no resources are allocated for it, no data radio bearer (DRB) connection exists, and DRB cannot be established in this state. RRC_Grant_Less state 212 is similar to RRC_IDLE state 210 in the sense that it has the attributes of RRC_IDLE state 210 described above. A difference with RRC_IDLE state is that for RRC_Grant_Less state 212 there may be grant-less uplink data transfer. The UE location may also be known at Radio Access Network registration area (RRA) or routing area level. Furthermore, the UE location may also be known at the RRA anchor node level, which is discussed in more detail below. This latest attribute minimizes paging signaling load. It should be noted that paging is the second contributor to the signaling load in the existing LTE/LTE-Advance networks. In an alternative example, the UE location may also be known to the radio access network at the cell level. For example, the UE may be configured or provisioned with mobility metrics or speed metric related thresholds. The mobility metric may include info like the number of cell reselections occurring during a specified time period, whereas the "speed metric" is primarily based on the velocity or acceleration of the UE. Another mobility metric may include number of handovers occurring during a specified time period. This metric may be applicable for UEs in a connected state, while the count of cell reselections would be applicable for UEs in the idle or inactive state. Speed metrics may be used and include distance travelled per time unit (e.g., miles/hour, kilometers/hours) as well as the acceleration (i.e., the rate of change of the device speed). The UE uses such thresholds to decide on the UE mobility level (e.g., mobility state) and whether or not the UE should perform location update upon cell change or upon RRA change. For example, the UE may be configured or provisioned with mobility state parameters similar to the one used in LTE/LTE-advance network (see background). The mobility state definition may further be expanded to include stationary mobility (e.g., no mobility) or nomadic mobility (e.g., may change position sometime but most of the time stationary). In an exemplary configuration, if the UE is in High mobility state or Medium Mobility State, the UE may in RRC_Grant_Less state 212 perform a location update that is sent to the RAN (e.g., eNodeB or other base station) only upon detection by the UE of RRA change. The mobility is UE controlled based mobility. In another exemplary configuration, if the UE is in Low Mobility State (e.g., stationary or nomadic), the UE may in RRC_Grant_Less state 212 perform a location update upon cell reselection. The mobility is UE controlled based mobility.

Figure 18B:
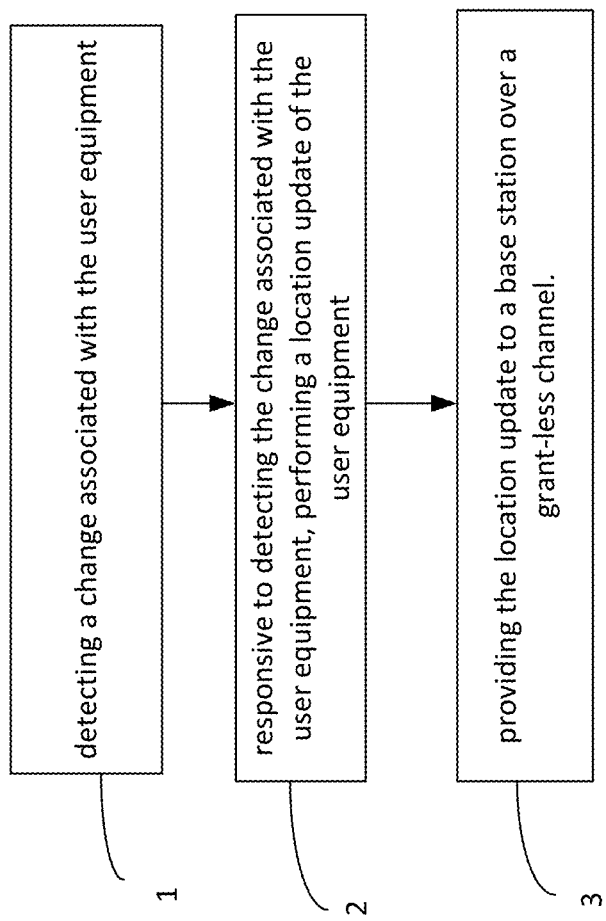
FIG. 18B illustrates an exemplary method for a New UE State.

FIG. 18B illustrates an exemplary method for a New UE State. Note that this is an example of the state transitions or states disclosed herein, such as in FIG. 18A. At step 1, there may be detection by the UE (e.g., UE 228) of a change associated with the user equipment, the change associated with user equipment may include the change of a radio access network registration area of the user equipment or a change in a mobility metric that reaches a threshold. At step 2, responsive to detecting the change associated with the user equipment at step 1, performing a location update of the user equipment. At step 3, a UE may provide the location update to a base station (e.g., eNB 227) over a grant-less channel.

In a second scenario with regard to RRC_Grant_Less state 212, RRC context exists and RRC signaling connection exists (common, shared, or dedicated channel) but no DRB connection exists. The UE location is known in the radio access network at the cell level and therefore the UE performs location update toward the RAN upon cell reselection. The state is a connected state. This state is similar to the UMTS/HSPA CELL FACH state, but one difference is that the user data transmission is grant-less.

In RRC_Grant_Less state 212, a physical channel or transport channel for grant-less data transfer may be specified (e.g., assigned). The UE may perform carrier sensing or listen-before-talk to gain access to the reverse-paging grant-less physical channel. The signaling connection may be released by the network or implicitly released by both the network and the UE. However the UE context might remain in both the UE and the network. The UE may be configured to remain in that case in RRC_Grant_Less state 212.

RRC_Grant_Less state 212 may map to NAS ECM_CONNECTED or an equivalent 5G NAS state. The UE may be paged in this state. Similarly, the UE may be configured only for reverse-paging toward the radio access network as described in the case of RRC_IDLE mode state 210. The UE may perform reverse paging if the UE is configured with reverse-paging capability.

RRC_Connectionless state 214 is similar to the RRC_Grant_Less state 212, but RRC_Connectionless State 214 is mapped to a grant based connectionless physical channel for data transmission in uplink and downlink.

RRC_Connectionless state 214 is a connected state. In a first scenario, the RRC context and signaling connection exists, but no DRB connection exists and data radio bearer cannot be established in this state. The UE location is known at the cell level within the radio access network and therefore the UE performs location update toward the RAN upon cell reselection. RRC_Connectionless state 214 is similar to UMTS/HSPA CELL FACH state. A difference is that in the case of RRC_Connectionless state, there is no data radio bearer (DRB) connection with pre-establish data path on either common or shared transport channel or common or shared physical channel. The upper layer data (e.g., application data) is piggybacked on the signaling radio bearers (SRB) mapped to a connection-less physical channel. It should be noted that when an SRB is carrying upper layer data (e.g., application data), the SRB may be mapped to a different type physical channel, with physical layer attributes (e.g., bandwidth, modulation scheme, channel coding, waveform, physical layer resource location, transport block size, error correction, etc.), different from that of the physical channel used when the SRB is not carrying upper layer data (e.g., application data). The signaling connection may be released by the network or implicitly released by both the network and the UE. However the UE context might remain in both the UE and the network. The UE may be configured to remain in that case in RRC_connectionless state 214, which is discussed below.

In a second scenario with regard to RRC_connectionless state 214, the RRC context exist, but no signaling connection exists, no data radio bearer connection exists, and a data radio bearer cannot be established in this state. No data transfer is possible in this state. This flavor of RRC connectionless state where the RRC context exist, but no signaling connection exists, no data radio bearer connection exists, and a data radio bearer cannot be established in this state may be considered as a sub-state of the RRC_Connectionless state. Before the UE exchanges data with the network, the UE transitions to one of the other RRC connected states (e.g., RRC_Grant_Less state, or RRC_Connectionless state sub-state described above possibility to have signaling radio bearer). The UE location may also be known at Radio Access Network Registration (RRA) level or routing area level. Furthermore, the UE location may also be known at the RRA anchor node level. This latest attribute minimizes paging signaling load. It should be noted that paging, as shown in FIG. 17, is the second contributor to the signaling load in the existing LTE/LTE-Advance networks. In one alternative of this scenario, the UE location may also be known to the radio access network at the cell level. For example, the UE may be configured or provisioned with mobility metrics or speed metric related thresholds (as discussed herein). The UE uses such thresholds to decide on the UE mobility (state) level and whether or not the UE should perform location update upon cell change or upon RRA change. For example, the UE may be configured or provisioned with mobility state parameters similar to the one used in LTE/LTE-advance network (see background). The mobility state definition may further be expanded to include stationary mobility (e.g., no mobility) or nomadic mobility (e.g., can change position sometime but most of the time stationary). In an exemplary configuration, if the UE is in High mobility state or Medium Mobility State, the UE may in RRC_Connectionless state 214 perform a location update toward the RAN (e.g., eNodeB) upon detection of RRA change. The mobility is UE controlled based mobility. In another exemplary configuration, if the UE is in Low Mobility State (e.g., stationary or nomadic) the UE may in RRC_Connectionless state 214 perform location update upon cell reselection. The mobility is UE controlled based mobility.

RRC_Connectionless state 214 may map to NAS ECM_CONNECTED or an equivalent 5G NAS state (e.g., when RRC Signaling connection exists). RRC_Connectionless state 214 may also map to NAS ECM_IDLE or 5G NAS equivalent (e.g., when no RRC signaling connection exist). The UE may be paged in this state. Similarly, the UE may be configured only for reverse-paging toward the radio access network as described in the case of RRC_IDLE state 210. The UE may perform reverse paging if the UE is configured with reverse-paging capability.

RRC_CONNECTED_UE_Controlled_Mobility State 216 is similar to the RRC_Connectionless state 214 in the sense that it has similar attributes as the RRC_Connectionless case (i.e., sub-state) where an RRC signaling connection, i.e. a signaling radio bearer (SRB), exists. A difference with RRC_Connectionless state 214 is that for RRC_CONNECTED_UE_Controlled_Mobility State 216, data radio bearers (DRB) may be established in support of data transfer between the UE and the network. The UE location is known at the cell level. The UE may also be configured such that the UE location is known at the RAN Registration Area (RRA) level or at the RRA anchor node level. The mobility is UE controlled mobility, e.g., upon cell reselection, the UE perform location registration update toward the radio access network. This state might be mapped to physical channel with physical layer attributes (e.g., bandwidth, modulation scheme, channel coding, waveform, physical layer resource location, transport block size, error correction, etc.) different from the attributes of the physical channels used in other RRC states. The physical channel attributes may also be usage scenario specific for e.g., mMTC specific physical channel versus UR/LL physical channel versus eMBB physical channel. This state might be further divided into usage scenarios (e.g., mMTC, UR/LL or eMBB) based sub-states. RRC_CONNECTED_UE_Controlled_Mobility state 216 may map to NAS ECM_CONNECTED or an equivalent 5G NAS state. The UE may be paged in this state for example to wake the UE up from DRX mode. The UE may be configured or provisioned with mobility metrics or speed metric related thresholds (as discussed herein). The UE uses such thresholds to decide on the UE mobility (state) level and whether or not the UE should perform location update upon cell change or upon RRA change. For example, the UE may be configured or provisioned with mobility state parameters similar to the one used in LTE/LTE-advance network (see background). The mobility state definition may further be expanded to include stationary mobility (e.g., no mobility), nomadic mobility (e.g., can change position sometime but most of the time stationary). When the UE is in RRC_CONNECTED_UE_Controlled_Mobility state at the RRC protocol level, the UE may be in ECM_CONNECTED state at the NAS protocol level. In an exemplary configuration, if the UE is in High mobility state or Medium Mobility State, the UE may in RRC_CONNECTED_UE_Controlled_Mobility state 216, perform location update toward the RAN (e.g., eNodeB) upon detection of RRA change. The mobility is UE controlled based mobility. In another exemplary configuration, if the UE is in Low Mobility State, is stationary or is nomadic, the UE may in RRC_CONNECTED_UE_Controlled_Mobility state 216 perform location update upon cell reselection. The mobility is UE controlled based mobility.

RRC_Connected_NW_Controlled_Mobility state 218 is similar to the RRC_Connected_UE_Controlled_mobility state 216. A difference is that in RRC_Connected_NW_Controlled_Mobility state 218, the network controls UE mobility. The UE location is known at the cell level. The UE is configured with mobility related measurements (e.g., mobility metrics or speed metric related thresholds as discussed herein) which are reported to the network. The network may use the measurement report to make handover decisions and reconfigure the UE with communication resources in the newly selected target cell. This state might be mapped to physical channel with physical layer attributes (e.g., bandwidth, modulation scheme, channel coding, waveform, physical layer resource location, transport block size, error correction, etc.) different from the attributes of the physical channels used in other RRC states. The physical channel attributes may also be usage scenario specific, for example mMTC specific physical channel versus UR/LL physical channel versus eMBB physical channel. This state might be further divided into usage scenarios (e.g., mMTC, UR/LL or eMBB) based sub-states. This state may maps to NAS ECM_CONNECTED or an equivalent 5G NAS state. The UE may be paged in this state for example to wake up the UE form DRX mode.

With continued reference to FIG. 18, which illustrates the new UE states and state transitions, the following are example triggers for state transitions that are illustrated in FIG. 18.

The following are example triggers for RRC_IDLE state 210 to RRC_Grant_Less state 212: 1) RRC establishment cause is "emergency" call or the UE is configured to access the network with grant-less access when the establishment cause if "emergency"; 2) RRC establishment cause is "high Priority Access" or the UE is configured to access the network with grant-less access when the establishment cause if "highPriorityAccess"; 3) RRC establishment cause is mo_signaling or the UE is configured to access the network with grant-less access when the establishment cause if "mo_signaling"; 4) RRC establishment cause is "delay Tolerant Access" or the UE is configured to access the network with connectionless mode of operation when the establishment cause if "delay tolerant access"; 5) Establishment cause is access to a network slice configured or specified to use grant-less operation; 6) Establishment cause is set to access for usage scenarios (e.g., UR/LL) or applications configured or specified to use grant-less mode of operation; 7) Mobile Terminating (MT) call with the NW (e.g., eNode B) indicating that the connection mode of operation should be grant-less based; 8) Access Cause is reverse paging i.e. the UE wants to page the network; 9) Access cause is Light Connection; or 10) The NW configured the UE into grant-less operation mode with grant-less operation resources during RRC connection establishment procedure.

The following are example triggers for RRC_IDLE state 210 to RRC_Connection_Less state 214: 1) RRC establishment cause is "emergency" call or the UE is configured to access the network with connectionless access when the establishment cause if "emergency"; 2) RRC establishment cause is "high Priority Access" or the UE is configured to access the network with connectionless access when the establishment cause if "highPriorityAccess"; 3) RRC establishment cause is mo_signaling or the UE is configured to access the network with connectionless access when the establishment cause if "mo_signaling"; 4) RRC establishment cause is "delay Tolerant Access" or the UE is configured to access the network in connectionless mode of operation when the establishment cause if "delay tolerant access"; 5) Establishment cause is access to a network slice configured or specified to use connectionless mode of operation; 6) Establishment cause is set to access for usage scenarios (e.g., UR/LL) or applications configured or specified to use grant-less mode of operation; 7) Mobile Terminating (MT) call with the NW (e.g., eNode B) indicating that the connection mode of operation should be connectionless; 8) Access Cause is reverse paging i.e. the UE want to page the network; 9) Access cause is Light Connection; or 10) The NW configured the UE into connectionless mode of operation mode with connectionless only resources during RRC connection establishment procedure.

With reference to the transition from RRC_IDLE state 210 to RRC_Connected_UE_Controlled_Mobility state 216, in an example, the NW may have configured the UE into RRC_Connected_UE_Controlled_Mobility state 216 with transport and physical channel resources for this state during RRC connection establishment procedure. The NW may make the determination to put the UE into RRC_Connected_UE_Controlled_Mobility state 216 based on the mobility state report from the UE (e.g., as part of the connection setup complete message from the UE). Similarly, the NW may make the determination to put the UE into RRC_Connected_UE_Controlled_Mobility state 216 based on the establishment cause included in the RRC connection establishment request message from the UE. Other example triggers for RRC_IDLE state 210 to RRC_Connected_UE_ Controlled_Mobility state 216 may include: 1) establishment cause is set to access to a network slice configured or specified to use RRC_Connected_UE_Controlled_Mobility state 216; or 2) establishment cause is set to access for usage scenarios (e.g., UR/LL) or applications configured or specified to use RRC_Connected_UE_Controlled_Mobility state 216.

With reference to the transition from RRC_IDLE state 210 to RRC_Connected_NW_Controlled_Mobility state 218, the NW may have configured the UE into RRC_Connected_NW_Controlled_Mobility state 218 with transport and physical channel resources for this state during RRC connection establishment procedure. The NW may make the determination to put the UE into RRC_Connected_NW_ Controlled_Mobility state 218 based on the mobility state report from the UE (e.g., as part of the connection setup complete message from the UE). Similarly, the NW may make the determination to put the UE into RRC_Connected_NW_Controlled_Mobility state 218 based on the establishment cause included in the RRC connection establishment request message from the UE. Other example triggers for RRC_IDLE state 210 to RRC_Connected_NW_Controlled_Mobility state 218 may include: 1) establishment cause is set to access to a network slice configured or specified to use RRC_Connected_NW_Controlled_Mobility state 218; or 2) establishment cause is set to access for usage scenarios (e.g., UR/LL) or applications configured or specified to use RRC_Connected_NW_Controlled_Mobility state 218.

Discussed below are transitions back to RRC_IDLE state 210. The network (e.g., eNodeB or equivalent 5G RAN node) may reconfigure the UE from any of the connected states into RRC_IDLE state. The UE may also autonomously transitions from any of the connected states into RRC_IDLE state. The network may use an inactivity timer specific to an application, traffic profile, or use case (e.g., mMTC application or UR/LL application or eMBB) to trigger the transition into the RRC_IDLE state. Similarly, the UE may use an inactivity timer specific to an application, traffic profile or use case specific (e.g., mMTC application or UR/LL application or eMBB) to autonomously trigger a transition to RRC_IDLE state.

When the network (e.g., eNodeB or equivalent 5G RAN node) reconfigures the UE into RRC_IDLE state 210, the network may decide not to inform the core network. In this case, the UE might be in RRC_IDLE state 210 but in the NAS, the UE is in full connected state (e.g., ECM_CONNECTED state or the equivalent 5G NAS state) with signaling connection between the RAN and the Core network (e.g., S1 signaling connection of the signaling connection for the equivalent interface between 5G radio access network and 5G core network). This also may mean that the RRC_IDLE may be mapped to ECM_CONNECTED state or the equivalent 5G NAS state.

With reference to RRC_Grant_Less state 212 to RRC_ Connectionless state 214, when the UE is in RRC_Grant_ Less state 212, the network (e.g., eNB or the equivalent 5G RAN node) may decide to reconfigure the UE with transport channel and physical channel resources used in connectionless mode of operation. Upon a successful reconfiguration of these resources, the UE transitions from RRC_Grant_Less state 212 to RRC_Connectionless state 214. Example triggers in the network to reconfigure the UE from RRC_Grant_ Less state 212 to RRC_Connectionless state 214 may include the following: 1) addition of services that requires transport channel or physical channel resources used in connectionless mode of operation; or 2) measurements (e.g., data volume reports) from the UE or other device have met the conditions set in the network (e.g., data volume above a threshold) for the network (e.g., eNodeB) to reconfigure the UE into RRC_Connectionless state 214.

Transition from RRC_Grant_less state 212 to RRC_CONNECTED_UE_Controlled_Mobility 216 may follow similar rules as the transition from RRC_Grant_less state 212 to RRC_Connectionless state 214. For example, when the UE is in RRC_Grant_Less state 212, the network (e.g., eNB or the equivalent 5G RAN node) may decide to reconfigure the UE with transport channel and physical channel resources used in RRC_CONNECTED_UE_Controlled_Mobility state 216. Upon a successful reconfiguration of these resources, the UE transitions from RRC_Grant_Less state 212 to RRC_CONNECTED_UE_Controlled_Mobility state 216.

Transition from RRC_Grant_less state 212 to RRC_CONNECTED_NW_Controlled_Mobility state 218 may follow similar rules as the transition from RRC_Grant_less state 212 to RRC_Connectionless state 214. For example, when the UE is in RRC_Grant_Less state 212, the network (e.g., eNB or the equivalent 5G RAN node) may decide to reconfigure the UE with transport channel and physical channel resources used in RRC_CONNECTED_NW_Controlled_Mobility state 218. Upon a successful reconfiguration of these resources, the UE transitions from RRC_Grant_ Less state 212 to RRC_CONNECTED_NW_ Controlled_Mobility state 218.

With reference to transition from RRC_Connectionless state 214 to RRC_Grant_Less state 212, when the UE is in RRC_Connectionless state 214, the network (e.g., eNB or the equivalent 5G RAN node) may decide to reconfigure the UE with transport channel and physical channel resources used in grant-less mode of operation. Upon a successful reconfiguration of these resources, the UE transitions from RRC_Connectionless state 214 to RRC_Grant_Less state 212. Example triggers in the network to reconfigure the UE from RRC_Connectioness state 214 to RRC_Grant_Less state 212 may include the following: 1) removal of services that requires transport channel or physical channel resources used in RRC_Connectionless mode of operation and the remaining services only require transport channel or physical channel resources used in RRC_Grant_Less state; 2) measurements (e.g., data volume reports) from the UE or other device have met the conditions set in the network (e.g., data volume below a threshold), in order for the network (e.g., eNodeB) to reconfigure the UE into RRC_Connectionless state 214.

Transition from RRC_CONNECTED_UE_Controlled_Mobility state 216 to RRC_Grant_Less state 212 follows similar rules as the transition from RRC_Connectionless state 214 to RRC_Grant_Less 212. For example, when the UE is in RRC_CONNECTED_UE_Controlled_Mobility state 216, the network (e.g., eNB or the equivalent 5G RAN node) may decide to reconfigure the UE with transport channel and physical channel resources used in grant-less mode of operation. Upon a successful reconfiguration of these resources, the UE transitions from RRC_CONNECTED_UE_Controlled_Mobility state 216 to RRC_Grant_Less state 212.

Transition from RRC_CONNECTED_NW_Controlled_Mobility state 218 to RRC_Grant_Less state 212 follows similar rules as the transition from RRC_Connectionless state 214 to RRC_Grant_Less state 212. For example, when the UE is in RRC_CONNECTED_NW_Controlled_Mobility state, 218 the network (e.g., eNB or the equivalent 5G RAN node) may decide to reconfigure the UE with transport channel and physical channel resources used in grant-less mode of operation. Upon a successful reconfiguration of these resources, the UE transitions from RRC_CONNECTED_NW_Controlled_Mobility state 218 to RRC_Grant_ Less state 212.

With reference to transitions from RRC_CONNECTED_UE_Controlled_Mobility state 216 to RRC_CONNECTED_NW_Controlled_Mobility state 218, when the UE is in RRC_CONNECTED_UE_Controlled_Mobility state 216, the network (e.g., eNB or the equivalent 5G RAN node) may decide to reconfigure the UE with transport channel and physical channel resources used in RRC_CONNECTED_NW_Controlled_Mobility state 218 mode of operation. Upon a successful reconfiguration of these resources, the UE transitions from RRC_CONNECTED_UE_Controlled_Mobility state 216 to RRC_CONNECTED_NW_Controlled_Mobility state 218. The UE may provide to the network, measurements on mobility history, mobility sate, traffic pattern, how long the UE expect to remain in connected mode, or a suggestion for preference to be transitioned into RRC_CONNECTED_NW_Controlled_Mobility state.

With reference to transitions from RRC_CONNECTED_NW_Controlled_Mobility state 218 to RRC_CONNECTED_UE_Controlled_Mobility state 216, when the UE is in RRC_CONNECTED_NW_Controlled_Mobility state 218, the network (e.g., eNB or the equivalent 5G RAN node) may decide to reconfigure the UE with transport channel and physical channel resources used in RRC_CONNECTED_UE_Controlled_Mobility state 216 mode of operation. Upon a successful reconfiguration of these resources, the UE transitions from RRC_CONNECTED_NW_Controlled_Mobility state 218 to RRC_CONNECTED_UE_Controlled_ Mobility state 216. The UE may provide to the network, measurements on mobility history, mobility state, traffic pattern, how long the UE expects to remain in connected mode, or a suggestion for preference to be transitioned into RRC_CONNECTED_NW_Controlled_Mobility state 218.

The states depicted in FIG. 18 and discussed herein may be configurable by the network (e.g., taking into account the use cases or applications being served by the UE). The network (e.g., eNB or 5G radio access network equivalent node) may configure the UE with a subset of the states illustrated in FIG. 18. For example, for a UR/LL application, the UE may be configured with only two states for e.g., RRC_Grant_Less state 212 and RRC_CONNECTED state 214. In this example, the UE may not be configured with RRC_IDLE state 210. Similarly, for some mMTC applications, for example, where the devices are static or nomadic, the UE may be configured with only RRC_IDLE state 210 and RRC_Connectionless state 214.

It is contemplated herein that the different states of FIG. 18 may be mixed and matched. Many states are not required or may be combined with other states. For example, features of RRC_Grant_Less state 212 may be combined with RRC_Connection less state 214 or RRC_Connected_UE_Control_Mobility state 216. Steps and scenarios associated with each state as disclosed below may be skipped or combined. FIG. 22-FIG. 26 provide methods that may incorporate one or more of the states and steps associated with the states as described herein and provided in FIG. 18.

Mobility management mechanisms are disclosed below. The disclosed mobility management considers radio access network based tracking area control and the supporting paging procedure to reduce mobility related signaling or messaging. For example, radio access network Registration Area (RRA), dynamic RRA management, RAN Based Paging, and Radio Access network Based Mobility Management.

Below are defined terms or logical entities for RRA that are used in the disclosed architectures, such as FIG. 19, FIG. 20, and FIG. 21. Radio Access NetWork (RANW) is a radio network that provides connection between a UE and a Core Network (CN), e.g., LTE RAN, WiFi radio network, etc. RANW Registration Area (RRA) is a radio access network registration area used as the location tracking area at the RANW level. RRA may contain one or multiple radio access networks, e.g., one or multiple eNBs in LTE system or Access Points (APs) in WiFi system. For example, in LTE system, an MME's location tracking area may be split into multiple RRAs controlled and managed by the corresponding eNBs locally.

RRA anchor point (RRAaP) serves radio access network with the interfaces with the Core Network (CN), other radio access networks, and UEs. It serves the role as a registrar for RANW registration and therefore it also serves the role of tracking UEs' location in the local radio accessing area (e.g., reachability status) and manages UEs' mobility locally. An exemplary RRAaP may be an eNB in LTE system or an AP Controller in WiFi system.

Serving RRA Node (SRRAN) serves the point of presence of a UE, e.g., the entity that a UE makes an RRC_Connection with while at the RRC_Idle state, to the Core Network (CN) and provides a specific physical connection via signaling or data channel(s) or logical connection via relationship or context existence between a UE and the RANW. There is one SRRAN for each UE that has a connection or a context with the RANW that the SRRAN represents. An SRRAN may be an RRAaP, i.e. a RANW registrar to the UEs in its RRA, in charge of tracking UEs' locations and local mobility management. An exemplary SRRAN may be an eNB in LTE system or an AP or AP Controller in WiFi system.

Drifting RRA Node (DRRAN) serves as an alternative RRA Node to Serving RRA Node to act as a temporary presence of a UE, e.g., the entity that a UE makes handover to while at the RRC_Connected state 114, to the Core Network (CN) and provides a specific physical connection via signaling or data channel(s). There is one DRRAN for each UE that has a connection with the RANW that the DRRAN represents. A DRRAN may be an RRAaP of an alternative RRA that a UE is visiting. An exemplary DRRAN may be an eNB in LTE system or an AP or AP Controller in WiFi system.

Figure 19:
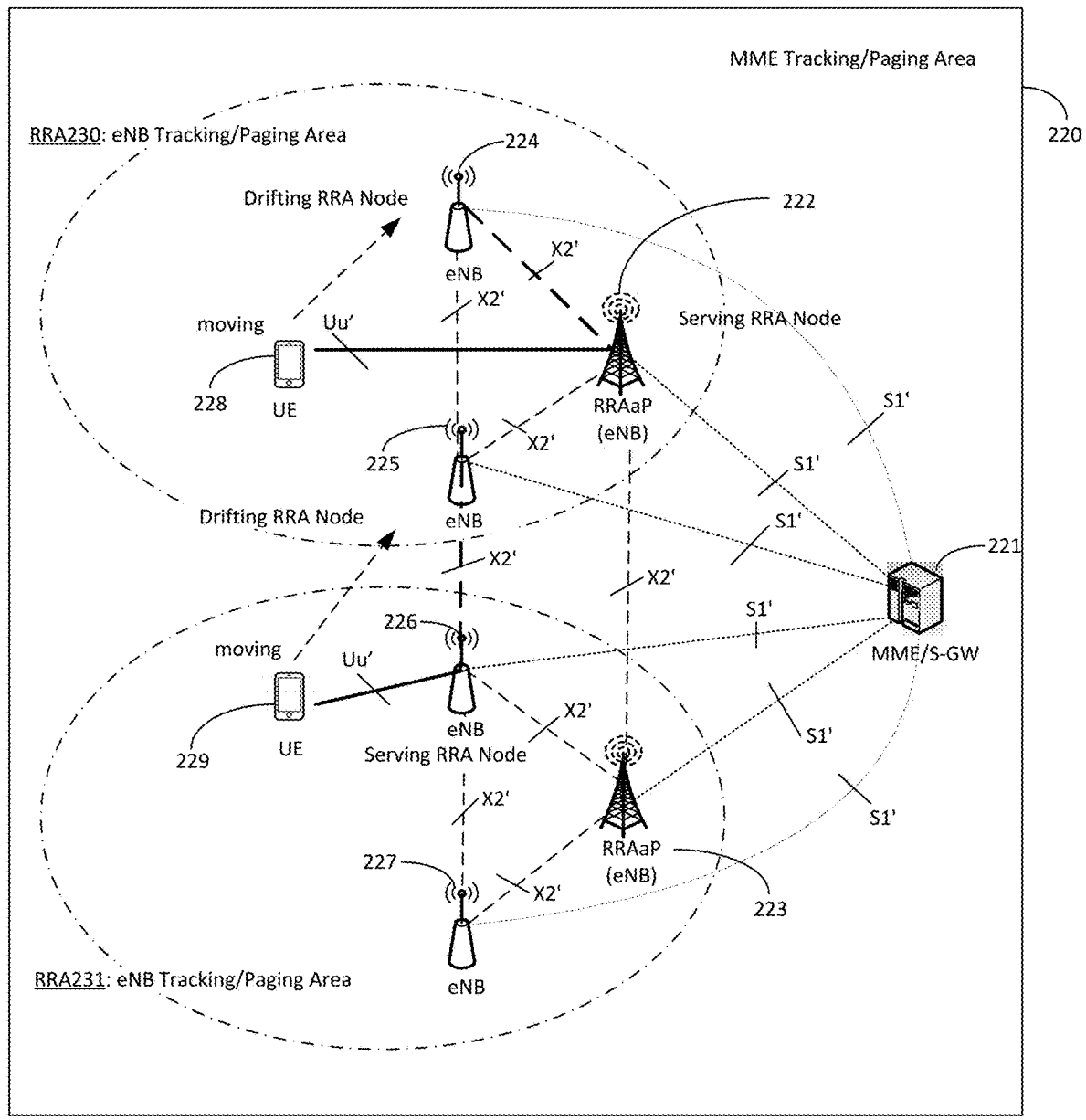
FIG. 19 illustrates an exemplary Hierarchical Architecture without RRA Overlapping.
Figure 20:
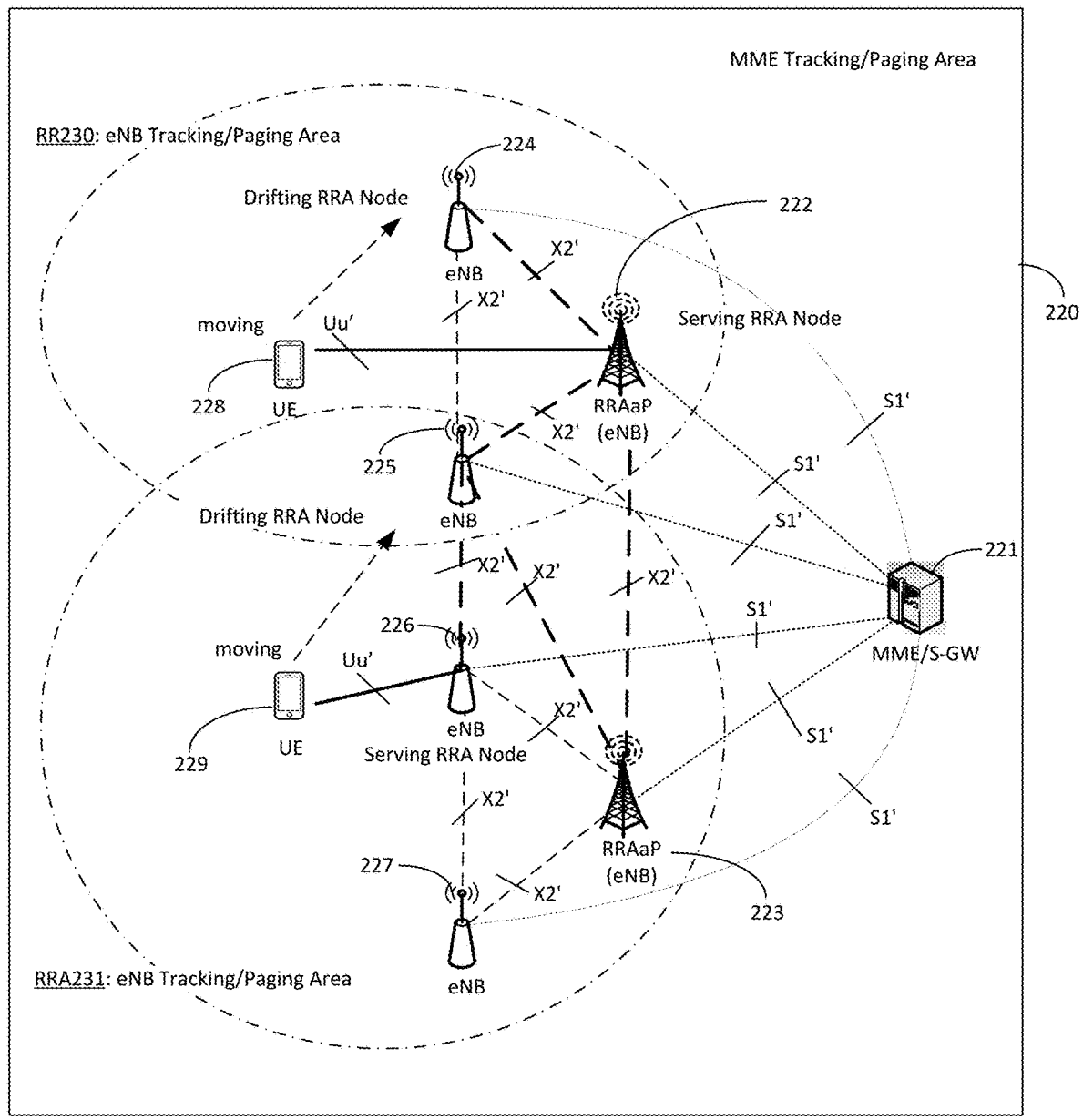
FIG. 20 illustrates an exemplary Hierarchical Architecture with RRA Overlapping.
Figure 21:
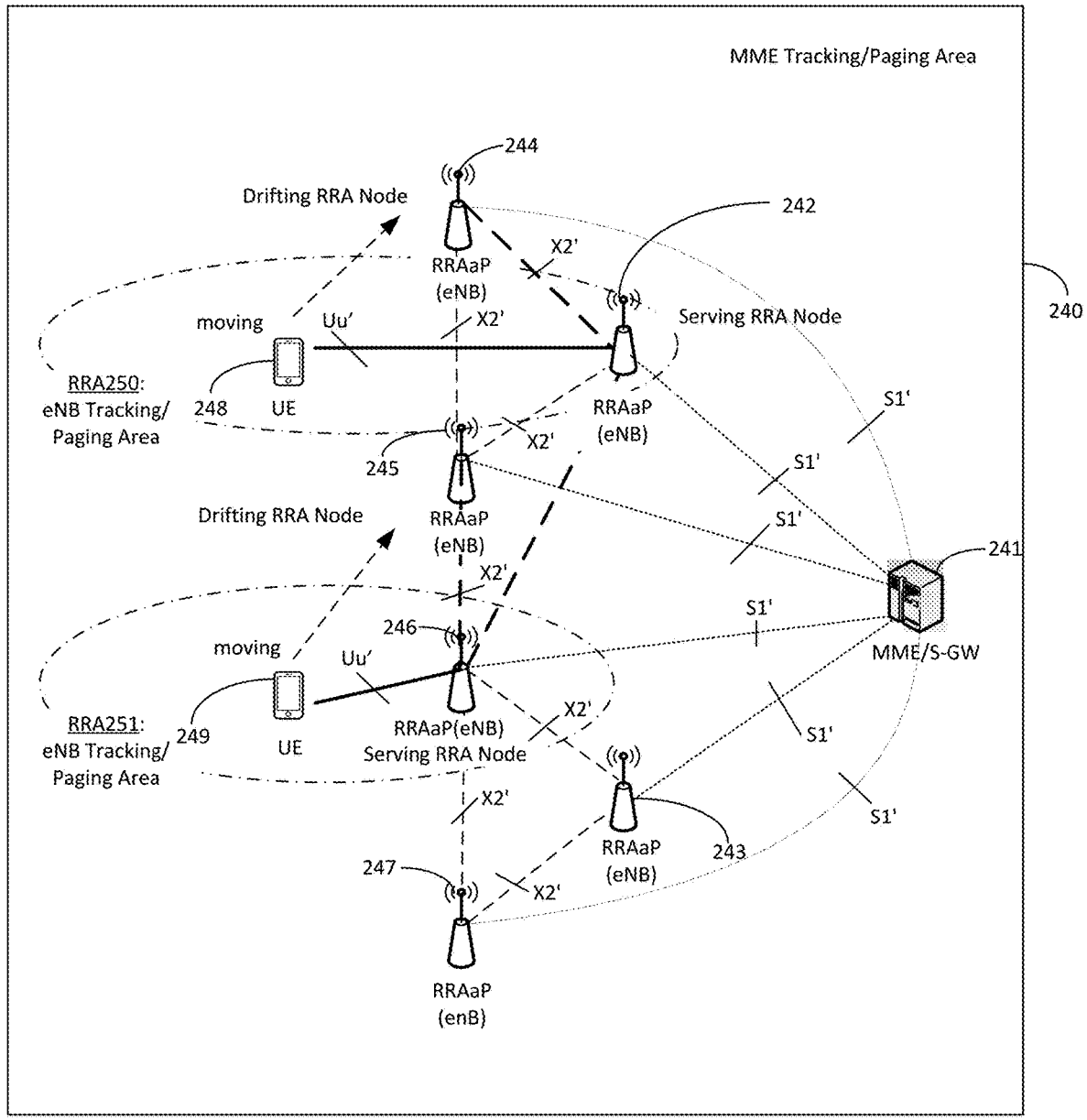
FIG. 21 illustrates an exemplary Distributed Architecture without RRA Overlapping.

FIG. 19, FIG. 20, and FIG. 21 are exemplary deployments of RRAaPs, SRRANs and DRRANs in a LTE system. Please note that the same mechanisms are also applicable to non-LTE systems or LTE and non-LTE integrated systems.

FIG. 19 illustrates an exemplary hierarchical architecture without RRA overlapping. As shown, MME 221 may be connected with several radio access network nodes, such as eNB 222, eNB 223, eNB 224, eNB 225, eNB 226, and eNB 226. Core network mobility controller's (e.g., MME 221) mobile tracking/paging area 220 may be sliced into multiple radio access network level tracking/paging areas—RANW Registration Areas, e.g., eNB 222 and eNB 223 Tracking/Paging Areas RRA 230 and RRA 231, respectively in an LTE system, which are controlled and managed by RRA anchor points (RRAaP) or RANW registrars (e.g., eNB 222 as RRAaP for RRA 230 and eNB 223 as RRAaP for RRA 231 in an LTE system).

In each RRA, there may be one or multiple radio accessing nodes (e.g., eNBs in an LTE system) as a Serving RRA Node (e.g., eNB 222 which is also an RRAaP or eNB 226 in RRA 231) or a Drifting RRA Node (e.g., eNB 224 in RRA 230 or eNB 225 also in RRA 230).

Each RRAaP may have the following interfaces, as exemplified in an LTE system: 1) an interface to Core Network, e.g., S1-like or S1-enhanced interface S1', as shown between eNB 222 or eNB 223 and MME/SGW respectively; 2) an interface to other RRAaPs, e.g., X2-like or X2-enhanced interface X2', as shown between eNB 222 and eNB 223; 3) an interface to SRRANs and DRRANs within its RRA, e.g., X2-like or X2-enhanced interface X2', as shown between eNB 222 and eNB 224 and eNB 225 respectively in RRA 230 or between eNB 223 and eNB 226 and eNB 227 respectively in RRA 231; and 4) an interface to a UE within its RRA, e.g., Uu-like or Uu-enhanced interface Uu', as shown between UE 228 and eNB 222 as a RRAaP in RRA 230.

Each SRRAN or DRRAN may have the following interfaces, as exemplified in an LTE system: 1) an interface to Core Network, e.g., S1-like or S1-enhanced interface S1', as shown between eNB 224 as a DRRAN in RRA 230 and MME/SGW 221 or eNB 226 as an SRRAN in RRA 231 and MME/SGW 221; 2) an interface to other SRRANs or DRRANs, e.g., X2-like or X2-enhanced interface X2', as shown between eNB 222 as RRAaP/SRRAN and eNB 224 as DRRAN in RRA 230 or between eNB 226 as an SRRAN and eNB 225 as a DRRAN across RRA 231 and RRA 230; and 3) an interface to a UE within its RRA, e.g., Uu-like or Uu-enhanced interface Uu', as shown between UE 229 and eNB 226 as an SRRAN in RRA 231.

FIG. 20 illustrates another hierarchical structure similar to FIG. 19 described above, except that there is an overlapping area between adjacent RRAs, e.g., RRA 230 and RRA 231 overlaps over eNB 225. In this scenario, both RRAaPs may have interfaces to the SRRAN or DRRAN at the overlapping area, e.g., eNB 222 an RRAaP and eNB 223 an RRAaP have X2' interfaces with eNB 225, respectively.

An exemplary distributed architecture is shown in FIG. 21, where a core network mobility controller's MME's tracking/paging area, e.g., MME's tracking/paging area in an LTE system, is distributed among all the radio access network nodes, which are controlled and managed by the RRA anchor points (e.g., eNB 242 and eNB 246 as RRAaPs for RRA 250 and RRA 251, respectively) in an LTE system. Tracking/paging areas for each node (each node an RRAaP), e.g., eNB 243, 244, 245, and 247, would exist under this distributed architecture of FIG. 21, but are not shown in FIG. 21, because of space constraints.

RRAs may be configured via the system configurations or updates. But RRAs may also be dynamically created, updated, or removed based on the status and capabilities of the Core Network and radio access networks. For example, a new RRA is created or removed based on the traffic loading, event scheduling, system storage or computation power, service requirements, etc. Another example is that a new RRA is created or removed due to network or RAN slicing.

FIG. 18 and FIG. 22-FIG. 26 described below illustrate methods for interaction between apparatuses/devices of a communication network. It is understood that the entities performing the steps illustrated in FIG. 18, and FIG. 22-FIG. 26 are logical entities that may be implemented in the form of software (i.e., computer-executable instructions) stored in a memory of, and executing on a processor of, an apparatus configured for wireless and/or network communications or a computer system such as those illustrated in FIGS. 27B and F. That is, the method(s) illustrated in FIG. 18, and FIG. 22-FIG. 26 may be implemented in the form of software (i.e., computer-executable instructions) stored in a memory of a communications apparatus, such as the apparatus or computer system illustrated in FIG. 27B and FIG. 27F, which computer executable instructions, when executed by a processor of the apparatus, perform the steps illustrated in FIG. 18 and FIG. 22-FIG. 26. It is also understood that any transmitting and receiving steps illustrated in FIG. 18 and FIG. 22-FIG. 26 may be performed by communication circuitry of the apparatus under control of the processor of the apparatus and the computer-executable instructions (e.g., software) that it executes. In an example, with further detail below with regard to the interaction of devices, RRAaP 262 of FIG. 22 may reside on base station 114a of FIG. 27A, Node-B 140A of FIG. 27C, eNode-B 160a of FIG. 27D, or base station 180c of FIG. 27E, while MME 264 (RAN Slicing controller) of FIG. 22 may be similar to MME 162 of FIG. 27D. Skipping steps, combining steps, or adding steps between exemplary methods disclosed herein (e.g., FIG. 18 and FIG. 22-FIG. 26) is contemplated.

Figure 22:
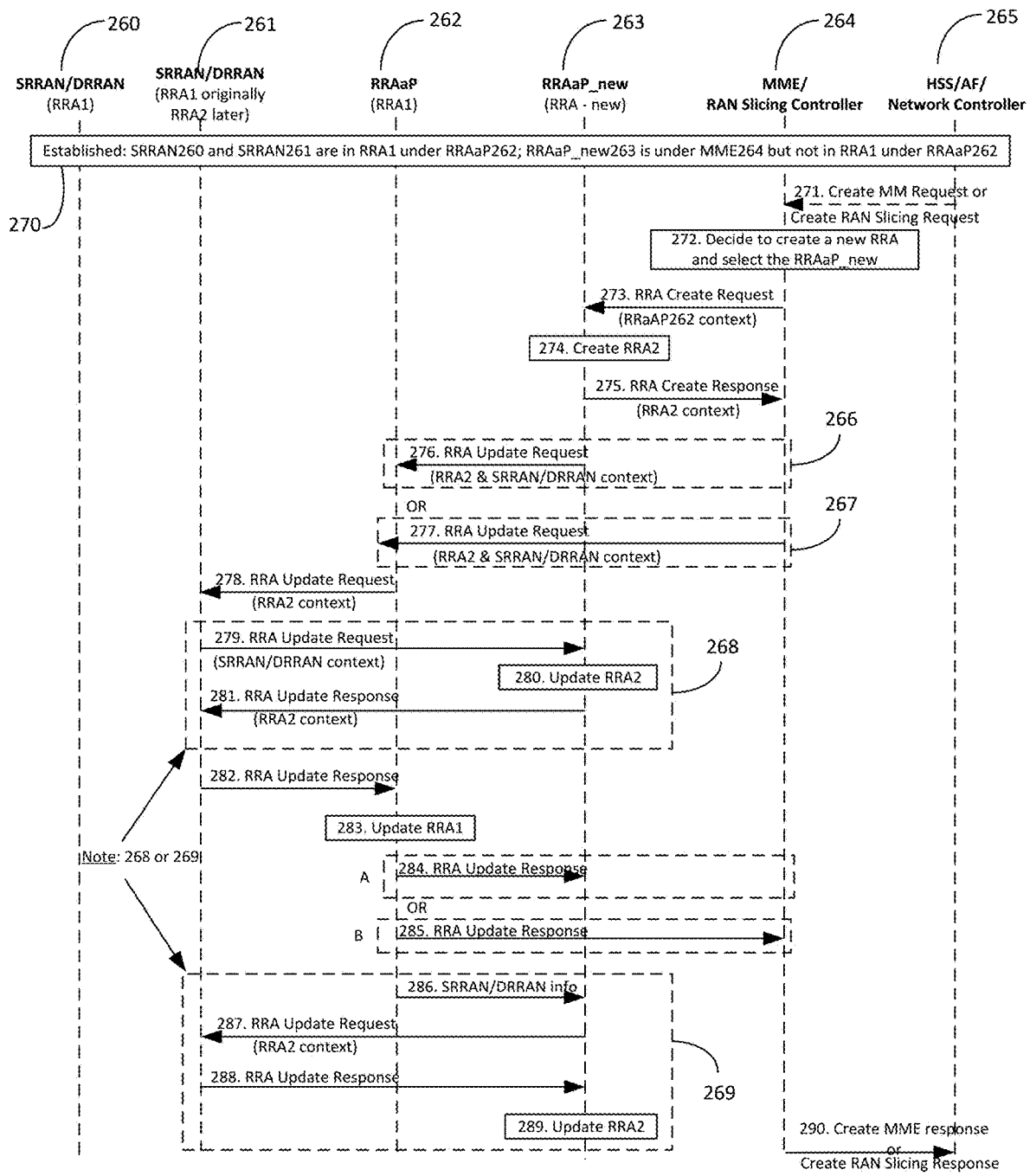
FIG. 22 illustrates an exemplary Dynamic RRA Management—Create RRA.
Figure 23:
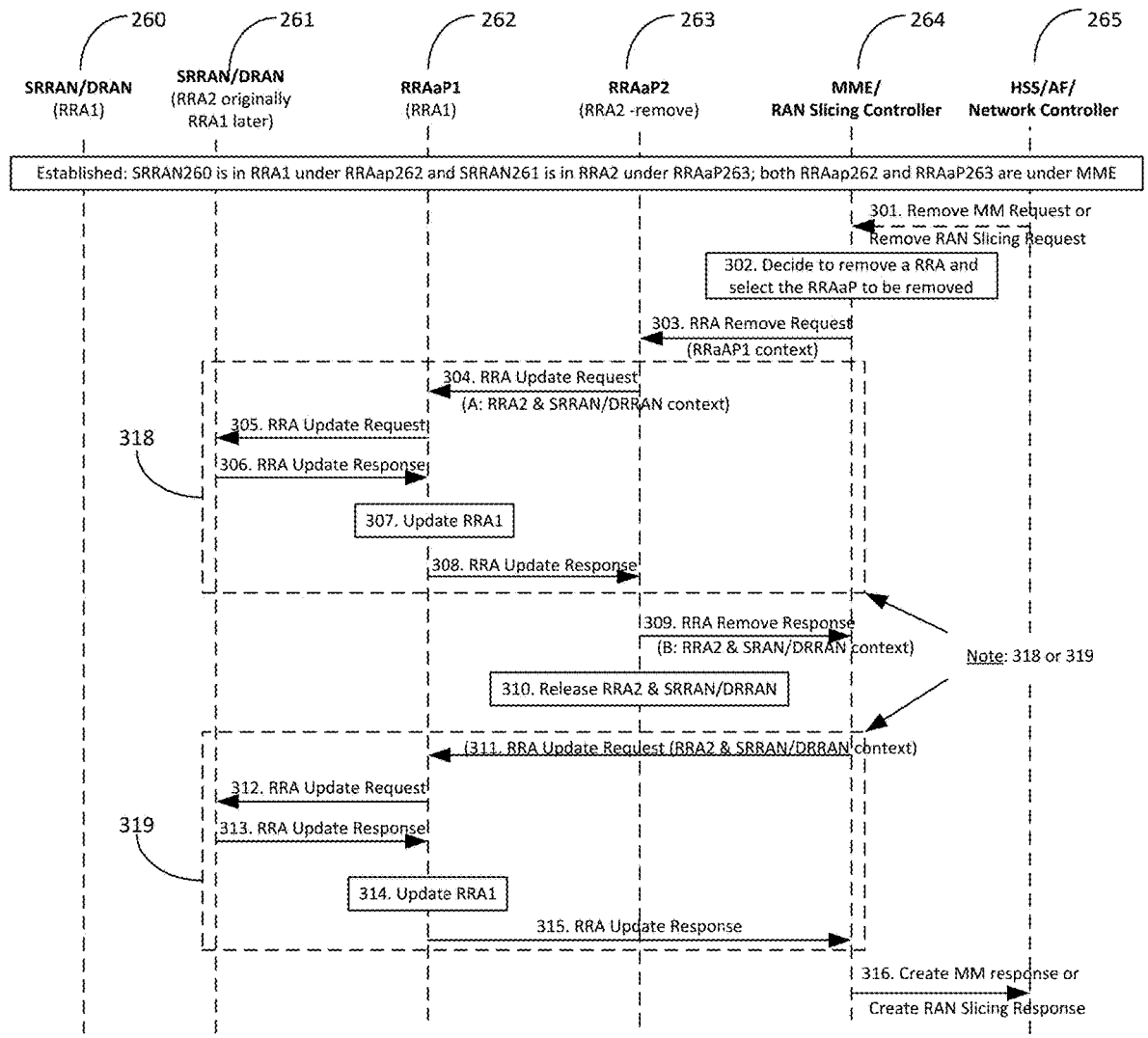
FIG. 23 illustrates an exemplary Dynamic RRA Management—Remove RRA.

An example of a dynamic RRA management for the hierarchical architecture (FIG. 19 is an example) is illustrated in FIG. 22 for creating a RRA and in FIG. 23 for removing a RRA. The examples illustrated in FIG. 22 and FIG. 23 may be initiated by Application Function, Network Controller, or MME in an LTE system based on the application/service requirements, network traffic, network slicing, mobility management status, etc. Creating or removing a RRA may also be initiated by an SRRAN or DRRAN based on the radio access network's traffic, mobility management, RAN slicing, etc., following the similar procedures illustrated in in FIG. 22 and FIG. 23.

Additional details with regard to FIG. 22 are discussed below. FIG. 22 illustrates an exemplary method for dynamic RRA management associated with creating an RRA. The proposed network may include the following nodes (e.g., eNB), such as an SRRAN 260 (which may be a DRRAN), SRRAN 261 (which may be a DRRAN), RRAaP 262, and RRAaP 263. FIG. 22 may also include an MME 264 (e.g., RAN slicing controller) and HSS 265 (e.g., AF or network controller). At step 270, there may be established SRRAN 260 and SRRAN 261, which are in RRA1 under RRAaP 262. RRAap_new 263 may be under MME 264, but not in RRA1 under RRAaP 262. At step 271, HSS 265 may send a MM Request or Create RAN slicing request. At step 272, MME 264 may determine to create a new RRA and selects RRAaP_new 263. At step 273, MME sends an RRA create request with RRAaP 262 context. At step 274, RRAaP_new 263 creates RRA2. At step 275, RRAaP_new 263 sends an RRA create response with RRA2 context. Block 266 (step 276) or block 267 (step 277) may occur. At step 276, RRAaP_new 263 may send an RRA update request with RRA2 and SRRAN 261 context. Alternatively, at step 277, MME 264 may send an RRA update request with RRA2 and SRRAN 261 context.

With continued reference to FIG. 22, at step 278, an RRA update request with RRA2 context is sent by RRAP 262. Block 268 (step 279-step 281) or block 269 (Step 287-step 289) may occur. At step 279, SRRAN 261 may send an RRA update request with SRRAN 261 context. At step 280, RRAaP_new 263 may update to RRA2. At step 281, RRAaP_new 263 may send an RRA update response with RRA2 context. At step 282, RRA updated response may be sent by SRRAN 261. At step 283 RRAaP 262 may update RRA1. Step 284 or step 285 may occur. At step 284, RRA update response may be sent to RRAaP_new 263. At step 285, RRA update response may be sent to MME 264. With regard to optional block 269, at step 286, RRAP 262 may send SRRAN 261 info to RRAaP_new 263. At step 287, RRAaP_new 263 may send an RRA update request with RRA2 context. At step 288, SRRAN 261 may send an RRA update response. At step 289, RRAaP_new 263 may update to RRA2. At step 290, MME 264 may send a create response or create a slicing response to HSS 265.

FIG. 23 illustrates dynamical RRA management—removal of RRA. Steps 301 through step 316 may be used with exceptions of optional steps of block 318 (step 304-step 308) and block 319 (step 311-step 316).

Figure 24:
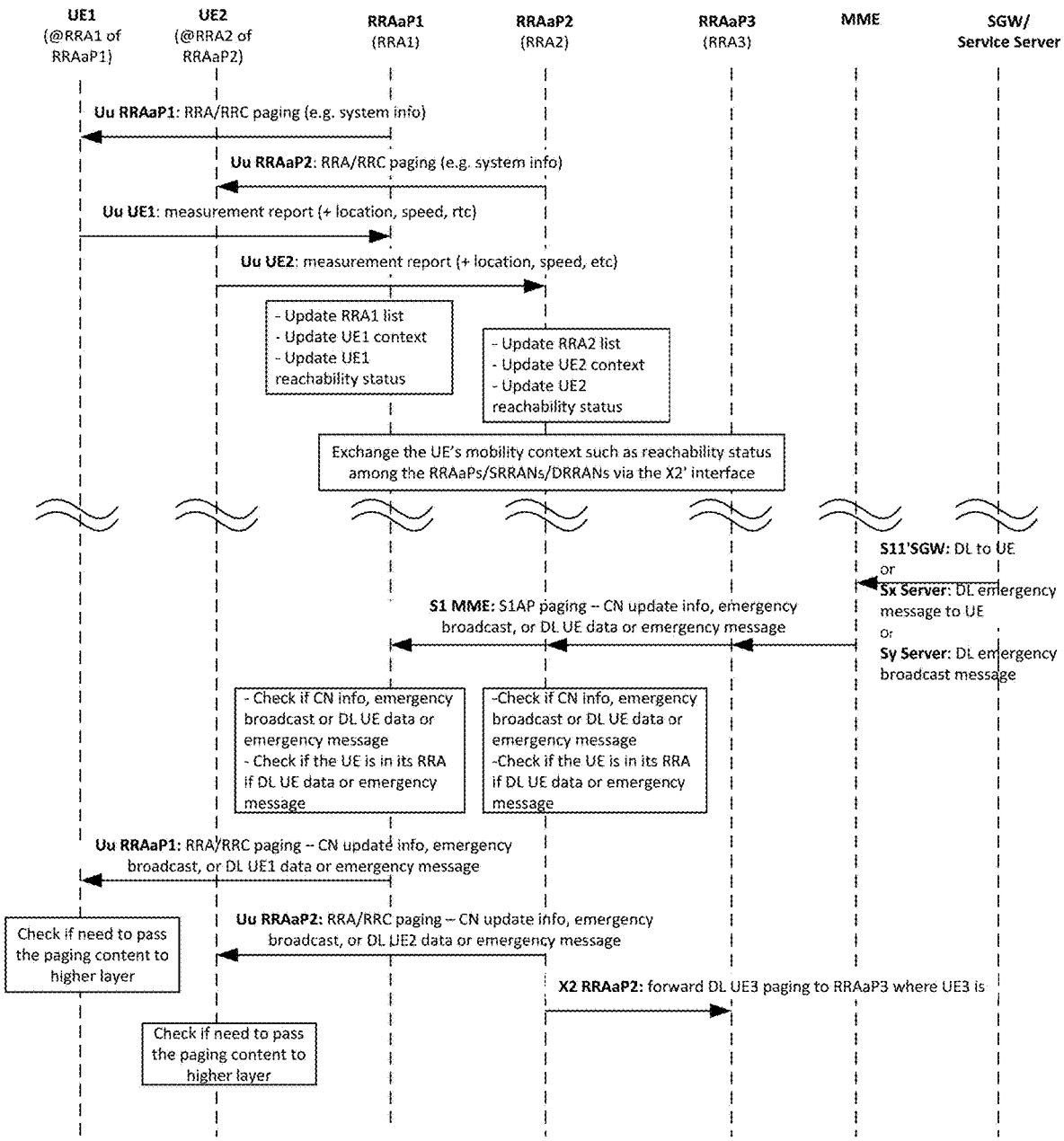
FIG. 24 illustrates an exemplary Radio Access Network Based Paging.

FIG. 24 illustrates an exemplary method for Radio Access Network Based Paging, which may reduce unnecessary paging messages that are conventionally conducted in some systems, such as LTE. The architecture of FIG. 19 may be referenced to give perspective with regard to the method of FIG. 24. The method as shown in FIG. 24 is also applicable to the other architectures shown in FIG. 20 and FIG. 21 with the following differences: 1) as shown in FIG. 20, for an SRRAN or DRRN at an overlapping area, it needs to update both RRAaPs with a UE's mobility context such as location, reachability status, etc., (e.g., eNB 225 updates both eNB 222 and eNB 223 via the X2' interface); 2) as shown in FIG. 21, the SRRANs or DRRNs (i.e. each as an individual RRAaP) need to exchange a UE's mobility context such as location, reachability status, etc., e.g., eNB 242-eNB 247 updates a UE's mobility context via the X2' interface respectively, but the paging area may be reduced to a radio accessing node area (e.g., the minimum RRA).

FIG. 24 illustrates the method in which there may be multiple UEs communicating with the network. One or more UEs connected to the network is contemplated. At step 321, RRAaP 222 (i.e., eNB 222 in this instance) provides RRA/ RRC paging (e.g., system info) to UE 228. At step 321, RRAaP 223 (i.e., eNB 223 in this instance) provides RRA/ RRC paging (e.g., system info) to UE 229. At step 322, UE 228 provides measurement report (e.g., +location, speed, etc.) to RRAaP 222. At step 332, UE 229 provides measurement report (e.g., +location, speed, etc.) to RRAaP 223. At step 323, RRAaP 222 may update RRA 230, update UE 228 context, which may include update UE 228 reachability status. At step 323, RRAaP 222 may update RRA 230 list, update UE 228 context, or update UE 228 reachability status. At step 333, RRAaP 223 may update RRA 231 list (e.g., list of UEs that are in the RRA managed by the RRAaP), update UE 229 context, or update UE 229 reachability status. At step 324, the different RRAaPs (e.g., RRAaP 222, RRAaP 223, RRAaP 232), SRRANs, or DRRANs may exchange the mobility context of UEs via the X2' interface. The mobility context may be exchanged between the different nodes so the network knows where the node is located in the event the network needs to page the node. If the location isn't known, then the network would have to page the UE in all the nodes. Exchanging the mobility context may also be used to trigger dynamic updates of the RRAs based on the UE locations or trajectories. It may be limited to the RRAaPs that are connected via an X2/X2-enhanced interface.

With continued reference to FIG. 24, at step 325, one or more messages may be sent to an MME of block 221. For example, the MME receives an indication that DL data needs to be transmitted, which results in the MME paging UE 228. Or MME may receive a DL emergency message to UE 228 from an Sx server, or a DL emergency broadcast message from a Sy server. At step 326, based on S1AP paging, one or more of the messages of step 325 or CN update info may be sent to RRAaP 222, RRAaP 223, or RRAaP 232. As part of this step 326, the S1AP paging request is sent to the nodes that may be able to reach the UE. At step 327, RRAaP 222 may determine if core network (CN) information, emergency broadcast, or DL UE data or emergency message to UE 228. Also at step 327, RRAaP 222 may determine if UE 228 is in its RRA 230. RRAaP 222 may send the paging message to the UEs in its RRA. In this example, only UE 228 is shown to be in its RRA. Similarly, at step 337, RRAaP 223 may determine if core network (CN) information, emergency broadcast, or DL UE data or emergency message to UE 229. Also at step 337, RRAaP 223 may determine if UE 229 is in its RRA 231. RRAaP 223 may send the paging message to all UEs in its RRA. In this example, only UE 229 is in its RRA. At step 328, RRA/RRC paging by RRAaP 222 may include CN update info, emergency broadcast, or DL UE 228 data or emergency message. At step 338, RRA/RRC paging by RRAaP 223 may include CN update info, emergency broadcast, or DL UE 229 data or emergency message. At step 329, UE 228 may determine if it needs to pass the paging content to a higher layer. At step 339, UE 229 may determine if it needs to pass the paging content to a higher layer. At step 340, RRAaP 223 may forward DL paging for another UE (not shown) to RRAaP 232 where the another UE is located.

Figure 25:
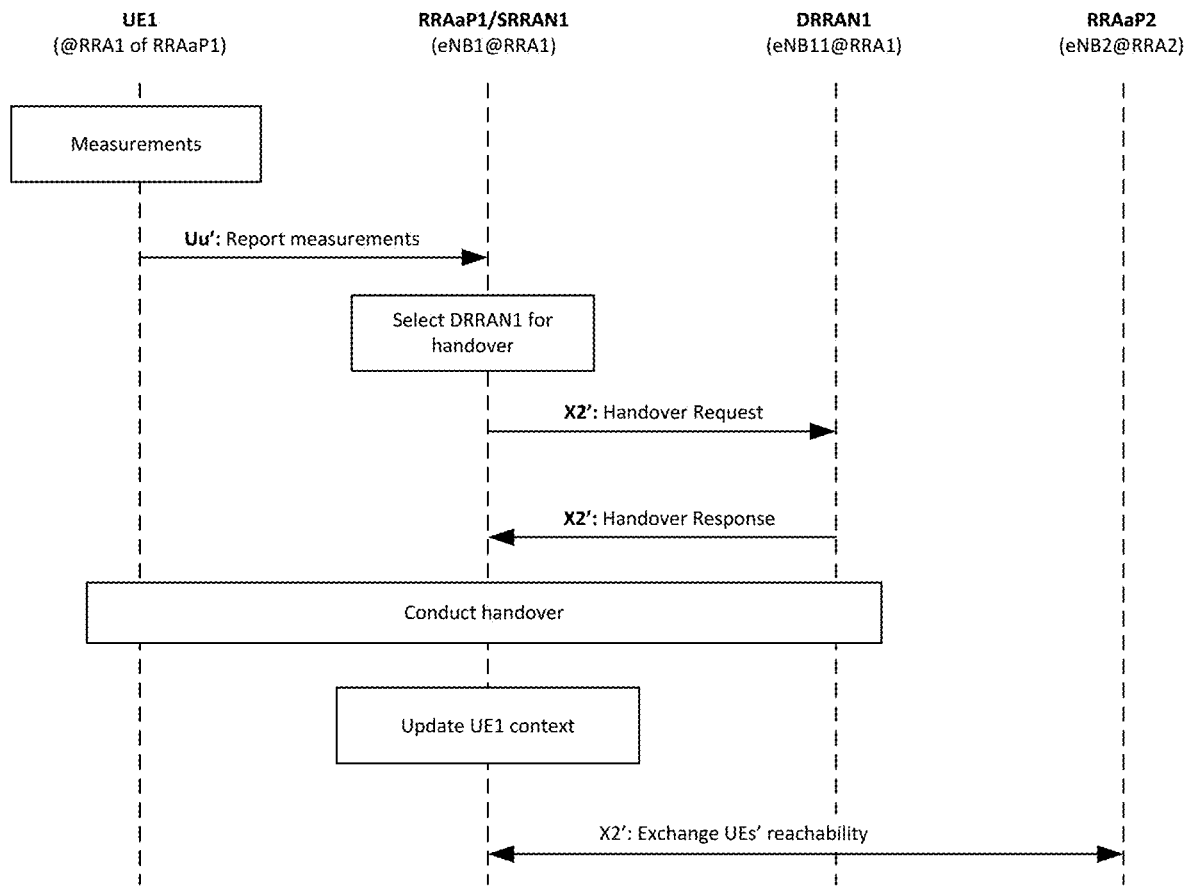
FIG. 25 illustrates an exemplary SRRAN Initiated Handover within a RRA.
Figure 26:
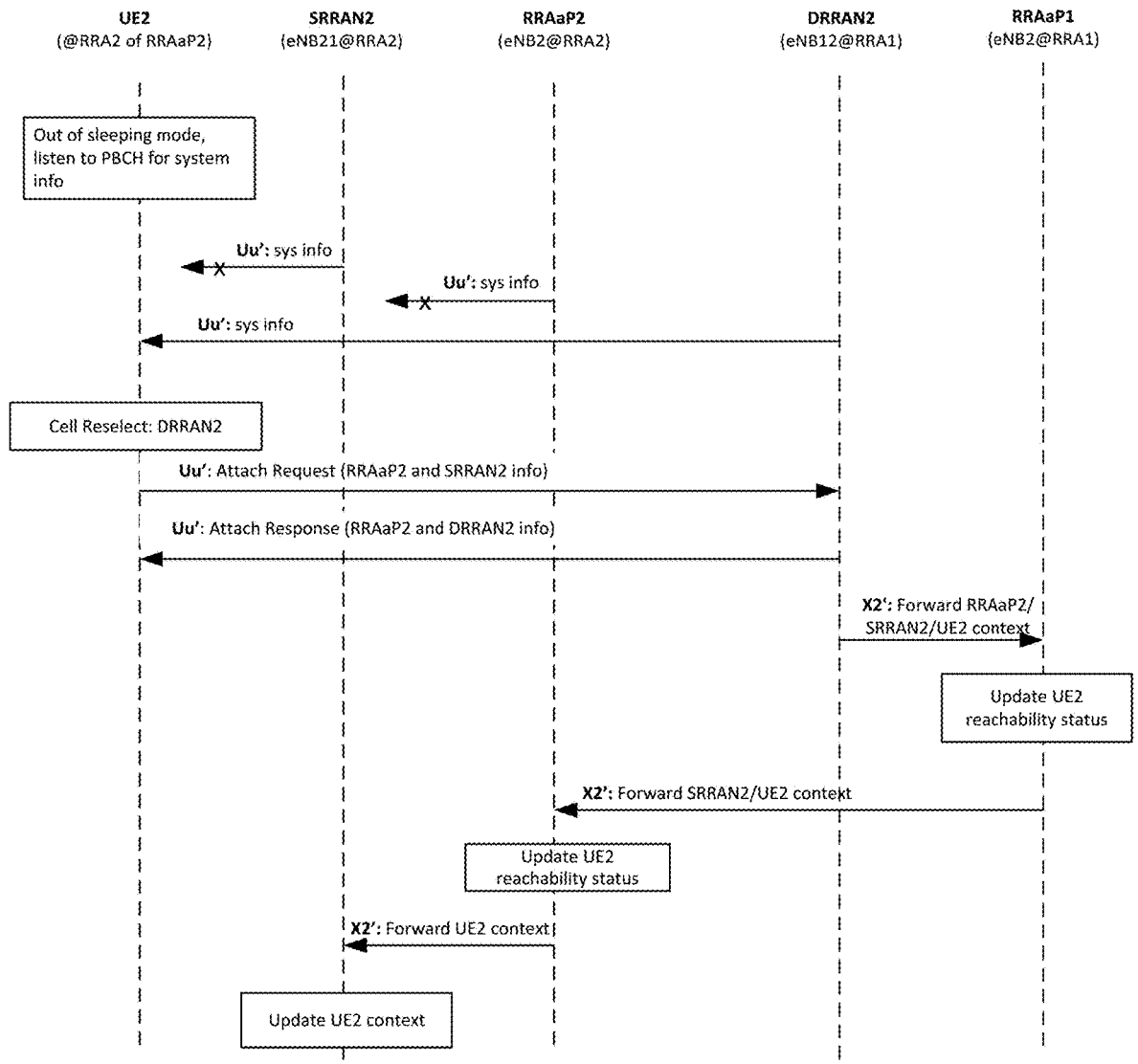
FIG. 26 illustrates an exemplary UE Initiated Handover across RRAs.

Radio Access Network Based Mobility Management is illustrated in FIG. 25 and FIG. 26. FIG. 18 and the accompanying description may be considered in method flows of FIG. 22-FIG. 26. FIG. 19 and FIG. 20, respectively, may be referenced to gain additional perspective with regard to the methods of FIG. 25 and FIG. 26. FIG. 25 illustrates an exemplary RRAaP/SRRAN initiated handover within a RRA. At step 341 UE 228 may determine measurements. At step 342, UE 228 may send measurements to RRAaP 222. At step 343, based on the measurements of step 342, DRRAN 224 may be selected for handover of UE 228. At step 344, RRAaP 222 sends a handover request to DRRAN 224 based on the selection at step 343. At step 345, DRRAN 224 sends a handover response to RRAaP 222. At step 346, UE 228, RRAaP 222, and DRRAN 224 conduct the handover process. At step 347, RRAaP 222 updates the context of UE 228. At step 348, RRAaP 222 and RRAaP 223 may exchange reachability of UEs, which may include UE 228.

FIG. 26 illustrates an example method of UE mobility management controlled by UE while across RRAs at local area. FIG. 26 illustrates an exemplary UE Initiated Handover across RRAs At step 351, UE 229 may come out of sleeping mode and listen to PBCH for system information. At step 352 and step 353, SRRAN 226 and RRAaP 223, respectively, may not be able to reach UE 229. UE 229 may be out-of-range of SRRAN 226 and RRAaP 223 or the signals from these nodes could be blocked. Blockage is expected to be more problematic for NR since high frequencies are expected to be used for some deployments. At step, 354, DRRAN 225 sends sys info to UE 229 that is received by UE 229. Steps 352, 353, and 354 may happen close to the same time. At step 355, UE 229 selects DRRAN 225 based on the received sys info. At step 356, UE 229 sends an attach request, based on the determined selection of step 355, to DRRAN 225. The attach request may include RRAaP 223 or SRRAN 226 information. At step 357, in response to the attach request of step 356, DRRAN 225 sends an attach response that may include RRAaP 223 or DRRAN 225 information. At step 358, DRRAN 225 may forward context information of RRAaP 223, SRRAN 226, or UE 229 to RRAaP 222. At step 359, RRAaP 222 may update its UE 229 reachability status based on information of step 358. At step 360, RRAaP 222 may forward SRRAN 226 or UE 229 context information to RRAaP 223. At step 361, RRAaP 223 may update the reachability status it has of UE 229 based on the information of step 360. At step 362, SRRAN 226 may be forwarded UE 229 context information from RRAAP 223. At step 363, accordingly, SRRAN 226 may update the context information it has of UE 229 based on the information received at step 362.

The handover mechanisms described above are also applicable to the distributed architecture illustrated in FIG. 21 with the following handover scenarios as examples. For a fully distributed network of radio accessing nodes, e.g., a mesh network of LTE eNBs or WiFi APs, the mobility may be handled between two radio accessing nodes via the direct interface between them (e.g., between two eNBs via the X2' interface between them in an LTE system) with the UE mobility context, such as location, reachability status, etc., exchanged over the interface between the radio accessing nodes. For a partial distributed network of radio accessing nodes, e.g., a partial mesh network of LTE eNBs or WiFi APs, there may or may not be a direct interface between a pair of radio accessing nodes. The mobility may be handled the same way as described above between a pair of radio accessing nodes with direct interface between them.

With continued reference to handover and partial distributed network of radio accessing nodes, the mobility may be handled differently between a pair of radio accessing nodes without direct interface between them, as exemplified below. In a first example, if there is a third radio accessing node which has direct interfaces with the pair of radio accessing nodes respectively, then the handover may be conducted via the third node through its direct interfaces to the pair of radio accessing nodes respectively. Therefore the third node serves as a relay for handover procedure and supports the exchanging of a UE mobility context, such as location, reachability status, etc., over its interfaces between the pair of radio accessing nodes respectively. In a second example, if there is no third radio accessing node which has direct interfaces with the pair of radio accessing nodes respectively, then the handover may be conducted via a core network's mobility controller through its direct interfaces to the pair of radio accessing nodes respectively, e.g., MME via the S1' interfaces to the pair of eNBs respectively in an LTE system. Therefore the core network controller manages the handover procedure and supports the exchanging of a UE mobility context, such as location, reachability status, etc., over its interfaces between the pair of radio accessing nodes respectively.

In this disclosure 5G, 5G System, NexGen, Next generation System are used interchangeably. Also, in this disclosure, the term Node B or eNode B or 5G RAN node are used to generically denote a 5G Radio Access Network Node, which could be either located in the control plane, or in the user plane, and could be located in a centralized location (e.g., data center, cloud, i.e. central controller or central unit in support of virtualization) or could be located at the edge of the RAN as a distributed RAN unit for e.g., a Transmit Reception Point (TRP) with RAN functions located at the edge of the RAN. Similarly, the term MME, or 5G CN control node are used generically in reference, to a 5G network control entity or control unit located in the control plane. The term S-GW, P-GW, or 5G core network equivalent node are used in reference to 5G core network gateway or user data processing unit located in the data plane or user plane.

Device is used herein as a generic family name of communication devices which includes the UE. Terms such as "apparatus," "apparatus configured for wireless or wired communications," "device" and "UE" are used interchangeably throughout the document. For the purpose of this application, methods that apply to a device may apply to a UE. Architecturally, a UE includes a USIM (User Services Identity Module), a Mobile Termination (MT) which performs radio transmission, and related function and the Terminal Equipment (TE) which contains end-to-end applications and key board (e.g. laptop). Some devices may not have the TE for example if there is no need to have user interface, such as a graphical user interface or voice recognition interface, or the like.

Essential System Information as discussed herein is system information that the UE must read before being able to access the network and for e.g. perform random access procedure and establish RRC (Radio Resource Control) signaling connection. In reference to the existing 4G LTE system such essential system information include information captured in the Master Information Block (MIB), System Information Block (SIB) Type 1, SIB Type 2, through SIB Type 8 (depending on the support of the concerned Radio Access Technology (RAT)), SIB type 17 (Depending on the support of RAN-assisted WLAN Interworking). MIB includes for example information about the downlink cell bandwidth and system frame number. SIB Type 1 may include information related to whether the UE is allowed to camp on a cell. SIB type 2 includes information that the UE needs in order to be able to access the cell. SIB type 3 includes information related to cell reselection. SIB4-SIB8 includes neighbor related information.

Grantless uplink data transfer as discussed herein means at the time of uplink user data transfer from the UE to the network, the UE doesn't not need to first request communication resources (e.g., in frequency domain and in time domain from the network) from the network (e.g. eNB or 5G RAN node equivalent) or wait for the network to allocate communication resources to the UE before UE accesses the system and send user data in the uplink direction.

In summary, distributed mobility management and UE states and state transitions are disclosed to enable lightweight signaling for data transmission. Disclosed is a radio access registration area (RRA) and logical entities to enable RAN-based tracking area control (e.g. RRA anchor Point (RRAaP), Serving RRA Node (SRRAN), Drifting RRA Node (DRRAN)). Mechanisms may trigger the reporting of location updates to allow a UE's location to be known at the RRA, RRA anchor or cell level. Mechanisms may perform dynamic RRA management based on the status and capabilities of the core network and radio access networks. A RAN-based UE reachability management and RRA anchor node based paging mechanism may reduce TAU and brute-force TA wide paging. Enhanced RRA-based RAN controlled mobility management procedures may enable SRRAN Initiated Handover within a RRA and UE Initiated Handover across RRAs.

In further summary, with regard to distributed mobility management and UE states and state transitions, an RRC_IDLE state may be enhanced to support reverse paging, where the UE pages the network for potential awaiting messages in the network. A RRC_Grant_Less state where no SRBs or DRBs have been established, but uplink data transmission is possible may use a grantless physical channel. A RRC_Connectionless state where upper layer data (e.g. user application data) is piggybacked on SRBs may be mapped to a connection-less physical channel. A RRC_CONNECTED_UE_Controlled_Mobility state may enable UE controlled mobility via cell reselection. A new RRC_Connected_NW_Controlled_Mobility state may enable network controlled mobility based on measurement reports from the UE. Establishment causes may enable the transition from the RRC_IDLE state to the appropriate new state when establishing a connection.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations. The NR devices may be the base stations, UEs, or other apparatuses disclosed herein.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific services and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 27A:
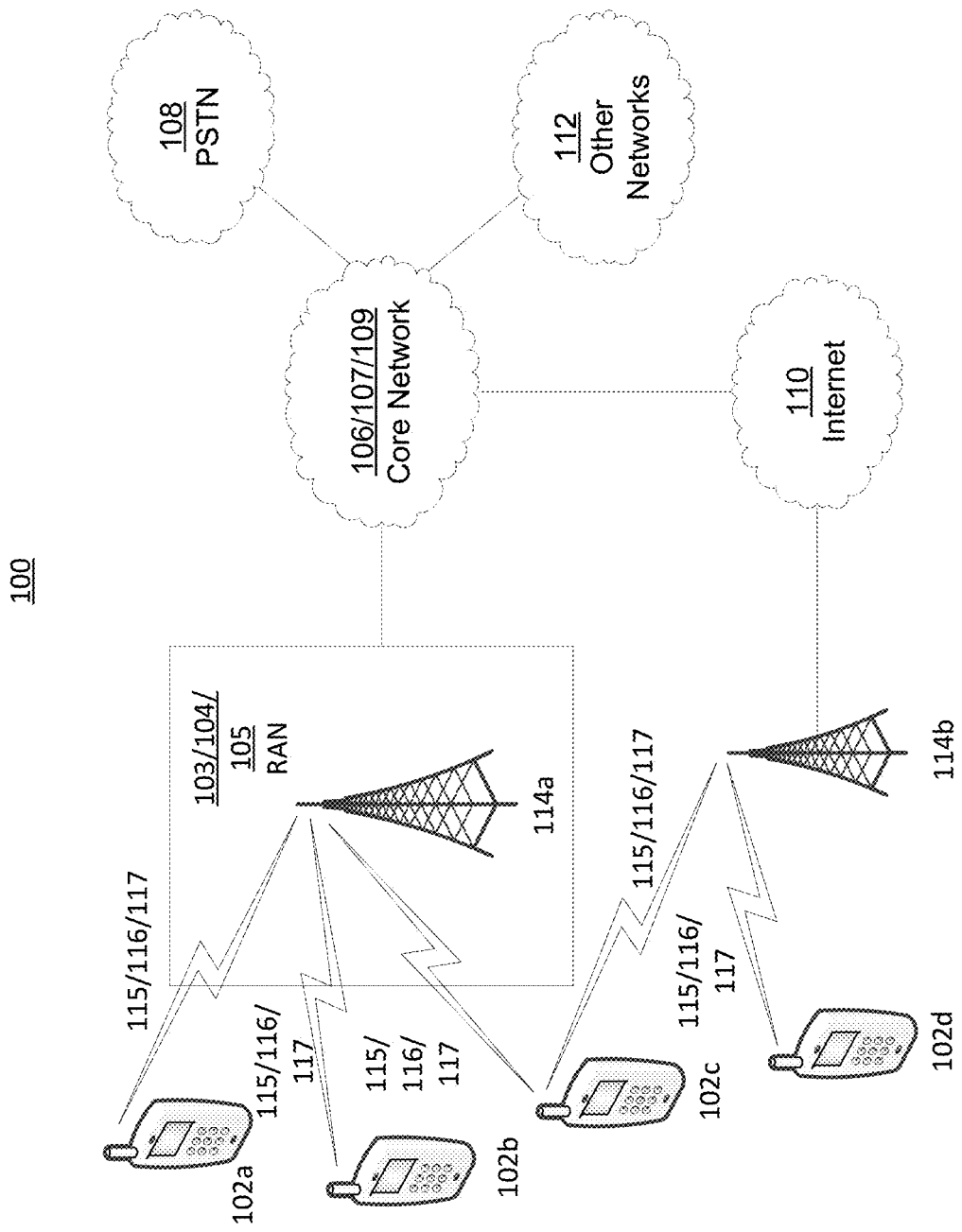
FIG. 27A illustrates an example communications system.

FIG. 27A illustrates an example communications system 100 in which the methods and apparatuses of mobility signaling load reduction, such as the systems and methods illustrated in FIG. 18 through FIG. 26 described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed examples contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIG. 27A, FIG. 27B, FIG. 27C, FIG. 27D, and FIG. 27E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown) for methods and systems of mobility signaling load reduction, as disclosed herein. The base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an example, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 27A may be a wireless router, Home Node B, Home eNode B, or access point, for example, and may utilize any suitable RAT for facilitating wireless connectivity in a localized area, such as a place of business, a home, a vehicle, a campus, and the like, for implementing the methods and systems of mobility signaling load reduction, as disclosed herein. In an example, the base station 114c and the WTRUs 102e, may implement a radio technology such as IEEE 802.11 to establish a wireless local area network (WLAN). In an example, the base station 114c and the WTRUs 102d, may implement a radio technology such as IEEE 802.15 to establish a wireless personal area network (WPAN). In yet another example, the base station 114c and the WTRUs 102e, may utilize a cellular-based RAT (e.g., WCDMA, CDMA2000, GSM, LTE, LTE- A, etc.) to establish a picocell or femtocell. As shown in FIG. 27A, the base station 114b may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 27A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 27A may be configured to communicate with the base station 114a, which may employ a cellular-based radio technology, and with the base station 114c, which may employ an IEEE 802 radio technology.

Figure 27B:
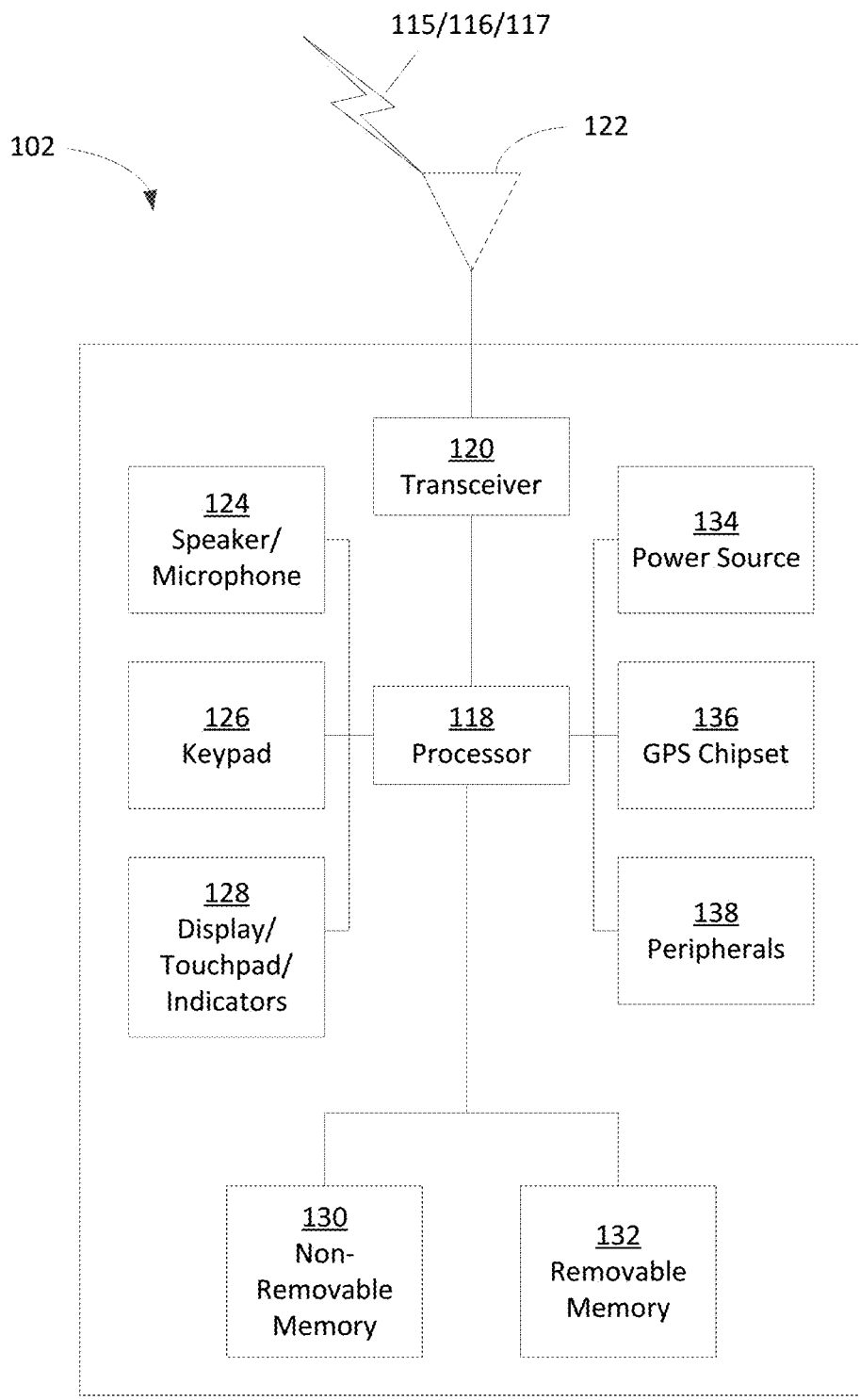
FIG. 27B is a block diagram of an example apparatus or device configured for wireless communications such as, for example, a wireless transmit/receive unit (WTRU)

FIG. 27B is a block diagram of an example apparatus or device configured for wireless communications in accordance with the examples illustrated herein, such as for example, a WTRU 102. As shown in FIG. 27B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an example. Also, examples contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 27B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 27B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an example, the transmit/receive element 122 may be an antenna configured to transmit and/or receive RF signals. In an example, the transmit/receive Although not shown in FIG. 27A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links for implementing methods and systems of mobility signaling load reduction, as disclosed herein. For example, the WTRU 102c shown in FIG. 27A may be configured to communicate with the base station 114a, which may employ a cellular-based radio technology, and with the base station 114b, which may employ an IEEE 802 radio technology.

FIG. 27B is a block diagram of an example apparatus or device configured for wireless communications in accordance with methods and systems of mobility signaling load reduction, as disclosed herein, such as for example, a WTRU 102 (e.g., UE 229 or UE 228). As shown in FIG. 27B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an example. Also, the examples herein contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 27B and may be an exemplary implementation that performs the disclosed systems and methods for mobility signaling load reduction described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 27B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an example, the transmit/receive element 122 may be an antenna configured to transmit and/or receive RF signals. In an example, the transmit/receive element 122 may be an emitter/detector configured to transmit and/or receive IR, UV, or visible light signals, for example. In yet another example, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 27B as a single element, the WTRU 102 may include any number of transmit/receive elements 122. More specifically, the WTRU 102 may employ MIMO technology. Thus, in an example, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other examples, the processor 118 may access information from, and store data in, memory that is not physically located on the WTRU 102, such as on a server or a home computer (not shown). The processor 118 may be configured to control lighting patterns, images, or colors on the display or indicators 128 in response to whether the setup of the mobility signaling in some of the examples described herein are successful or unsuccessful, or otherwise indicate a status of mobility signaling load reduction and associated components. The control lighting patterns, images, or colors on the display or indicators 128 may be reflective of the status of any of the method flows or components in the FIG.'S illustrated or discussed herein (e.g., FIG. 22-FIG. 26, etc). Disclosed herein are messages and procedures of mobility signaling load reduction. The messages and procedures may be extended to provide interface/API for users to request resource-related resources via an input source (e.g., speaker/microphone 124, keypad 126, or display/touchpad/indicators 128) and request, configure, or query mobility signaling load reduction related information, among other things that may be displayed on display 128.

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an example.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB)

port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 27C:
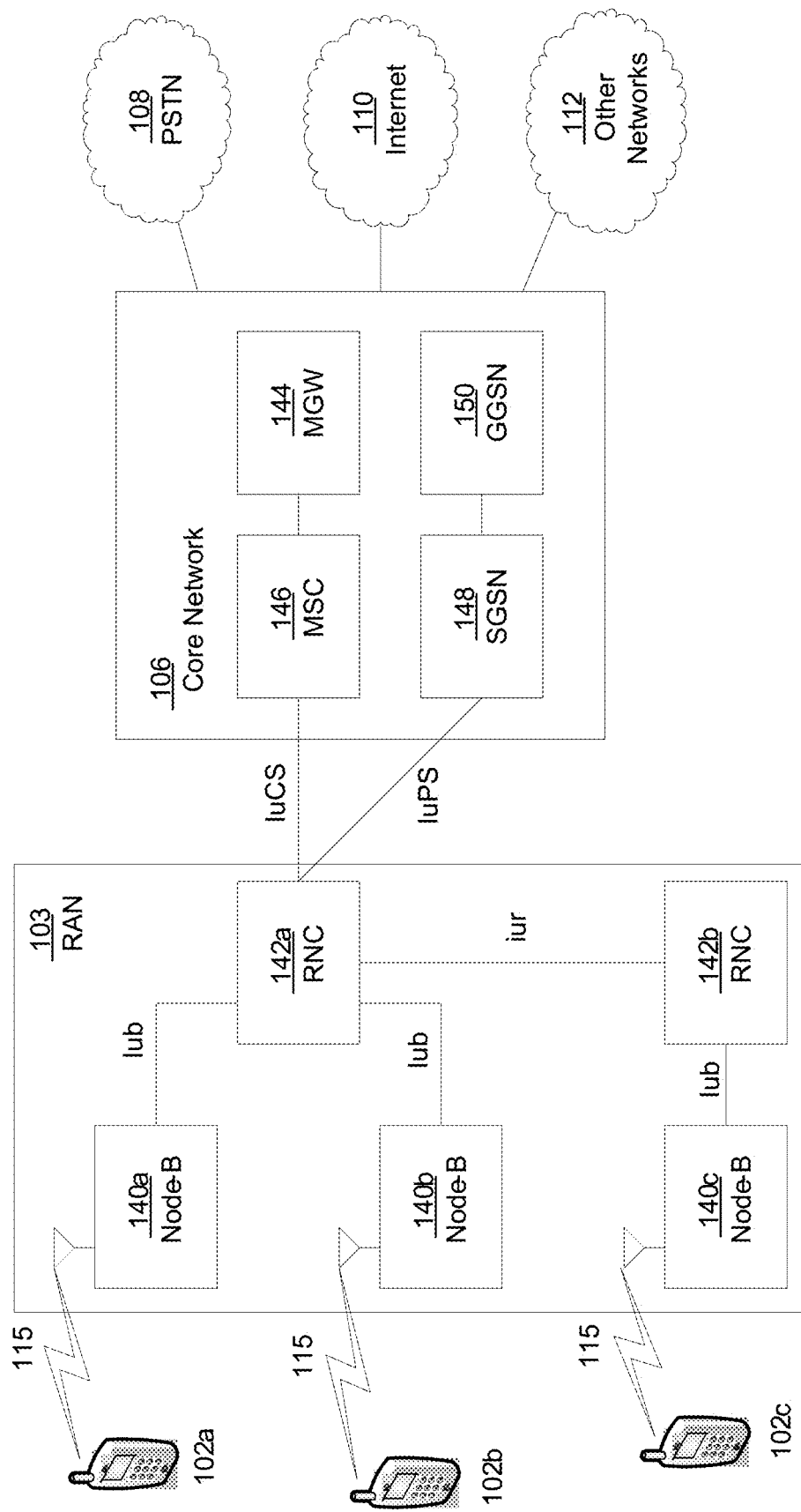
FIG. 27C is a system diagram of a first example radio access network (RAN) and core network.

FIG. 27C is a system diagram of the RAN 103 and the core network 106 that may implement the methods and systems of mobility signaling load reduction, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 27C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an example.

As shown in FIG. 27C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 27C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 27D:
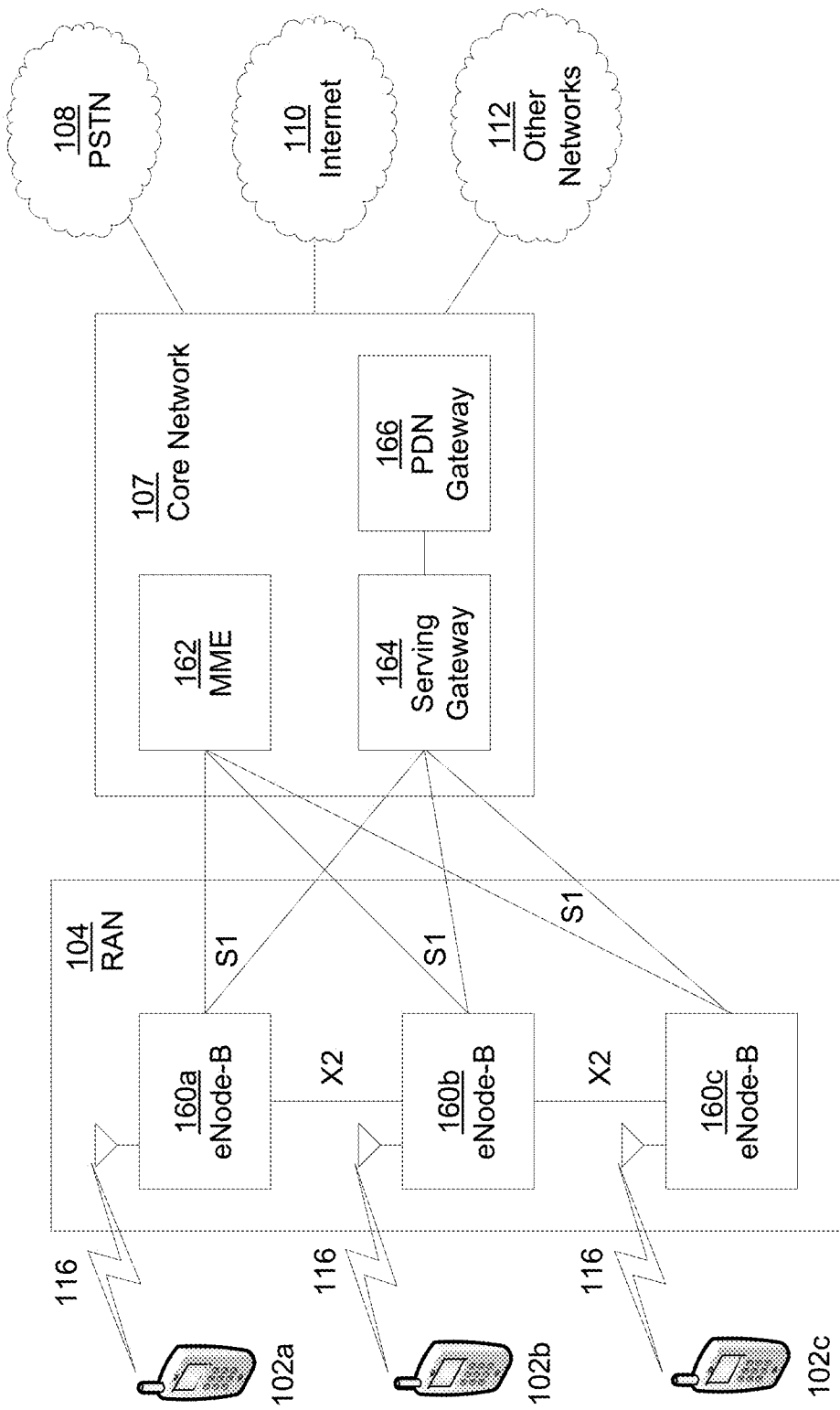
FIG. 27D is a system diagram of a second example radio access network (RAN) and core network.

FIG. 27D is a system diagram of the RAN 104 and the core network 107 that may implement methods and systems of mobility signaling load reduction, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an example. The eNode-Bs 160a, 160b, 160c may each include one or more transceivers for communicating with the WTRUs 102a, 102b, 102c over the air interface 116. In an example, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 27D, the eNode-Bs 160a, 160b, 160c may communicate with one another over an X2 interface.

The core network 107 shown in FIG. 27D may include a mobility management entity (MME) gateway 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 27E:
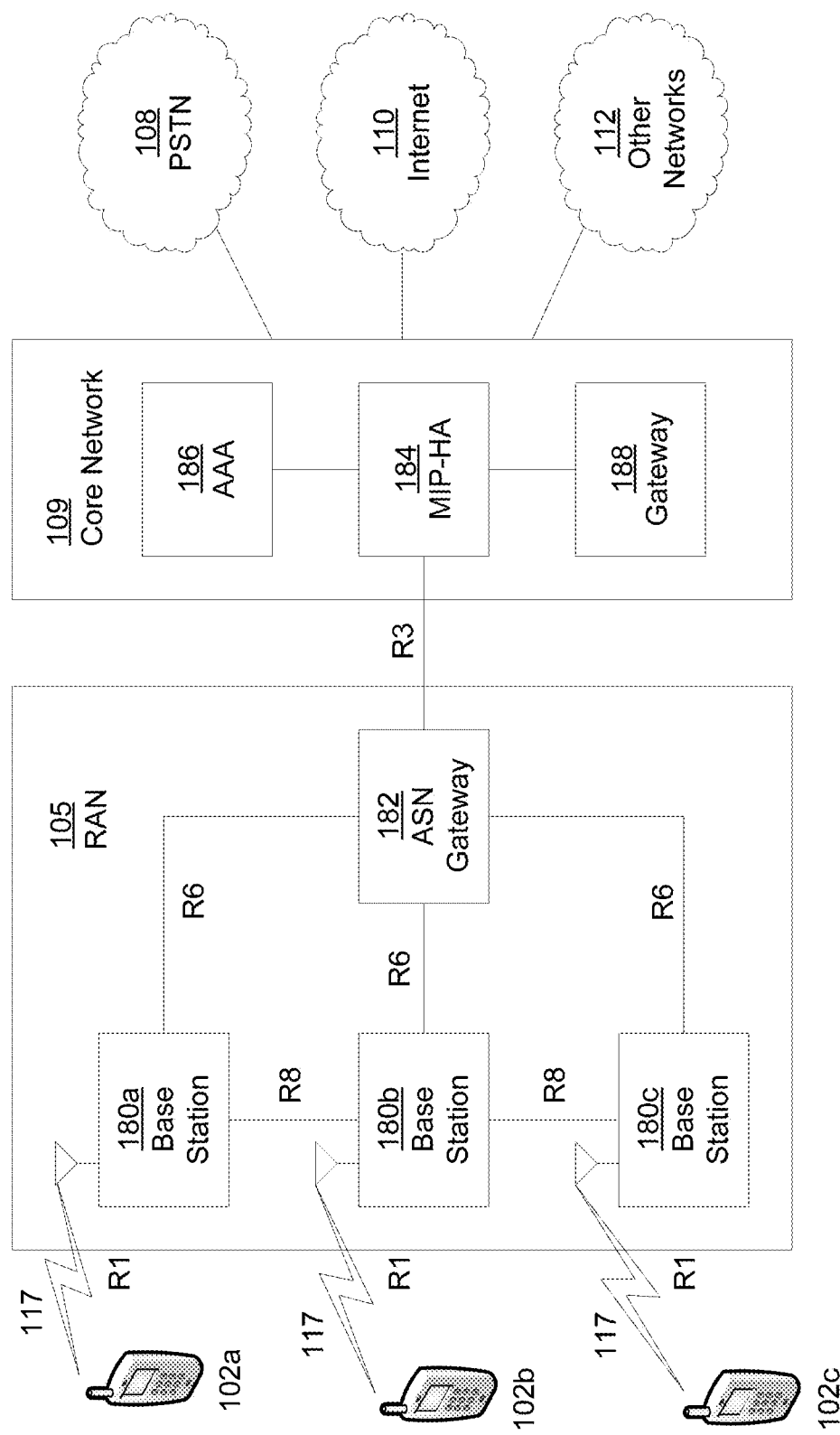
FIG. 27E is a system diagram of a third example radio access network (RAN) and core network.

FIG. 27E is a system diagram of the RAN 105 and the core network 109 that may implement methods and systems of mobility signaling load reduction, as disclosed herein. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 27E, the RAN 105 may include base stations 180a, 180b, 180c, and an ASN gateway 182, though it will be appreciated that the RAN 105 may include any number of base stations and ASN gateways while remaining consistent with an example. The base stations 180a, 180b, 180c may each be associated with a particular cell in the RAN 105 and may include one or more transceivers for communicating with the WTRUs 102a, 102b, 102c over the air interface 117. In an example, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 27E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 27E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIG. 27A, FIG. 27C, FIG. 27D, and FIG. 27E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 27A, FIG. 27B, FIG. 27C, FIG. 27D, and FIG. 27E are provided by way of example only, and it is understood that the subject matter disclosed and claimed herein may be embodied or implemented in any similar communication system, whether presently defined or defined in the future.

Figure 27F:
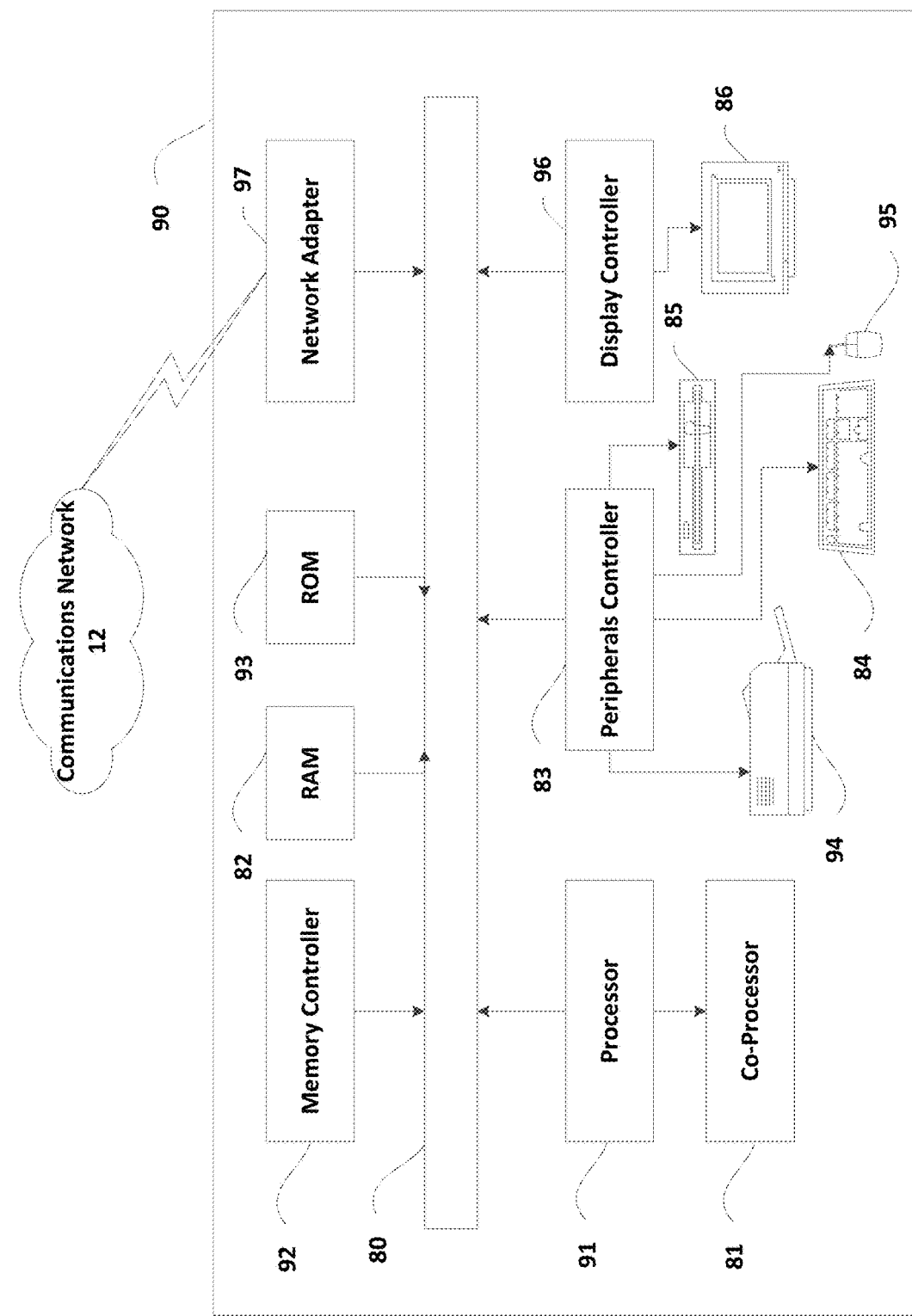
FIG. 27F is a block diagram of an exemplary computing system in which one or more apparatuses of communications networks may be embodied, such as certain nodes or functional entities in the RAN, core network, public switched telephone network (PSTN), Internet, or other networks.

FIG. 27F is a block diagram of an exemplary computing system 90 in which one or more apparatuses of the communications networks illustrated in FIG. 27A, FIG. 27C, FIG. 27D, and FIG. 27E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein for mobility signaling load reduction, such as receiving context information or handover messages.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIG. 27A, FIG. 27B, FIG. 27C, FIG. 27D, and FIG. 27E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 28:
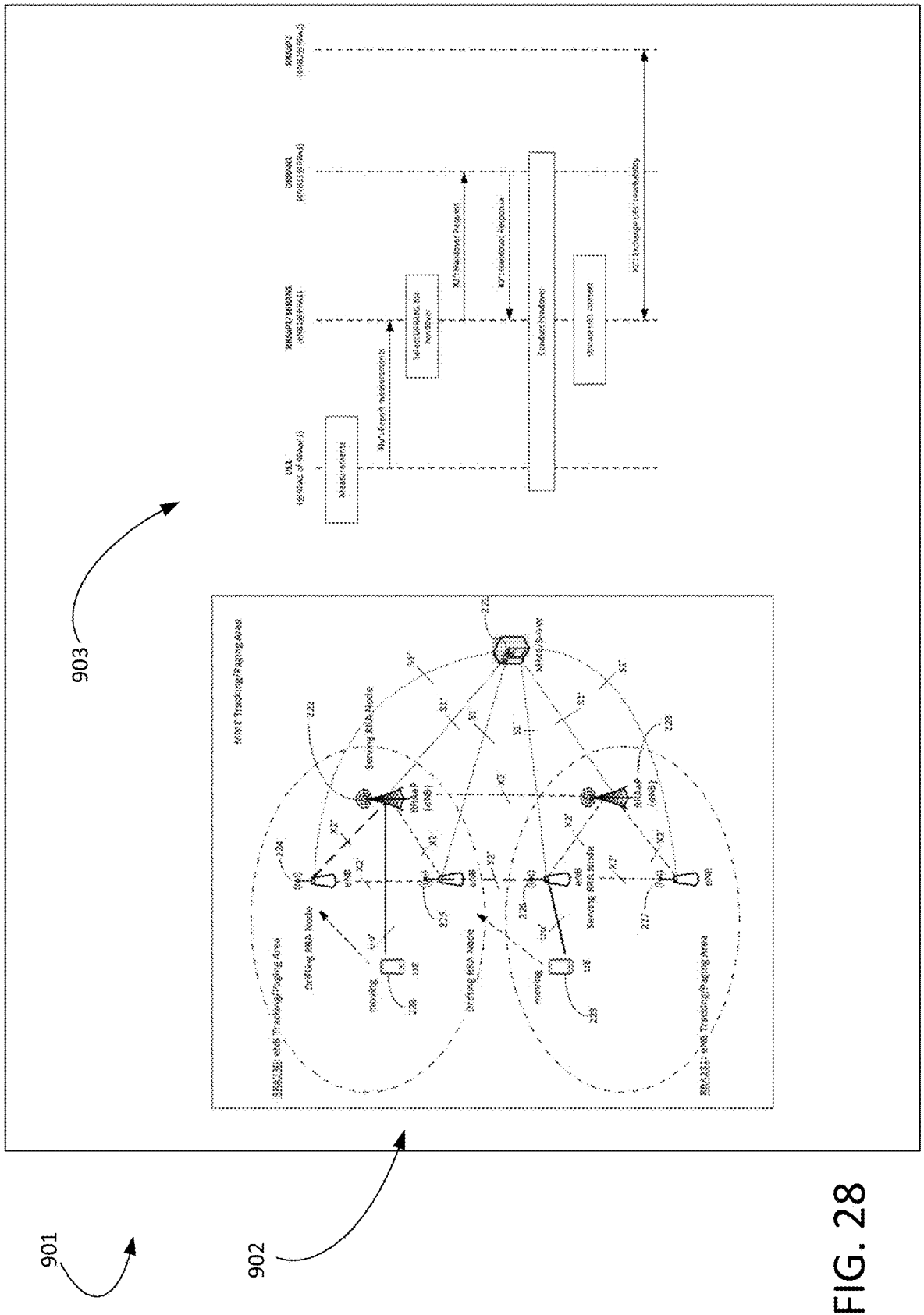
FIG. 28 illustrates an exemplary display (e.g., graphical user interface) that may be generated based on the methods and systems of mobility signaling load reduction.

FIG. 28 illustrates an exemplary display (e.g., graphical user interface) that may be generated based on the methods and systems of mobility signaling load reduction, as disclosed herein. Display interface 901 (e.g., touch screen display) may provide text in block 902 associated with of mobility signaling load reduction, such as RRC related parameters, method flow, and RRC associated current conditions. Progress of any of the steps (e.g., sent messages or success of steps) disclosed herein may be displayed in block 902. In addition, graphical output 902 may be displayed on display interface 901. Graphical output 903 may be the topology of the devices implementing the methods and systems of mobility signaling load reduction, a graphical output of the progress of any method or systems discussed herein, or the like It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

In describing preferred methods, systems, or apparatuses of the subject matter of the present disclosure—mobility signaling load reduction—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein, such as anyone of FIG. 18A, B or FIG. 22-FIG. 26). Such other examples are intended to be within the scope of the claims if they have structural elements that do not differ from the literal language of the claims, or if they include equivalent structural elements with insubstantial differences from the literal languages of the claims. It should be understood herein that the use of physical channel often provides for the same implementation using the transport channel, as discussed herein.

Methods, systems, and apparatuses, among other things, as described herein may provide for means for mobility signaling load reduction. A method, system, computer readable storage medium, or apparatus has means for receiving a request to create a radio access network registration area; and based on the request, providing instructions to create a radio access network registration area anchor point associated with the radio access network registration area. The radio access network registration area anchor point may manage mobility of a mobile device locally. The radio access network registration area anchor point may be an eNodeB. The radio access network registration area anchor point may track reachability status of a mobile device in the local radio accessing area. All combinations in this paragraph and throughout (including the removal or addition of steps) are contemplated in a manner that is consistent with the other portions of the detailed description.

A method, system, computer readable storage medium, or apparatus for an radio access network registration area anchor point (RRAaP) has means for receiving a reachability status of a mobile device, wherein the mobile device is within the radio access network registration area of the RRAaP device; receiving downlink data for the mobile device; and providing instructions to wirelessly transmit the downlink data based on the reachability status of the mobile device. The RRAaP device may be a base station (e.g., an eNode B). The RRAaP device may serve as the point of presence of the mobile device. The RRAaP device may serve as an alternative RRA node to serving RRA node to act as a temporary presence of the mobile device. All combinations in this paragraph and throughout (including the removal or addition of steps) are contemplated in a manner that is consistent with the other portions of the detailed description.

A method, system, computer readable storage medium, or apparatus for monitoring cells; and based on the received request, creating a radio access network registration area. A method, system, computer readable storage medium, or apparatus for receiving a request; and based on the received request, creating a radio access network registration area. A method, system, computer readable storage medium, or apparatus for determining the mobility state of the apparatus, wherein the apparatus is a user equipment; responsive to the mobility state of the apparatus including a change of a radio access network registration area for the apparatus, providing a location update to a base station; and transmitting data wirelessly over a grant-less channel. A method, system, computer readable storage medium, or apparatus for obtaining a measurement from a user equipment; determining a drifting radio access registration area node based on the measurement; responsive to determining the drifting radio access registration area node, providing a handover request to the drifting radio access registration area node; receiving a response to the handover request; and conducting handover.

A method, system, computer readable storage medium, or apparatus has means for paging a user equipment; responsive to paging the user equipment, obtaining measurement information from the user equipment; based on the measurement information, updating a context of the user equipment; and exchanging the context of the user equipment with a base station. The base station may be a radio access network registration area anchor point, drifting radio access network registration area anchor point, or serving radio access network registration area anchor point. The method, system, computer readable storage medium, or apparatus may also have means for obtaining a paging message from a mobility management entity gateway that includes core network update information; and based on the paging message including core network update information, providing the paging message to the user equipment. The method, system, computer readable storage medium, or apparatus may also have means for obtaining a paging message from a mobility management entity gateway that includes emergency broadcast information; and based on the paging message including emergency broadcast information, providing the paging message to the user equipment. The method, system, computer readable storage medium, or apparatus may also have means for obtaining a paging message from a mobility management entity gateway that includes downlink user equipment data; and based on the paging message including downlink user equipment data, providing the paging message to the user equipment. The paging may be used to wake the user equipment from discontinuous reception mode. The measurement information may include mobility history, mobility state, traffic pattern, how long (an amount of time or distance) the user equipment expects to remain in connected mode, or a user equipment state to be transitioned into. RRC_Grant_Less state is a connected state. In a first scenario, RRC context exists but no signaling connection (dedicated or common) exists, no resources are allocated for it, no data radio bearer (DRB) connection exists, and DRB cannot be established in this state. RRC_Grant_Less state is similar to RRC_IDLE state in the sense that it has the attributes of RRC_IDLE state described above. A difference with RRC_IDLE state is that for RRC_Grant_Less state there may be grant-less uplink data transfer. The apparatus, method, or system may initiate grant-less uplink data transfer. The context of the user equipment may include location of the user equipment. The apparatus, method, or system may obtain data over an assigned transport channel when in the grant-less state. All combinations in this paragraph and throughout (including the removal or addition of steps) are contemplated in a manner that is consistent with the other portions of the detailed description.

A method, system, or computer readable storage medium, has means for paging, by first base station, a user equipment; responsive to paging the user equipment, obtaining measurement information from the user equipment; based on the measurement information, updating a context of the user equipment; and exchanging the context of the user equipment with a second base station. The first base station or the second base station may be a radio access network registration area anchor point. The first base station or the second base station may be a drifting radio access network registration area anchor point. The first base station or the second base station may be a serving radio access network registration area anchor point. All combinations in this paragraph and throughout (including the removal or addition of steps) are contemplated in a manner that is consistent with the other portions of the detailed description.

A method, system, or computer readable storage medium, has means for detecting a change associated with the user equipment, the change associated with user equipment including the change of a radio access network registration area of the user equipment; responsive to detecting the change associated with the user equipment, performing a location update of the user equipment; and providing the location update to a base station over a grant-less channel. The grant-less channel may be assigned. The method, system, or computer readable storage medium, has means for performing carrier sensing to gain access to the grant-less channel. The method, system, or computer readable storage medium, has means for receiving a page based on the location update; and providing a response to the page over the grant-less channel. The detecting the change associated with the user equipment may further include a change in a mobility metric that reaches a threshold, wherein the mobility metric including number of handovers occurring during a specified period. The detecting the change associated with the user equipment may further include a change in a mobility metric that reaches a threshold, wherein the mobility metric includes a number of cell reselections. The grant-less channel may be a physical channel or transport channel. The base station may be a drifting radio access network registration area anchor point or a serving radio access network registration area anchor point. All combinations in this paragraph and throughout (including the removal or addition of steps) are contemplated in a manner that is consistent with the other portions of the detailed description.

A computer program product including a computer readable medium, having stored thereon a computer program including program instructions, the computer program being loadable into a data-processing unit and adapted to cause the data-processing unit to execute method steps according to any of the steps disclosed herein when the computer program is run by the data-processing unit.

What is claimed:

1. A user equipment that performs wireless communication comprising:
    a processor; and
    a memory coupled with the processor, the memory comprising executable instructions stored thereon that when executed by the processor cause the processor to effectuate operations comprising:
        operating in one of a first Radio Resource Control (RRC) state, second RRC state, or third RRC state, wherein the user equipment is in the second RRC state or the third RRC state when an RRC connection has been established;
        determining a mobility metric of the user equipment;
        detecting a change associated with the user equipment when the user equipment is operating in the second RRC state, the change associated with user equipment comprising the change of a radio access network registration area, RRA, of the user equipment or change of cell as result of cell reselection;
        based on a threshold associated with the mobility metric, determining whether to perform a location update of the user equipment operating in the second RRC state based on:
            the change of RRA of the user equipment or
            the change of cell as result of cell reselection; and
        providing the location update of the user equipment operating in the second RRC state to a base station, wherein the user equipment is capable of monitoring paging messages or system information broadcast in the second RRC state, and wherein the user equipment is configured to perform reverse paging where the user equipment queries the network for a waiting message.

2. The user equipment of claim 1, wherein the providing the location update to the base station is over a grant-less channel.

3. The user equipment of claim 1, wherein the providing the location update to the base station is over a grant-less channel, wherein with the grant-less channel, the uplink data transfer occurs without first requesting communication resources from the base station.

4. The user equipment of claim 1, wherein the user equipment has a grant-less channel specified or configured.

5. The user equipment of claim 1, the operations further comprising performing carrier sensing to gain access to a grant-less channel.

6. The user equipment of claim 4, wherein the second RRC state is RRC_Connectionless, when in the second RRC state, the RRC context and signaling connection exist.

7. The user equipment of claim 4, wherein the first RRC state is RRC_IDLE, the second RRC state is RRC_Connectionless, and the third RRC state is RRC_CONNECTED.

8. The user equipment of claim 1, wherein the operation further comprising providing the user equipment location update to the base station is over a grant based channel.

9. The user equipment of claim 1, wherein the providing the user equipment location update to a base station over a grant based channel, wherein the grant based channel is assigned.

10. The user equipment of claim 1, wherein the detecting the change associated with the user equipment further comprises a change in a mobility metric that reaches a threshold, wherein the mobility metric comprises number of handover occurring during a specified period.

11. The user equipment of claim 1, wherein the detecting the change associated with the user equipment further comprises a change in a mobility metric that reaches a threshold, wherein the mobility metric comprises a number of cell reselections.

12. The user equipment of claim 1, wherein the user equipment is provisioned with mobility metrics or speed metric related thresholds.

13. The user equipment of claim 1, wherein the RRC connection context is stored in the user equipment without dedicated RRC connection signaling.

14. A method for performing wireless communication, the method comprising:
    operating, by a user equipment, in one of a first Radio Resource Control (RRC) state, second RRC state, or third RRC state, wherein the user equipment is in the second RRC state or the third RRC state when an RRC connection has been established;
    determining a mobility metric of the user equipment;
    detecting a change associated with the user equipment when the user equipment is operating in the second RRC state, the change associated with user equipment comprising the change of a Radio Access Network Registration Area (RRA) of the user equipment or change of cell as result of cell reselection;
    based on a threshold associated with the mobility metric, determining whether to perform a location update of the user equipment operating in the second RRC state based on:
        the change of RRA of the user equipment or
        the change of cell as result of cell reselection; and
    providing the location update of the user equipment to a base station, wherein the user equipment is capable of monitoring paging messages or system information broadcast in the second RRC state, and wherein the user equipment is configured to perform reverse paging where the user equipment queries the network for a waiting message.

15. The method of claim 14, wherein the first RRC state is RRC_IDLE, the second RRC state is RRC_Connectionless, and the third RRC state is RRC_CONNECTED.

16. The method of claim 14, wherein the providing the user equipment location update to the base station is over a grant based channel.

17. The method of claim 14, wherein the providing the location update to the base station is over a grant-less channel.

18. A system comprising:
a base station; and
a user equipment communicatively connected with the base station, the user equipment comprising:
a processor; and
a memory coupled with the processor, the memory comprising executable instructions stored thereon that when executed by the processor cause the processor to effectuate operations comprising:
operating in one of a first Radio Resource Control (RRC) state, second RRC state, or third RRC state, wherein the user equipment is in the second RRC state or the third RRC state when an RRC connection has been established;
determining a mobility metric of the user equipment;
detecting a change associated with the user equipment, when the user equipment is operating in the second RRC state, the change associated with user equipment comprising the change of a radio access network registration area, RRA, of the user equipment or change of cell as result of cell reselection;
based on a threshold associated with the mobility metric, determining whether to perform a location update of the user equipment operating in the second RRC state based on:
the change of RRA of the user equipment or
the change of cell as result of cell reselection; and
providing the location update of the user equipment operating in the second RRC state to a base station, wherein the user equipment is capable of monitoring paging messages or system information broadcast in the second RRC state, and wherein the user equipment is configured to perform reverse paging where the user equipment queries the network for a waiting message.

19. The system of claim 18, wherein the providing the location update to the base station is over a grant-less channel.

20. The system of claim 18, wherein the operation further comprising providing the user equipment location update to the base station is over a grant based channel.

* * * * *